US008060386B2

(12) United States Patent
Stevenson et al.

(10) Patent No.: US 8,060,386 B2
(45) Date of Patent: Nov. 15, 2011

(54) PERSISTENT SALES AGENT FOR COMPLEX TRANSACTIONS

(75) Inventors: Peter W. Stevenson, Burlingame, CA (US); Kevin C. Dunn, Roseville, CA (US); Michael Mills, Redwood City, CA (US)

(73) Assignee: Trustnode, Inc., San Francisco, CA (US)

(*) Notice: Subject to any disclaimer, the term of this patent is extended or adjusted under 35 U.S.C. 154(b) by 288 days.

(21) Appl. No.: 12/433,720

(22) Filed: Apr. 30, 2009

(65) Prior Publication Data

US 2010/0324941 A1  Dec. 23, 2010

(51) Int. Cl.
*G06Q 40/00* (2006.01)
(52) U.S. Cl. .............................. 705/4; 705/35
(58) Field of Classification Search .................. 705/4, 35
See application file for complete search history.

(56) References Cited

U.S. PATENT DOCUMENTS

| 7,103,585 | B2 | 9/2006 | Jowell et al. | |
| 2001/0032140 | A1 | 10/2001 | Hoffman | |
| 2007/0203828 | A1* | 8/2007 | Jung et al. | 705/38 |
| 2008/0319786 | A1* | 12/2008 | Stivoric et al. | 705/2 |

OTHER PUBLICATIONS

Numbers Game Kathleen Joyce. Promo. Danbury: Nov. 2005. vol. 18, Iss. 12; p. 7.*
ADS is witness to new growth; [1 Edition] Darran Gardner. Sunday Herald. Glasgow (UK): Jul. 21, 2002. p. 6.*

* cited by examiner

*Primary Examiner* — Lalita Hamilton
(74) *Attorney, Agent, or Firm* — Daniel R Siegel; IPxLaw Group LLP

(57) ABSTRACT

The present invention includes systems and methods employing branded virtual characters across multiple network platforms throughout various stages of complex transactions (eg, selling insurance). These characters initially engage prospective customers on a network platform, such as a social network, and persist over time across other network platforms (eg, university and company websites) to educate consumers until they are ready to purchase—from their "trusted advisor"—particular products and services offered by various providers. Even after completing transactions, these characters continue to provide various services, such as notifying a customer whose circumstances have changed of a relevant product or service, while remaining available to answer questions and provide information upon demand. By employing a semi-automated model, the system of the present invention can answer many questions via predetermined vignettes and automated answers generated by expert systems, while still utilizing live human experts (often transparently) when necessary.

63 Claims, 59 Drawing Sheets

Design vocabulary and branding
Simple forms and "egg" shapes easy recognizable, built familiarity and brand
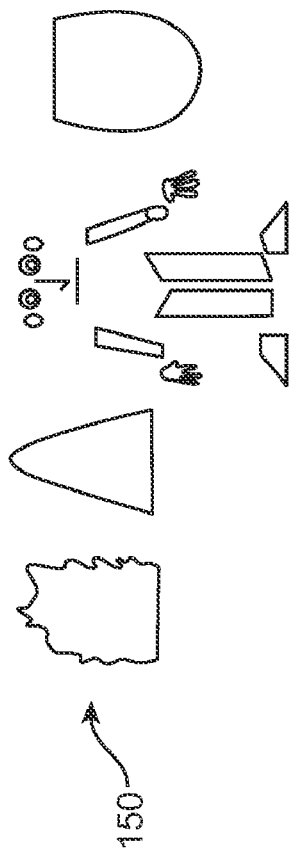
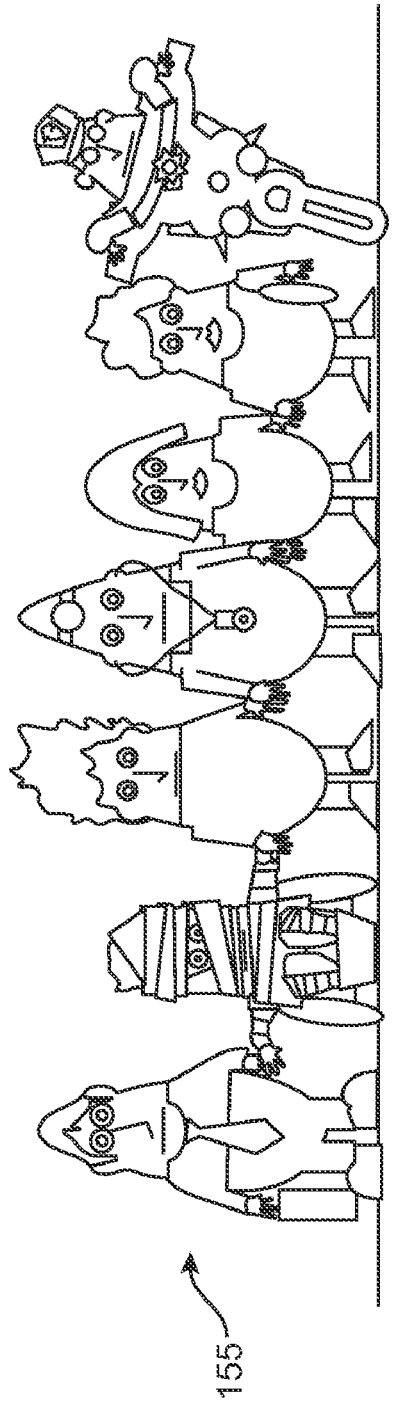
FIG. 1b

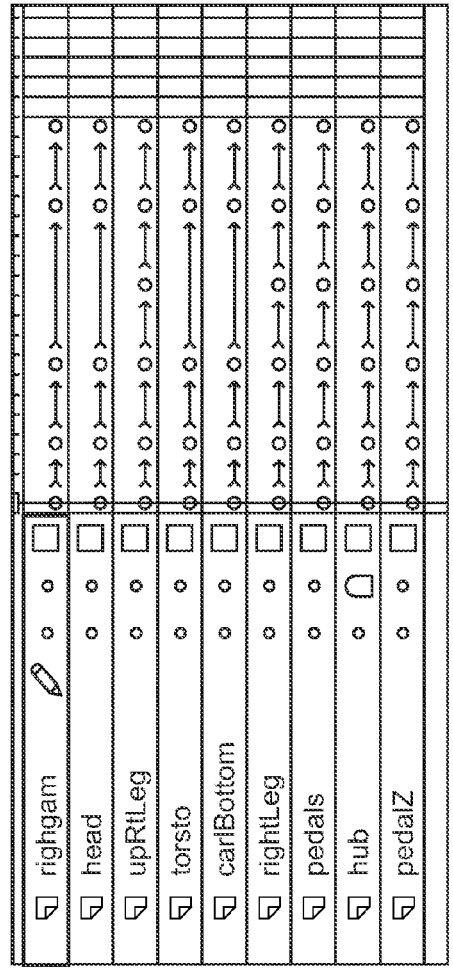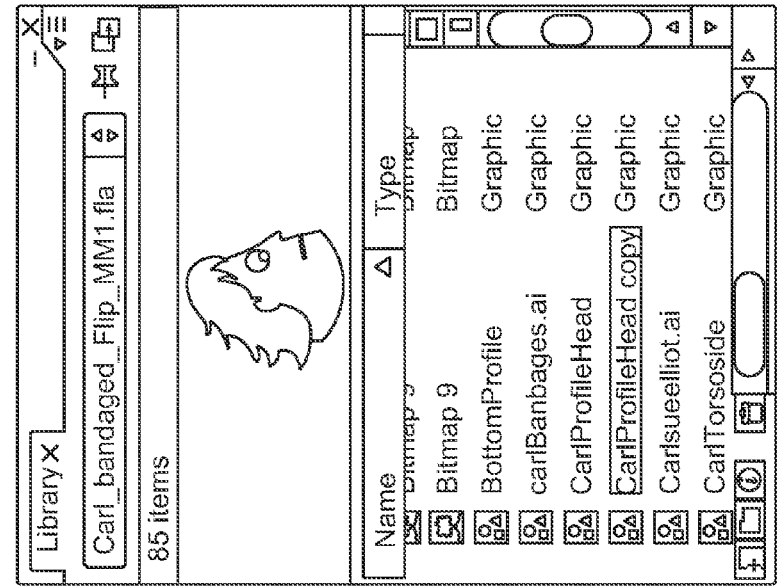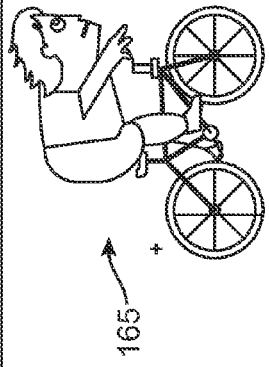
FIG. 1c

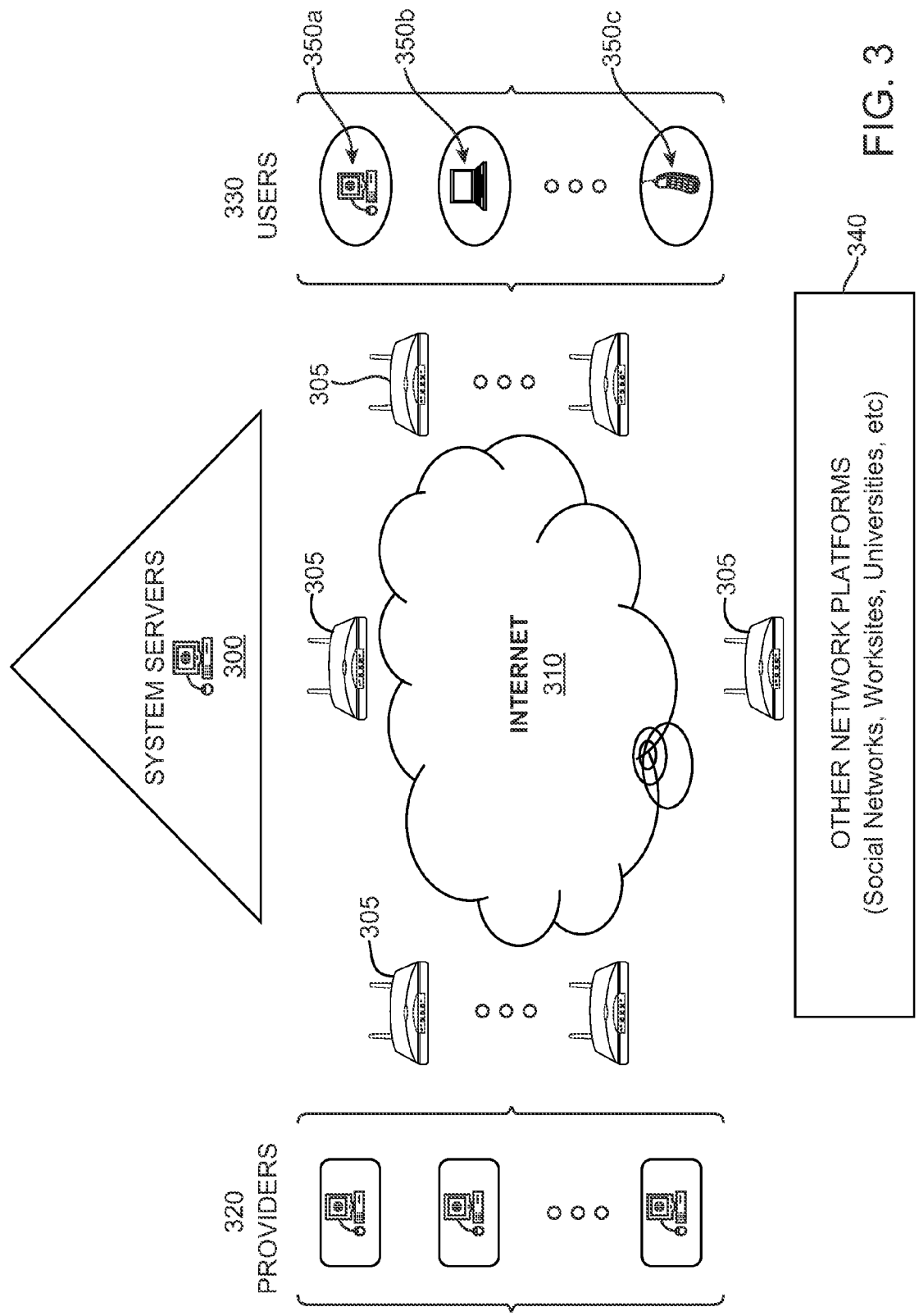

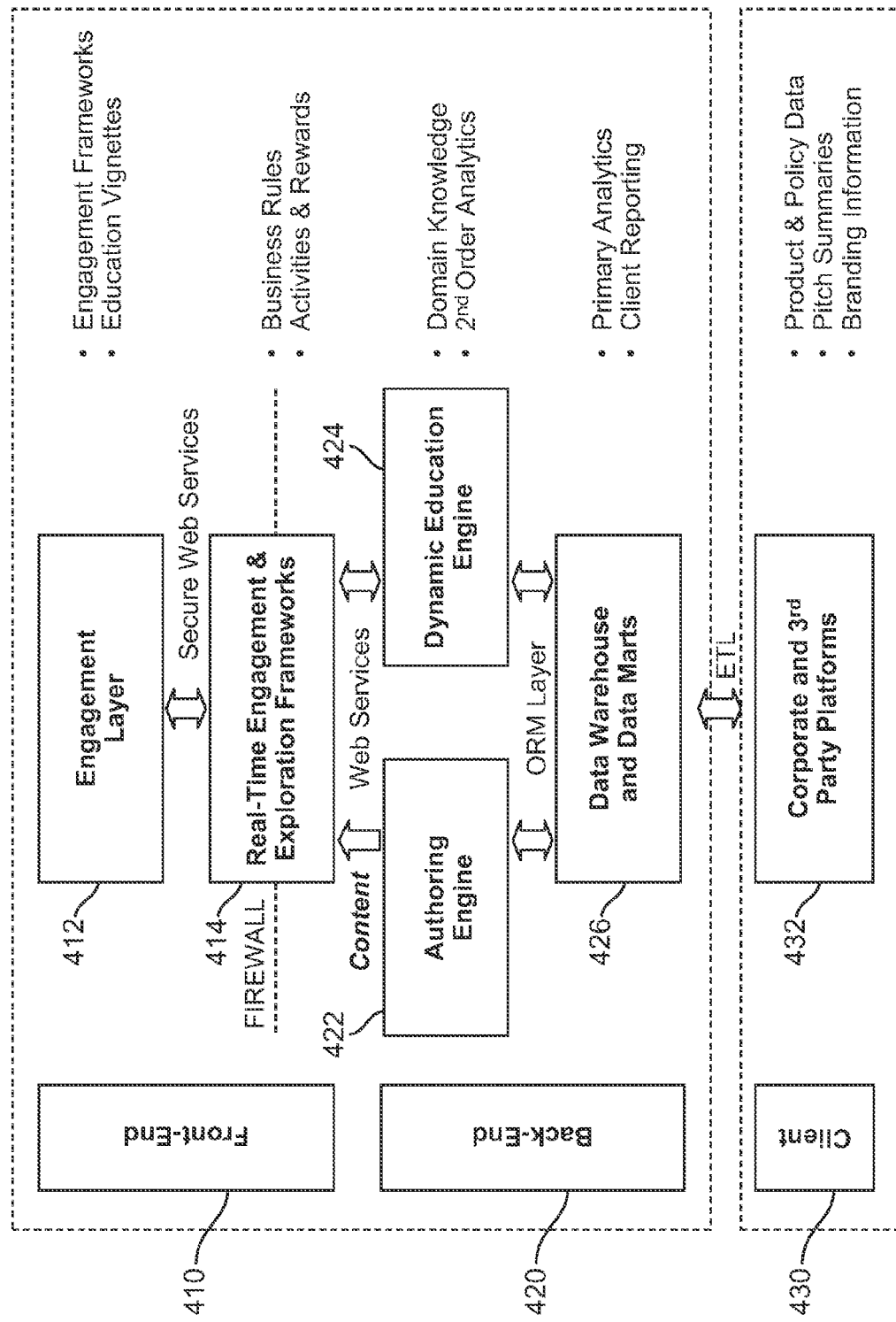

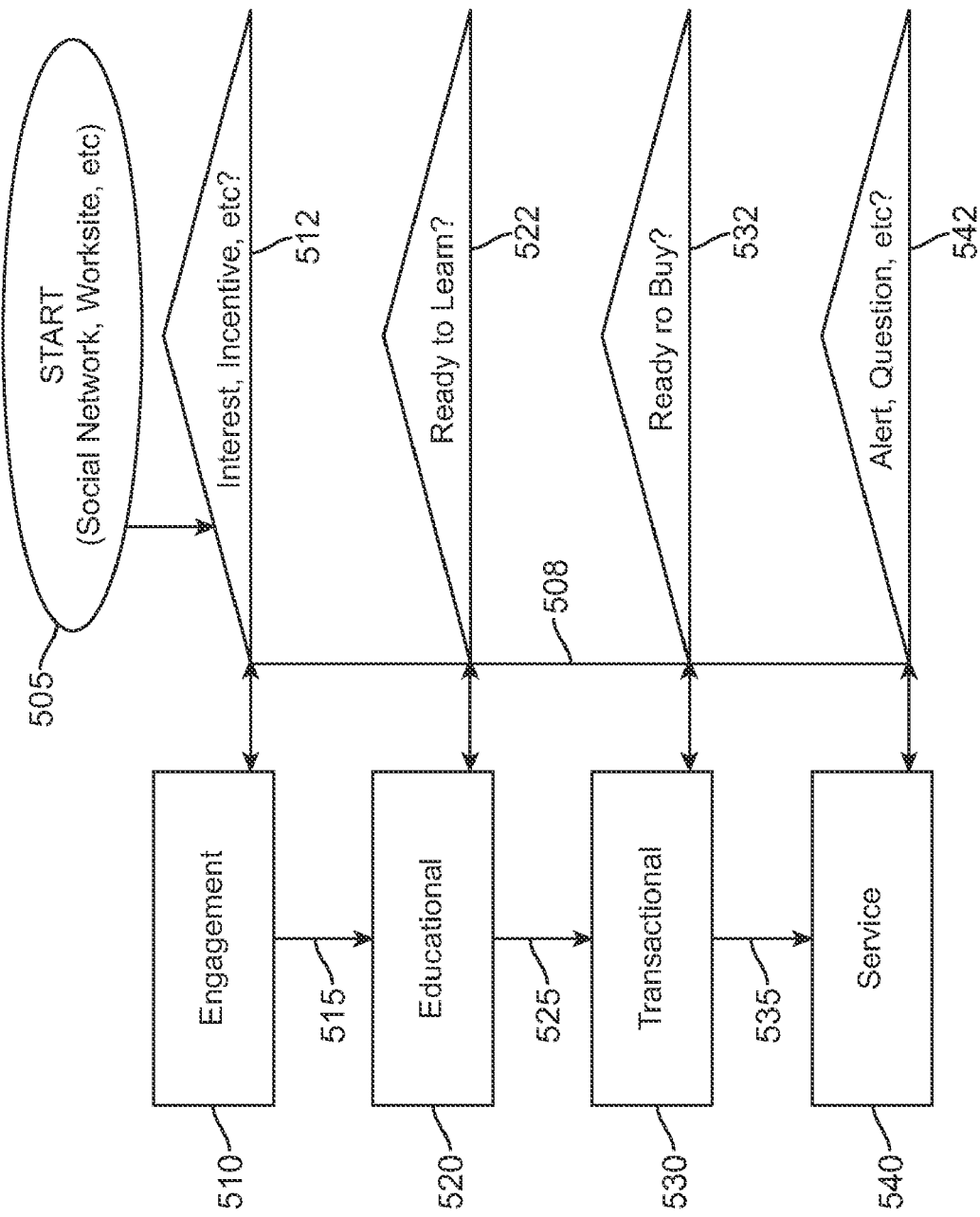

Branded cartoon "agent" as a desktop widget that is connected to the Internet.

•Alerts user about new right for me products

•Alerts user that it's time to switch to different coverage or plan.

• Alerts user to others in the community that might have questions or advise.

• Can be used (judiciously) for cross sell of related products (clothes, cars, etc.).

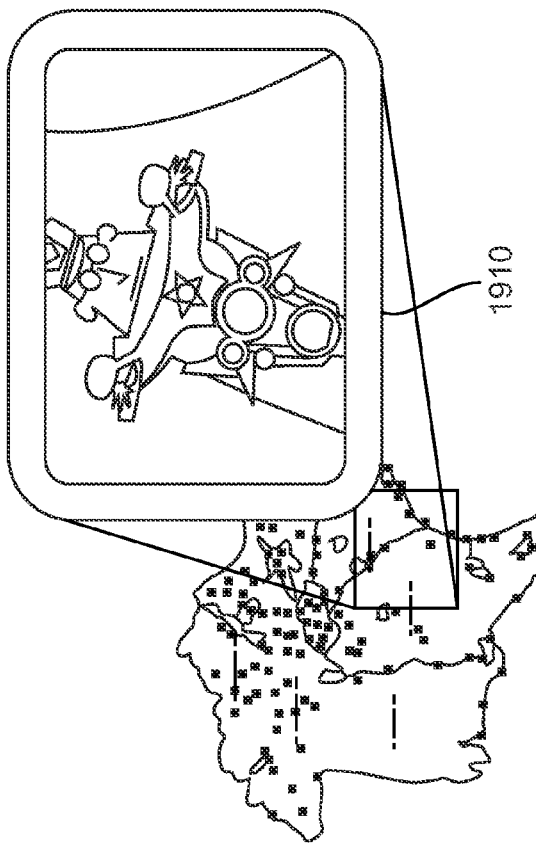
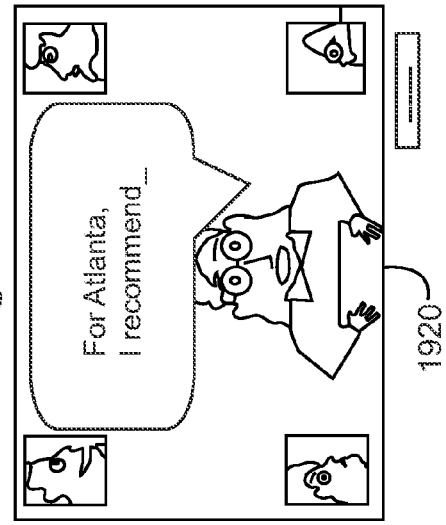
Users can zoom in on a map to see the kinds of BAD THINGS that are likely to happen in a particular geographical region.
"Harvey" the agent can then suggest a plan tailored to your geographical region.
FIG. 19

Trustnode
An entertaining way to learn about insurance 2118

First you will choose one of the learning modules in the menu...

◀ previous | play | next ▲

Login, take a quiz, earn tnodes!
Email [ ]
Password [ ] Sign in
☐ remember me  ☐ forgot password?

HOME
Learning Modules
Introducing the Potters
Long Term Disability
Long Term Health
Individual Medical
Life Insurance
ENROLLMENT

[○ ○] Sign Up Now
and earn 50 TNodes
e-mail [ ]
Username [ ]
Password [ ]
Confirm Password [ ]
Birthdate [Y▼][M▼][D▼]
Begin Advertising

LOGO logo
use your Tnodes
to get up to 20% off
Learn more

Bad things can happen
SCARY FACTS
Did you know that:
1 to 7 people will suffer disability lasting 5 years or longer before the age of 65
Disability is a leading cause of home fore-closures
Four out of five disabled older adults are cared for in the home. Children, primarily daughters, are most often the ones providing that care.

[○ ○] What are Tnodes?
Tnodes are virtual currency...
Earn TNodes by getting smarter about insurance.
Use TNodes to get discounts on your favorite brands.

FIG. 21iii

PERSISTENT SALES AGENT FOR COMPLEX TRANSACTIONS

BACKGROUND

1. Field of Art

This application relates generally to the field of online sales and distribution systems and, in particular, to an interactive system that facilitates complex transactions by employing branded characters that persist across multiple platforms throughout the various stages of such transactions.

2. Description of Related Art

Since the advent of the Web in the early 1990s, online transactions conducted via the Internet have continued to grow at exponential rates. Virtually every conceivable product or service is currently available online, whether directly to consumers or among businesses at various stages of the distribution chain.

As technology has improved, online transactions have proliferated due to the development of transaction processing infrastructure, greater bandwidth and storage capacity, as well as improved interactivity and the use of high-quality graphics, animation and even video to showcase products and services online. For example, digital products such as software and music can easily be purchased and downloaded today from a vast array of online merchants. Transactions involving "physical" products, such as clothes and furniture, are not much more complex, with online shipping arrangements replacing the download process. In addition, many services are performed online today with relative ease, from learning how to type to renewing a vehicle registration.

Nevertheless, certain types of products and services are less amenable than others to effective online distribution. Transactions involving such products and services are relatively complex in that they require consumers not merely to compare features and prices, but also to educate themselves to determine not only which product or service to purchase but whether or when to purchase a particular product or service based upon personal profile and other information specific to consumers and their families. For example, insurance products and other financial services often involve a host of other factors beyond features and prices, such as differing payouts across a wide range of hypothetical future scenarios.

It is well known in the insurance industry, for example, that one of the key obstacles to selling insurance products is the high cost of customer acquisition. Whether employing a direct sales force or independent agents and brokers (or a combination of the two), insurance carriers face the problem of leveraging relatively expensive insurance agents and brokers among prospective customers who span a wide range of demographic profiles and who, to put it simply, do not trust insurance salesmen. Young adults represent a particularly difficult demographic in that they are less likely to think "long term," and rarely purchase optional insurance coverage beyond the basic health plan offered by their employer or policies required for regulatory reasons, such as auto insurance.

Moreover, insurance products are inherently complex, which increases not only the cost of customer acquisition but also the length of sales cycles. Demonstrating the value to a prospective customer of a particular insurance product, such as a long-term disability policy, often requires obtaining personal information about the customer, as well as educating the customer about the potential benefits provided by the policy in various future scenarios. An insurance agent might be very knowledgeable about the details of long-term disability policies, and yet know next to nothing about term life insurance. Servicing multiple areas of expertise requires a greater number of agents and brokers, or at least ones with greater expertise, further increasing customer acquisition costs.

It is not surprising then that insurance carriers, as well as agents and brokers, are looking to the Internet for ways to leverage limited human resources to target large numbers of prospective customers with an array of complex products requiring multiple areas of expertise. For example, companies such as Univers Workplace Solutions of Hammonton, N.J. and Impact Technologies of Charlotte, N.C. provide technology that assists employers and financial service providers in automating certain aspects of the sales process for employee benefits and various financial services, including certain insurance products. In 2007, Assicurazioni Generali SpA, a major European insurer, announced the opening of its Generali Virtual island in Second Life, staffed with live agents (though this does little more than mimic how insurance is sold today).

Yet an automated solution to this problem is hampered by the inherent complexity of these products and their relatively long sales cycles. While attempts have been made to employ artificial intelligence (AI) technology to simulate intelligent agents that can provide automated responses to user queries (see, eg, U.S. Pat. No. 7,103,585) or perform sales transactions (see, eg, US Pat App No 20010032140), no fully automated solutions to selling complex insurance and other financial service products have yet emerged.

Moreover, as noted above, prospective customers do not trust insurance salesmen and do not typically initiate the process of searching for insurance products to purchase. They are often unaware of the need for such products and unwilling to take the time to be educated as to when they should purchase a particular product. LIMRA (the Life Insurance Marketing and Research Association) routinely gathers statistics that illustrate the decline in the purchase of life insurance policies, for example, citing many of these same reasons and noting that prospects need proactive contact to motivate them to purchase policies.

Companies such as Virtuoz of San Francisco, Calif. and Oddcast Inc of New York, N.Y. have sought to employ lifelike avatars to appeal to customers and provide a more "human" experience during what is otherwise an impersonal automated sales process. Other companies, such as Millions of Us LLC of Sausalito, Calif. have utilized virtual worlds, online gaming and social media as part of immersive brand marketing campaigns designed to create brand awareness.

Yet, such technology has not been employed to engage consumers throughout the entirety of a complex sales and distribution process. What is needed is a system that can attract prospective customers and retain them throughout the various stages of a long and complex sales cycle.

SUMMARY

To address the problems discussed above, various embodiments of the present invention employ virtual characters that persist across multiple network platforms throughout the various (sometimes overlapping) stages of a complex transaction. These characters serve initially to engage prospective customers, for example, with a "before and after" vignette, a game or other form of interactive entertainment designed to get a customer's attention while illustrating more subtly the potential benefits of various products and services.

To attract younger adults, such as those aged 18-40 (Generation X and Generation Y), branded cartoon characters can be shared across a variety of different network platforms, including viral social networks such as Facebook, MySpace or LinkedIn (for more business-oriented consumers), in addition to employer worksites, universities, and member-based organizations, as well as via email or various websites. The viral nature of social networks, coupled with more traditional online services such as email, enables these characters to proliferate exponentially across multiple network platforms, thereby greatly increasing sales prospects while reducing the costs of customer acquisition.

Combining interactive and engaging forms of entertainment with the viral nature of social networks provides an opportunity for innovative targeted marketing solutions. In the context of complex transactions, such as those in the insurance and financial services industry, branded characters tell stories based on real-world actuarial and other industry data to engage customers in personalized interactions that entertain, educate and help them buy products that are appropriate for them. Such transactions occur in a low-pressure environment in which customers can make the decision to purchase a particular product or service when they are ready. Moreover, cartoon characters acting out a "before and after" scenario in an entertaining context reduce the angst often associated with topics such as chronic injuries or life and death.

Even at this early stage of engagement, consumers are, in one embodiment, afforded the opportunity to customize a game or vignette, or simply select from among various choices, providing valuable data as to consumers' preferences. The process of capturing consumer information (individually and in the aggregate) begins early, enabling the distribution of "leads" to insurers who can then target prospective customers more effectively.

Having engaged prospective customers on one platform (eg, a Facebook page where consumers encounter a game or vignette forwarded by one of their friends), consumers can click on a link that brings them to another platform (eg, a website), where, in one embodiment, they encounter some of the same characters that persist into an educational stage in which they receive information in an interactive fashion. In this educational or "lead management" stage, consumers, rather than simply fill out forms, answer questions as part of a learning module, a quiz or a game, in some cases without realizing that they are learning about particular products or services that might be relevant to their personal demographic profile.

Longer vignettes include a complete "click-through scenario" (covering, for example, a discrete topic such as long term disability) in which consumers interact with some of the same branded characters that initially engaged their interest. Over time, consumers gradually become more familiar with these characters as they are repurposed, for example, from appearing in an engaging game on a Facebook page to being one of a family of characters that suffers a serious injury in a longer educational vignette, illustrating how common accidents can occur.

Even these longer vignettes serve to reduce significantly the viscosity of information presented to consumers, by converting otherwise dense statistics into smaller chunks of information (eg, a simple interactive before-and-after "accident" scenario) which convey important concepts that can readily be understood. In some embodiments, characters can be badged or otherwise personalized to increase a consumer's empathy with or affection (or lack of affection) for a particular character. Over time, consumers may come to identify with one or more of these characters.

This interactive process can include a targeted mutual information exchange, in which consumers are gradually educated regarding the attributes and potential benefits of particular products or services, while providing personal profile information that is used both individually and in the aggregate to offer consumers more personalized service.

Consumers also can initiate questions to learn more about or clarify the features of a particular product or service. By employing a semi-automated transaction model, many consumer questions can be answered from predetermined vignettes or automated answers generated by an expert system, and presented to consumers via a virtual agent character. Other questions may require the assistance of a live human expert, who can be present "behind the scenes" without the user even knowing that their question required the assistance of a human. In other embodiments, a live chat or voice session can be initiated to enable sufficiently direct interactivity between the consumer and one or more live experts.

In some embodiments, the system translates automated and human responses to drive the branded characters' audible and visual responses presented to system users, including textual content, speech patterns and even gestures or body positions. For example, in one embodiment, the system performs natural language analysis upon user questions and responses, interprets automated and live expert responses, and then (aided by user input, customization parameters and domain knowledge) generates appropriate responses for multiple characters. Some characters provide textual responses, deliver speeches, and exhibit animated gestures indicating awareness of and reactions to other characters, including consumers using the system.

In other embodiments, programmable objects are combined, in accordance with industry and other knowledge-based rules, to generate characters and other elements that are rendered to exhibit/simulate particular behaviors. For example, simple component cartoon objects are combined to generate a variety of different virtual characters, including men and women, children and adults, some of which are members of the same family and exhibit the results of a particular medical condition or a disabling injury. Certain characters interact with other objects, such as mobile phones, bicycles or cars, and exhibit risky behaviors such as texting while driving. Rules based upon industry or other knowledge correlate a particular behavior with a likely outcome, such as an accident, in an effort to illustrate the potential benefits of a product or service, such as a particular insurance policy.

Moreover, these virtual characters and other programmable objects are also correlated, in one embodiment, with a particular concern of a prospective customer, based upon demographic/profile or psychographic/behavioral characteristics of that prospective customer. To provide a truly consumer-driven experience, the system of the present invention, in addition to simply offering prospective customers a selection of choices, also associates those choices with virtual characters and other programmable objects that represent likely concerns of a customer exhibiting a particular demographic or psychographic characteristic. For example, because younger users naturally question the need for insurance, they are more likely to select the "Why do I need insurance?" question, particularly if that question is associated with a young virtual cartoon character to which they can relate. An animated virtual character is more engaging than a simple textual link. Similarly, a user that has already demonstrated a risk-taking tendency (eg, by previously selecting and repeatedly playing a game or other application involving high-risk behavior) is more likely to seek information relating to the consequences of risky behavior (such as the scope of coverage of a disability policy), whereas a more meticulously careful individual is more likely to seek detailed information or ask questions of a live agent.

Whatever correlations the rules dictate, the result is that prospective customers are more likely to be engaged by characters to which they can relate, and which represent associated concerns that they are likely to have, based at least in part upon their particular demographic or psychographic characteristics. Moreover, because cartoon characters mimic the way in which the human mind actually stores information (eg, by exaggerating and simplifying features, and removing extraneous detail that would be present in more "lifelike" images), they are distinctive and readily recognizable, and are thus an effective medium for communicating relatively complex educational concepts (such as insurance). For example, when consumers observe a particular character sustaining various injuries in different types of accidents, they begin to associate that character with the conceptual issue being addressed—eg, "Why do I need insurance?"

Over time, consumers build up a level of trust in these recurring characters that would not be present in a typical physical (or even online) sales scenario, particularly as they obtain information in a low-pressure sales environment. In some embodiments, these cartoon characters age over time, along with the consumer, and otherwise adapt to a particular environment. In certain embodiments, branded cartoon characters are employed intentionally to appear less human than more "lifelike" 3D avatars, which can serve to avoid false expectations of the degree of intelligence expected even from semi-automated systems. Trust can be lost quickly if too much reliance is placed on lifelike characters that are driven solely by artificial intelligence technology, as a character's lack of actual human intelligence can readily become apparent.

A recurring semi-automated virtual agent can thus become a "trusted advisor" that educates consumers over time, improving consumer awareness and understanding of the products and services offered by one or more providers. This virtual agent character can play an active role, initiating interactions with consumers to present a pre-packaged vignette designed to educate them, as well as an interactive role, in which consumers can ask and obtain answers to specific questions and engage in a dialogue initiated at times by consumers as well as by their trusted virtual agents. Moreover, the system itself can be reactive, in that it can respond immediately to interruptions, such as a consumer electing to leave one vignette for another (eg, to learn about a different product), or to leave the system entirely and return at another time without losing their place (and all related state information). Finally, the system of the present invention can be proactive, in that consumers' needs can be anticipated, with appropriate vignettes and related information being provided in a personalized fashion based upon individual and aggregate consumer profile data as well as previous interactions with the system.

This process can in essence become a long-term relationship with a customer over a lifetime, in which multiple products or services are purchased over time. Moreover, one or more trusted advisors as well as other associated characters can persist throughout this long process or relationship.

In one embodiment, the system of the present invention maintains, in industry-specific knowledge bases (employing well-known database techniques), a large array of information relating to products and services offered by multiple companies that changes over time, as well as personal demographic and profile information relating to large numbers of consumers that is also acquired and changes over time. Well-known expert system and artificial intelligence techniques are also employed to facilitate the interactive nature of the system, coupled with (sometimes transparent) live text chat, as well as other media (including speech, animation and video among others).

Captured data is used in a myriad of ways, including development and refinement of new products and services by affiliated providers and partners. Moreover, such data includes not only purchasing trends, but other behavioral statistics as well (such as the frequency with which particular scenarios are viewed, correlated against consumer profiles), collected at various stages of the process. In one embodiment, the system "feeds back" such behavioral habits to prospective customers in the middle of a vignette, indicating, for example, that "82% of the people viewing this particular product were in your age group, and 28% of those purchased some form of coverage." The success of a particular educational vignette can also be measured statistically over time, providing valuable information that can be used to refine the system.

In addition, to create "bonded loyalty," the system, in one embodiment, offers related products and services, as well as incentives, advertising and various other promotions. Discounts and other incentives are offered to consumers throughout the process not only to promote the purchase of core or affiliated products and services, but also to encourage continued participation in the various stages of the process.

For example, in one embodiment, consumers develop and customize their own episodes or vignettes, by selecting characters, plots and settings. These custom vignettes, as well as consumers' answers to quiz questions, are rated and published widely, such that consumers earn points and other prizes (eg, "T-Nodes") for highly rated answers and achieve various levels of expertise. These and other incentives are offered as consumers work their way through vignettes.

T-Nodes are, in one embodiment, a form of electronic currency that users earn as an incentive for progressing through a game, a learning module, an episode, vignette or other system experience. Such activities generate a wealth of data that providers use for further targeted promotions, as well as to refine their portfolio of products and services. Users are authenticated (eg, via a simple user name and password in one embodiment), and can leave the system at virtually any time and resume where they left off with their associated profile, behavioral and other information (including their T-Node balance) intact.

Consumers can redeem T-Nodes for merchandise or discounts on core or affiliated products (such as a discount on an insurance policy or a mobile phone), as well as for real currency (eg, to be applied to open a checking or savings account). The system stores and regularly displays consumers' T-Node balances, thereby encouraging them to progress through the educational process (earning additional T-Nodes) and become informed consumers who are more likely to be "ready to buy" appropriate products and services over time.

At various stages throughout the process or relationship, consumers are afforded the opportunity to purchase particular goods or services. In some embodiments, consumers can elect to enter this transactional stage of the process on their own initiative, though they may first seek to ask questions or obtain additional information before deeming themselves ready to transact. During this transactional stage, product or service offers are presented, enrollment information is captured, and events (eg, blood tests) are scheduled, while the dialogue and mutual exchange of information continues. In addition, the system integrates such information with providers' back-end systems and performs audit checks and other "behind the scenes" functions.

In certain embodiments, these transactional opportunities are limited to scenarios in which the system deems consumers to be "ready" to purchase a particular product or service. For example, are they sufficiently educated to make a particular decision, have they completed the necessary prerequisites (such as a blood test), and are they a good match to benefit from this decision? Rather than employ a "hard sell" approach, which has proven ineffective for such complex transactions, the system of the current invention filters out consumers for which such transactions may not be appropriate at a given time, thereby maximizing consumer loyalty and trust from which providers will ultimately derive greater benefit over the long term.

Even after completing a transaction (eg, purchasing a particular insurance policy or enrolling in a particular benefits plan), a customer's relationship with the system does not end. The system merely proceeds to another stage of the relationship in which it services the needs of customers over time. Certain embodiments of the system, for example, alert customers to the availability of a new or better product or service, perhaps due to a customer reaching a particular age and becoming more likely to purchase such product or service. The system enables the "cross sell" of other products and services (eg, from a different provider or a partner, such as an employer or advertiser), eg, based upon collaborative filtering algorithms applied to aggregate consumer data.

Existing marketing channels can also be expanded. For example, in one embodiment, when the system becomes aware that an employee has changed jobs (eg, due to termination from the prior employer's health plan), it alerts the employee (eg, via email or a desktop widget) of additional opportunities, such as another health plan from a different provider, even if the new employer is not affiliated with the system.

By employing persistent branded characters to maintain customer relationships, the system, in one embodiment, learns of particular events (eg, marriage, change of employment, birth of a child, etc) that render a specific product or service of particular relevance. Such alerts, including offers of financial planning advice, discounts and other incentives, and targeted advertisements, are delivered in a myriad of different ways, including email, mobile phone text messages, or even via a widget on the user's computer desktop. General-purpose alerts are broadcast widely, while others are distributed within more limited and targeted domains (based, for example, upon aggregate data or a particular consumer's personal profile or behavioral information).

In one embodiment, timeline-based vignettes (based on actuarial or other industry data) are triggered at various stages of a consumers' life. Such vignettes are delivered via a desktop widget, alerting consumers and their families to appropriate products based upon their age, as well as specific events in their lives. Such a life-planning tool illustrates the need for certain products and services at particularly relevant times.

In another embodiment, geographically-based vignettes are distributed in a similar manner to consumers based in particular geographic regions, to which targeted products and services are applicable. A trusted agent, for example, recommends different products to different consumers based upon their geographic location. Certain products might only be available in specific geographic regions, while others may be more cost effective in particular geographic regions due to the likelihood of certain events, such as earthquakes or hurricanes.

As noted above, these various stages of a complex transaction, and of the relationship between a provider and consumer (eg, engagement, educational, transactional and service, in one embodiment) can overlap. At any given time, and even with respect to a particular product or service, a consumer can be in multiple different stages of the process of this complex sales cycle.

The providers of such products and services benefit from the scalability of the system in that fewer agents, brokers, experts and other humans can leverage more products and services (requiring greater expertise) among larger numbers of consumers. The cost of customer acquisition can be greatly reduced as providers monetize knowledge about consumers across all aspects of a long-term relationship. Microsegmentation is made possible by leveraging expertise within a single character or trusted advisor that would otherwise (or still might "behind the scenes") require multiple live human experts.

Moreover, the branded characters are portable across different platforms (such as via email or viral social networks), enabling live human agents to increase their sales volume exponentially, resulting in a far broader reach than any human agent could attain using existing marketing approaches. A viral social network, for example, serves as a highly effective referral network, further promoting brand affinity. Consumers recommend popular vignettes to their friends, while trusted advisors (virtual agent characters) also appear on such social networks to recommend a particular episode or vignette to a selected group of prospective customers (eg, based on aggregate data and collaborative filtering techniques).

These features enable the system to reach new markets and to enhance the cross-selling of existing products and services among different providers and others in the distribution chain. For example, a company can leverage a social network such as LinkedIn to offer a core health plan to its employees, while multiple other providers can leverage the system to offer those employees additional optional benefits.

As these characters become trusted advisors and familiar "family friends," retention rates among providers also increase dramatically, particularly among those that utilize the system to service their clients and maintain long-term relationships. Moreover, to the extent the system employs automated agents and associated characters, the system improves compliance, as consistency of information is enhanced and the likelihood of misinformation decreases. In one embodiment, the system maintains audit trails, detailing when particular information is disclosed to particular users, which enables the system to control and more easily distribute relevant information (including changes in regulations) to prospective and existing customers.

Consumers benefit as their awareness of products and services improves and they are better able to make appropriate purchases when they are ready. Instead of seeking to avoid high-pressure insurance salesmen, they are engaged and entertained in a fun, interactive and personalized experience with trusted advisors with whom they can form long-term relationships.

BRIEF DESCRIPTION OF DRAWINGS

Following is a brief description of the drawings that illustrate various embodiments of the present invention and which are described in greater detail below:

FIG. 1b illustrates an embodiment of programmable objects that the system combines to generate virtual characters and other elements that are rendered to exhibit/simulate particular behaviors;

FIG. 1c illustrates how the system, in one embodiment, generates virtual characters and other objects, and simulates their behaviors and interactions, in accordance with knowledge-based rules;

FIG. 3 is an architectural embodiment of the system functionality that illustrates how key system players interact with one another over various network platforms;

FIG. 4a is a block diagram of an embodiment of key architectural components of the system of the present invention;

FIG. 5 is a hybrid flowchart/state machine diagram of an embodiment of key stages of a complex transaction, that illustrates how users of the system transition among these stages.

FIG. 19 illustrates an embodiment of a "geographic navigator" that portrays potential events (and solutions) that occur across different geographic regions, based upon regional, demographic and other data;

DETAILED DESCRIPTION

Before describing the system architecture of the present invention, it is important to emphasize, as noted above, the semi-automated nature of the system as well as the use of branded cartoon characters, as opposed to more "lifelike" 3D avatars and other virtual characters. Keeping users engaged throughout the various stages of a complex transaction is a non-trivial task. If users' expectations are raised too high, they can easily become disillusioned when reality strikes. For example, if a virtual sales agent appears "human," but answers a user's questions with overly simplistic canned responses, the user may well lose whatever trust was previously established.

Figure 1A:
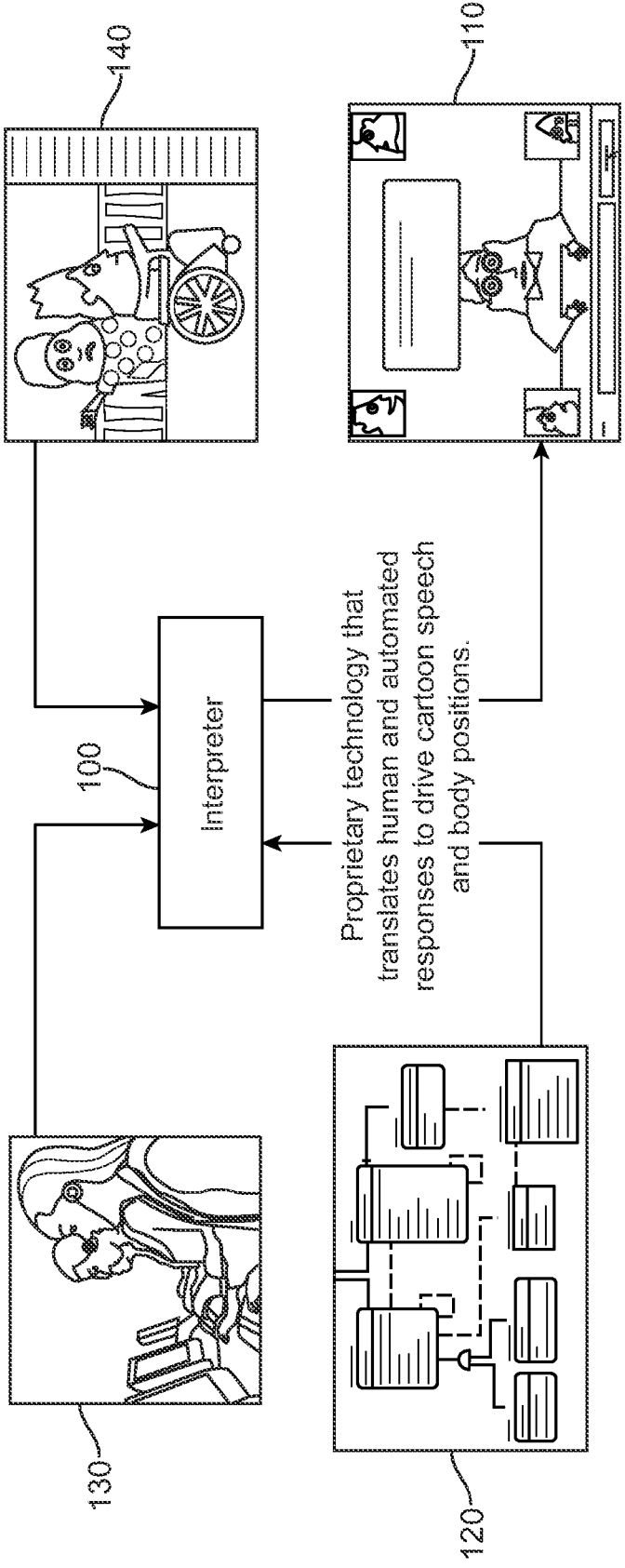
FIG. 1a illustrates an embodiment of an interpretive engine that drives the user interface of the system of the present invention.

FIG. 1a illustrates an embodiment of interpretive engine 100, which manages the interaction between users and the system, as represented by virtual sales agents and other branded cartoon characters. For example, during an interaction 110 with a virtual sales agent or other characters, users might pose questions, some of which can be answered by an automated engine, such as real-time AI engine 120 (based on domain knowledge, user input, etc), but others of which might require the assistance of a live human expert or agent 130. In one embodiment, users also encounter these characters via predefined episodes, vignettes and learning modules 140, in which the characters' appearance, dialogue or other characteristics can be personalized utilizing AI engine 120.

Regardless of the scenario, the responses generated by AI engine 120 or live agent 130 are interpreted by interpreter 100 to drive the characters' animation, gestures, textual or spoken dialogue and other forms of presentation to the user. In this embodiment, interpreter 100 also interprets users' questions, responses and other input, as well as other aspects of the system's user interface. The result is a form of "one-stop shopping" in which users encounter a familiar interface which they come to trust over time, as they watch a myriad of "bad things happen" to the same family of characters and seek and receive advice from the same virtual sales agent. The phrases "Bad Things Happen" and "Bad Things Can Happen" are trademarks of TrustNode, Inc., and are used interchangeably throughout this document.

In one embodiment, virtual cartoon characters are generated from core components, such as component objects 150 illustrated in FIG. 1b. Complete virtual characters 155 are generated by assembling component objects 150 into various different arrangements. In addition to the virtual characters themselves, other objects (eg, cars, bicycles, mobile phones, etc) are also generated from these component objects 150. By utilizing particular common component objects 150, the resulting virtual characters 155 and other objects, in one embodiment, bear a "family resemblance."

In addition to generating and rendering the appearance of these virtual cartoon characters and other objects, one embodiment of the system also causes such objects, including their component parts, to exhibit or simulate various behaviors. A component "parts library" 160, illustrated in FIG. 1*c*, includes various "programmable objects" that are combined not only to generate the appearance of a more complex object (such as a virtual cartoon character or automobile), but also to associate particular behaviors with one or more other component parts (eg, parts of a virtual character or other object) from parts library 160. Resulting object 165, for example, is a virtual character exhibiting a distinct appearance while riding a bicycle. When that character is riding that bicycle, various components of the character and the bicycle are exhibiting particular behaviors, such as the character's legs moving in particular directions, the wheels of the bicycle turning clockwise, and the entire character and bicycle progressing along a particular path.

The resulting behaviors of the virtual characters and other objects can be quite complex, despite being assembled from relatively simple component parts. Yet, the virtual characters and other objects are still recognizable even when exhibiting simpler behaviors or no behavior at all (eg, a still image of a character's head which still retains a distinct appearance).

Moreover, the interactions among the virtual characters and other objects also affect their behavior, as well as their appearance. For example, a character could be texting on his mobile phone while riding his bicycle, which would increase the likelihood of his being hit by a car, after which he could appear bandaged in a hospital bed. These interactions are, in one embodiment, determined based upon a set of rules that dictate the likelihood that certain events will occur, and the consequences resulting therefrom. Such rules rely upon industry data, such as statistics regarding the likelihood of certain behaviors resulting in particular consequences (eg, the likelihood that smoking N packs of cigarettes per day will lead to lung cancer by a particular age).

In another embodiment, these rules correlate the appearance and behavior of particular virtual characters or other objects with likely concerns of prospective customers, based upon their demographic or psychographic characteristics. For example, prospective customers, after having inquired about a particular insurance product (or insurance generally), could encounter slide 170, illustrated in FIG. 1*d*, in which they are faced with a series of alternative choices relating to their insurance needs.

Figure 1D:
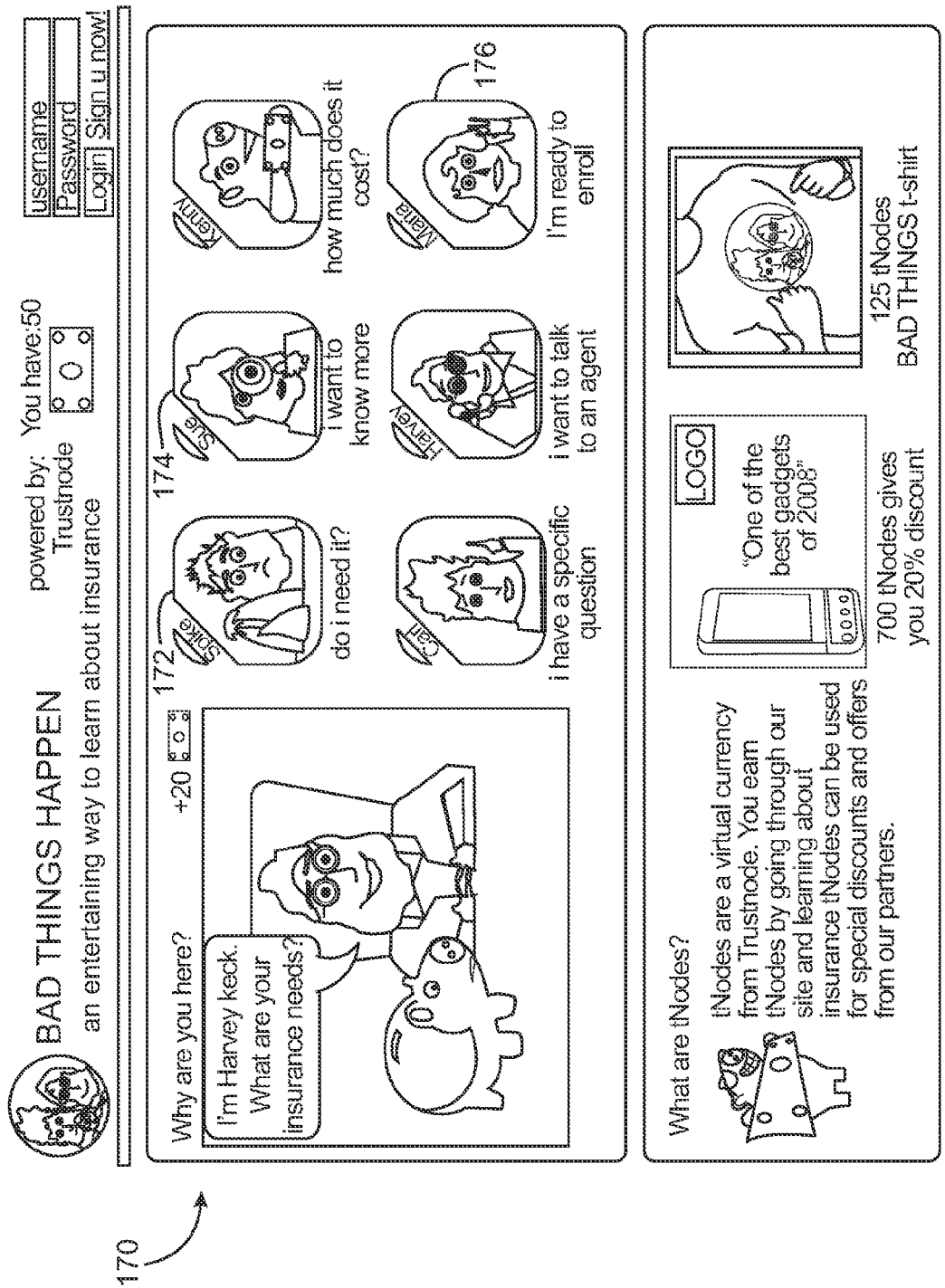
FIG. 1d illustrates how the system, in one embodiment, correlates virtual characters and other programmable objects with likely concerns of prospective customers, based in part upon their demographic and psychographic characteristics.

While any consumer-driven system might offer prospective customers multiple choices to address their particular concerns, it should be noted that the choices presented in FIG. 1*d* are associated with particular virtual characters exhibiting particular behaviors. Moreover, the appearance and behavior of such characters, and the associated concerns they represent, are designed to relate to particular prospective customers—eg, those exhibiting particular demographic or psychographic characteristics.

For example, industry data indicates that younger consumers are likely to question the need for insurance. If a particular prospective customer suggests such a concern during a prior interaction with the system (eg, by identifying a relatively risky profession in response to a prior question, such information is utilized, in one embodiment, to dictate the appearance (as well as the setting and animated behavior) of a corresponding virtual character. A young male is more likely to relate to character 172, which, in another embodiment, dictates its placement as the first choice (ie, one representing the concern that such a prospective customer would most likely have). Another prospective customer whose demographic profile (or prior behavior in interacting with the system) indicates a greater likelihood of wanting more information, would be more likely to select virtual character 174, the selection of which links to an interactive learning module designed to address such concerns. Still other (perhaps more impulsive) prospective customers may already be "ready to enroll" and select virtual character 176.

In this manner, prospective customers are not only provided with consumer-driven choices (such as obtaining additional information, speaking with a live expert or completing a transaction) at virtually any point in the process, but they are also "guided" by the system toward addressing those particular concerns, as suggested by their demographic profiles and psychographic behavior. As a result of this more targeted and personalized experience, such prospective customers are more likely to be sufficiently educated and "ready to buy" at the appropriate time, as opposed to being turned off by and rejecting an overly aggressive hard-sell approach.

Figure 2:
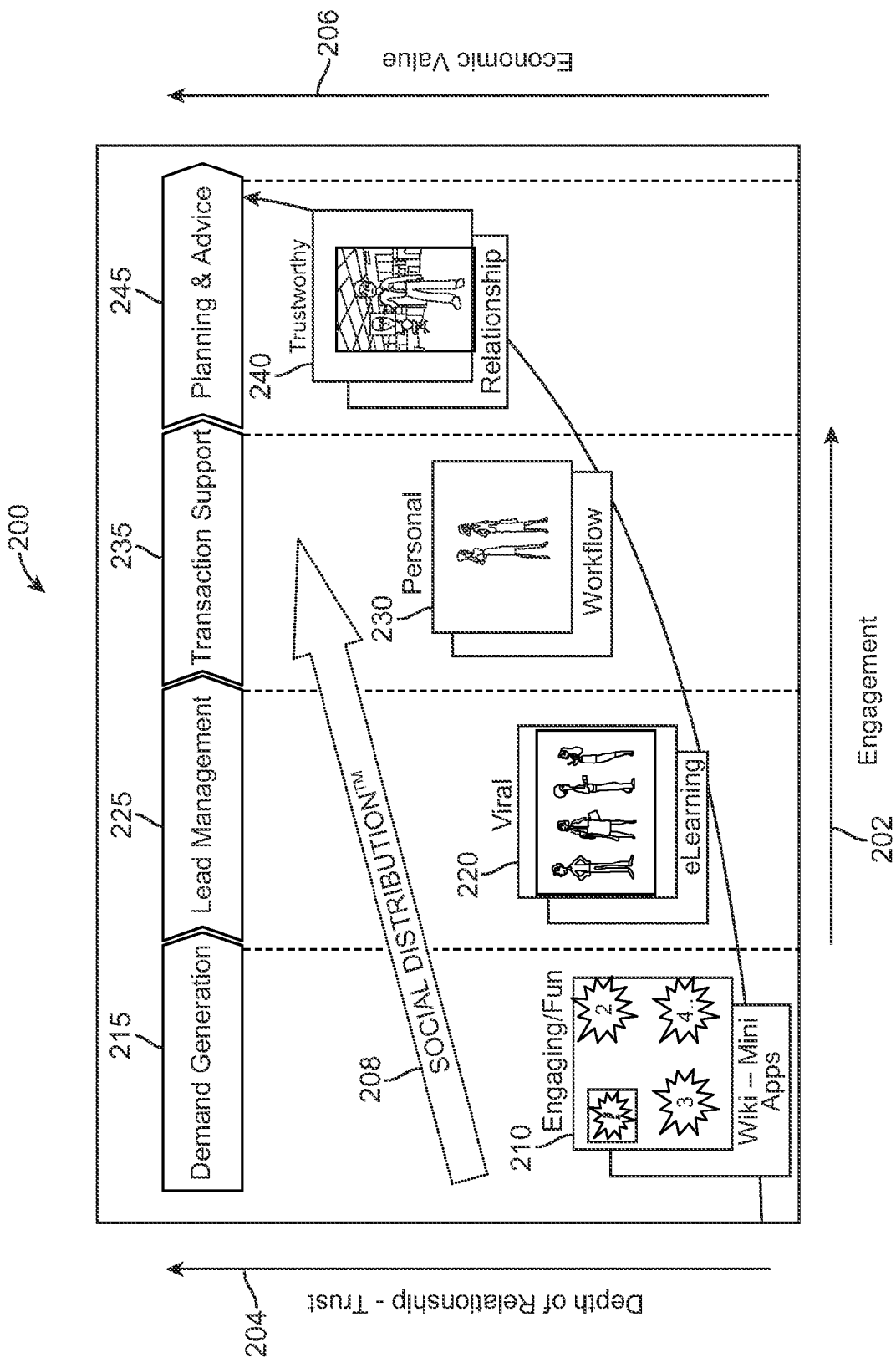
FIG. 2 illustrates how prospective customers interact with one embodiment of the system and develop trust in the system and its branded characters over time.

As noted above, these characters persist throughout the various stages of a complex transaction, as illustrated by the "relationship continuum" 200 shown in FIG. 2. in one embodiment, a prospective customer initially encounters one or more engaging games or other applications 210 on a social network, such as Facebook. During this engagement or "demand generation" stage 215, the prospective customer first encounters these branded cartoon characters in an unfamiliar context. At this early stage of engagement, as illustrated by "Engagement axis" 202, relatively little familiarity or trust has been established with these characters, as illustrated by "Trust axis" 204. It takes time for this relationship to develop via subsequent interaction. At this stage, the customer is of relatively little economic value to a product or service provider, as illustrated by "Economic Value axis" 206, as, in this embodiment, no products or services have even been disclosed, much less purchased.

Over the course of time, however, "social distribution" 208 effects change along all of these axes. For example, a particular one of these games or applications 210 might become popular and be distributed to other prospective customers virally over the social network. If another prospective customer who encounters this popular game or application 220 plays it multiple times to advance to higher levels, that prospective customer would become more familiar with the characters, and attain information regarding certain products or services offered by one or more providers. In other words, that prospective customer would already have transitioned to an education or "lead management" stage 225.

In addition to providing users with basic information regarding products or services, application 220 includes, in one embodiment, links to a website where additional information can be obtained. This website is another network platform on which the system can guide prospective customers further along in the process of a complex transaction. Such customers constitute relatively promising leads as they already have expressed interest and become partially educated with respect to a provider's products or services. In other words, they have moved along all three axes, having become more engaged (axis 202), more familiar with and thus trusting of the branded characters (axis 204), and therefore of greater potential economic value (axis 206) to a provider.

At this point, prospective customers become immersed in the personal workflow 230 of the system, encountering educational episodes, vignettes and learning modules relating to particular types of products and services, asking questions and being prompted to provide personal information relevant to such products and services. As noted above, in one embodiment, this process involves multiple sessions during which the user is in control, stopping and restarting hours, days or even weeks later (or longer). During this transactional or "transaction support" stage 235, certain prospective customers eventually become actual customers as they gain sufficient product and industry knowledge and trust in their virtual agent to reach the point of being "ready to buy" particular products or services.

As will be discussed in greater detail below, even after completing a transaction, the relationship between the customer and the system (including the virtual agent) does not end. This trusting relationship 240 continues over time, as the customer enters a service or "planning and advice" stage 245 in which either the system or the customer prompts the other with alerts, additional information and various offers of products and services that become relevant to the customer due to a change in circumstance (eg, getting married or having children) or simply the passage of time. As will be discussed below, there are a myriad of ways in which the system can become aware of such changes in circumstances, including periodic prompts of the customer for potentially relevant information over time.

As time passes, and this relationship deepens, customers become more engaged with the system and the branded characters (axis 202), if only due to the nature of the interaction, wholly apart from its frequency. Customers develop even greater trust in the virtual agent and family of characters (axis 204), and thus become of greater economic value (axis 206) to providers, as they purchase additional products and services across various product lines (and multiple providers), and recommend their "trusted advisor" to other prospective customers.

System Architecture

FIG. 3 illustrates one embodiment of a high-level architecture of the present invention. System servers 300 are preferably connected to the Internet 310 via one or more routers, such as router 305. One or more providers 320 offer products and services via system servers 300, and are also connected to the Internet 300 via routers 305. One or more users 330 are also connected to the Internet 300 via routers 305, and to other network platforms 340, such as social networks or worksite or university LANs.

Users 330 access system servers 300 via desktop computers 350a, laptops 350b, mobile phones 350c or other hardware devices. Similarly, system servers 300 include various hardware devices, such as desktop computers 350a, dedicated servers (not shown), as well as various other devices.

Regardless of which types of devices users 330 employ, they connect to system servers 300 in various ways. For example, they can connect "directly" to a website hosted by one or more system servers 300, or indirectly via various other network platforms 340, such as a social network hosting a game or other application designed to engage users, or a worksite, university or other organization hosting educational vignettes or other system functionality.

Key System Modules

One embodiment of key modules of the system 400 of the present invention is illustrated in FIG. 4a. These modules are conceptually divided into three categories: (i) front-end modules 410 that interface with customers or end users of system 400; (ii) client modules 430 that interface with providers of products and services offered via system 400; and (iii) back-end modules 420 that manage and generate learning modules and other system data and provide an interface between the front-end 410 and client 430 modules.

Front-end modules 410 include an engagement layer 412 that generates dynamically a variety of engaging applications and components that are presented on a standalone basis as well as integrated into learning modules and other system elements. For example, engagement layer 412 generates and deploys engaging games or other applications on a social network such as Facebook. In addition, it generates (and, in one embodiment, enables users to generate) a "bad things happen" episode that is part of an educational vignette or learning module.

To facilitate the generation of these engaging elements, engagement layer 412 relies on real-time engagement and exploration frameworks 414, which, for example, provide business rules that constrain the content generated by engagement layer 412. For example, particular types of accidents are included or excluded from an engaging episode based upon whether particular insurance policies cover those types of accidents. Moreover, real-time engagement and exploration frameworks 414 also include various activities and rewards that keep users engaged not only initially but over time during educational and other stages. For example, T-Nodes are offered as an incentive for a user to play a particular game or test an application, such as a quiz or survey. "Fun" elements are integrated into such activities to supplement the incentives as a way of keeping users engaged with system 400.

Back-end modules 420 include, in one embodiment, an authoring engine 422 that enables the dynamic generation of learning modules and other system components in conjunction with dynamic education engine 424, which imposes business rules based on domain knowledge relating to particular classes of products and services (eg, long-term disability insurance). These modules rely upon various databases (data warehouse and data marts module 426) that include a wide variety of information such as domain and industry data, individual and aggregate user profile and demographic data, real-time behavioral data based on the activities of users and providers, and other related data.

Client modules 430 provide the interface, via corporate and 3rd-party platforms module 432, to the various systems maintained by the providers who offer products and services via system 400. Various standards are supported for exchanging data relating to user behavior, transactions, etc. In addition, providers submit data summarizing their products and services, as well as branding and other marketing data.

Relationship between System Modules and Stages of Complex Transactions

Figure 4B:
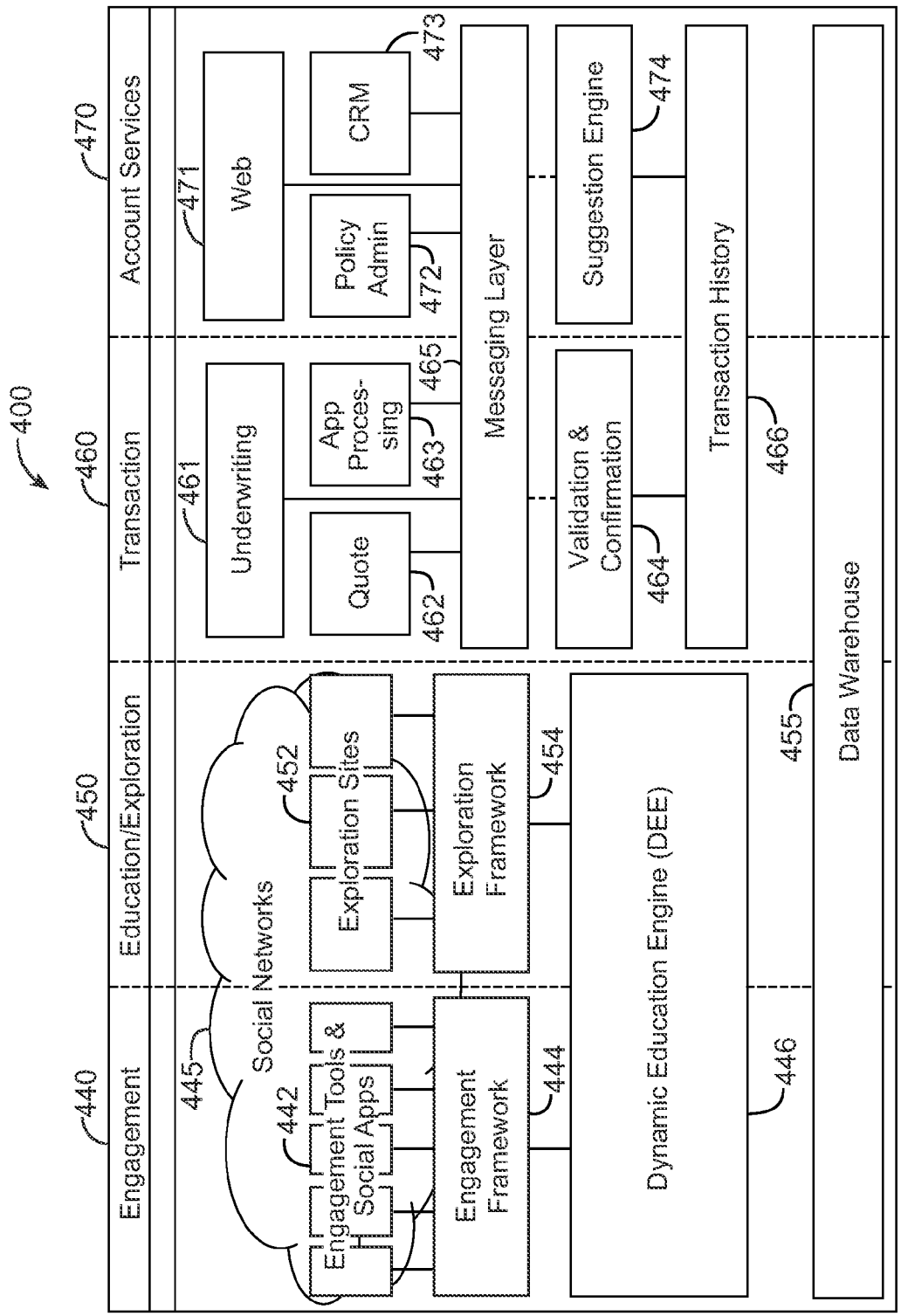
FIG. 4b is a block diagram of an embodiment of key architectural components of the system of the present invention mapped against various stages of a complex transaction.

Turning to FIG. 4b, many of the same key modules illustrated in FIG. 4a can be examined via a different architectural slice. In particular, key modules of system 400 can be categorized via the primary stages of a complex transaction, including an engagement stage 440, educational/exploration stage 450, transactional stage 460 and account services stage 470.

For example, prospective customers might first encounter system 400 during early engagement 440 and educational 450 stages via a social network 445 or other network platform (such as their worksite, school, etc). Engagement tools and social apps 442 enable social network 445 to deliver engaging games, applications, "bad things happen" episodes, etc—generated based upon underlying engagement framework 444.

Similarly, prospective customers explore areas of interest and encounter educational information (sometimes even before they become aware of particular system providers and the products and services they offer) via exploration sites 452—generated based upon exploration framework 454. In one embodiment, such sites provide standalone educational information, as well as information that is integrated into fun and engaging applications. For example, in one embodiment, simple statistical data is displayed (in textual and/or graphic form), and is also more subtly integrated into a game or episode that illustrates the same concept.

In any event, engagement framework 444 and exploration framework 454 both rely upon dynamic education engine 446 to impose (in real time, in one embodiment) business rules based on domain knowledge relating to particular classes of products and services offered by system providers. Dynamic education engine 446 in turn relies upon databases in data warehouse 455 for a two-way exchange of data, including domain and industry data, individual and aggregate user profile and demographic data, real-time behavioral data based on the activities of users and providers, and other related data.

As prospective customers progress through engagement 440 and explorational/educational 450 stages of a complex transaction, some eventually reach a transactional 460 stage in which they can purchase particular products and services, such as enrolling in a particular insurance plan. To traverse this enrollment process, prospective customers, in one embodiment, are required to complete an underwriting process, implemented via underwriting module 461, as well as obtain quotes (via quote module 462) and complete various other processing steps, implemented via app processing module 463.

These modules all rely on messaging layer 465 to implement the dialogue between system 400 and prospective customers, including for example questions seeking additional information necessary to the underwriting process. As noted above, system 400 provides additional account services to existing customers over time, such as those provided by web module 471, which, in one embodiment, implements a desktop widget (illustrated in FIG. 15 below) to provide periodic notifications to customers, as well as enable customers access to various other system services.

Such services are structured in accordance with a provider's particular procedures for administering their insurance and related financial policies (eg, via policy admin module 472) as well as their more generic procedures regarding their sales, marketing and other "customer relationship management" efforts (eg, via CRM module 473). These policies affect the form and type of information obtained from customers as well as the particular plans and other services offered to customers. Modules 472 and 473 also rely upon messaging layer 465 to implement this dialogue between system 400 and customers.

Validation & confirmation module 464 enables information obtained from customers to be confirmed and validated against general industry policies as well as the policies of a particular provider with whom a customer is contemplating a transaction. For example, a customer's age, medical history or results of a blood test might disqualify that customer from obtaining a particular insurance policy, or affect the amount of that customer's premium. In one embodiment, module 464 confirms that all such information complies with the various constraints of a provider's product or service before allowing a transaction to proceed to completion.

Suggestion engine 474 enables system 400 (and individual providers) to alert existing customers to various offers, including modifications to existing products and services, offers of new or related products and services, as well as ancillary offers from third parties. Moreover, suggestion engine 474 recommends to customers information that may not be tied to any particular product or service, such as a "bad things happen" episode, a learning module of system 400, or simply a link to information that may be of interest to an existing customer based upon their individual or aggregate demographic, profile and behavioral information.

In one embodiment, details of all transactions between customers and providers (as well as any affiliated third-party vendors) is captured and maintained via transaction history module 466 and stored in various databases (data warehouse 455). Modules 466 and 455 support a two-way exchange of data, including domain and industry data, individual and aggregate user profile and demographic data, real-time behavioral data based on the activities of users and providers, and other related data.

Complex Transaction Process

To appreciate the value of the system, including the persistence of a virtual agent and other branded characters across the various stages of a complex transaction, as well as across multiple platforms, it is helpful to examine this process in the context of a particular industry, such as insurance and financial services. Note, however, that the present invention is applicable to a wide range of industries, and extends beyond the sales and distribution of products and services. Moreover, it should be emphasized that the various stages of complex transactions may well overlap with one another as users of the system encounter branded characters across multiple platforms in a variety of different contexts and scenarios.

In a representative embodiment, illustrated in FIG. 5 and discussed in greater detail below, these complex transactions comprise four major stages (engagement 510, educational 520, transactional 530 and service 540). It should be noted that various different stages and types of stages could be implemented, and that certain individual customers may well engage in multiple transactions over the course of time during what is comprehensively referred to herein as a complex transaction.

A prospective customer is introduced to the system of the present invention on any of various different network platforms. For example, in one embodiment, consumers "start" 505 their involvement with the system by receiving a game or application from a friend via a social network, such as Facebook. In another embodiment, consumers encounter an application on their employer's worksite network, eg during an introduction to their employer-provided insurance benefits. After playing that game or application, and encountering one or more of the system's virtual characters, those consumers who become engaged in the system (eg, as a result of one or more attractive elements 512) enter engagement stage 510.

The attraction or engagement elements take a variety of forms, from interest in a character to interest in the features of a game or application, or even interest in the underlying subject matter, such as a particular type of insurance. In one embodiment, incentives are provided to encourage users to continue their participation in the system. For example, the system awards points (redeemable for merchandise or discounts on various products or services) for playing a game, taking a quiz or clicking a link that invokes an educational vignette or other experience.

At various points in the process, the system provides learning opportunities which, if selected by a prospective customer, result in a transition (illustrated by link 515) from engagement stage 510 to educational stage 520. It should be noted that such transitions among stages are, in one embodiment, "linear"—eg, from engagement stage 510 to educational stage 520 via link 515, and then to transactional stage 530 via link 525, and finally to service stage 540 via link 535. in other embodiments, however, users transition from one stage to any other stage (as illustrated by bidirectional links 508), based upon their selection of the appropriate links or other transition opportunities, which are presented, in part, based upon users' prior interactions with the system. Moreover, users can be in multiple stages at any given point in time. Subject to the system providing transition opportunities, users are in control of their destiny. In one embodiment, they can stop at any point in the process and return where they left off at a later time, and interrupt their progress to ask a question or transition to any other stage in the process.

For example, in one embodiment, prospective customers, regardless of their particular stage in the process, encounter an incentive 512, such as a discount on a mobile phone, associated with selection of a particular link. Selection of incentive 512 results in the user's transition to engagement stage 510. Yet, if the link relates to an educational opportunity 522, such as a learning module or even the opportunity to ask a question about a particular insurance product, the user also transitions to educational stage 520. The system effectively deems the user "ready to learn" by providing such educational opportunities 522. In one embodiment, this occurs as a result of the completion of a game or other engaging application, or even another learning module.

By tracking the progress of prospective customers, the system eventually deems a customer "ready to buy," for example, after completing certain learning modules. At that point, the system provides the prospective customer with a transactional opportunity 532, such as a link to enroll in a particular insurance plan. Yet, in another embodiment, the system provides such a link at various other points in the process, effectively enabling prospective customers to determine that they are "ready to buy" on their own initiative (even before the system deems them ready). In either case, a customer's selection of the link results in their transition to transactional stage 530, where they can complete the enrollment process and/or purchase a particular product or service. As noted above, the customer remains in control, and can also transition to various other stages (assuming a transitional opportunity is available), eg, by accepting an incentive to play a game, complete another learning module or simply ask a question.

In one embodiment, even after a customer completes one or more transactions, the system provides that customer with various service opportunities 542, in an effort to keep the customer engaged in the system, which results in a transition to service stage 540, which in turn can result in subsequent transactions or referrals of other customers. Should the customer's circumstances change (eg, due to age, a change in employment, a move to a different state, etc), the system alerts the customer of the availability of a product or service that has become relevant as a result of such change in circumstances. In addition, the customer can invoke the system to ask a question, eg, relating to the prospect of such a change. By remaining available (eg, via a widget or other application on the user's desktop), the system keeps the user engaged, and aware of relevant opportunities, yet still in control and not turned off by a more invasive "hard sell" approach.

It should also be noted that, in different embodiments, the functionality of any of these stages can be implemented for remote execution on one or more centralized servers or distributed among client computers for local execution.

Engagement Stage

Figure 6:
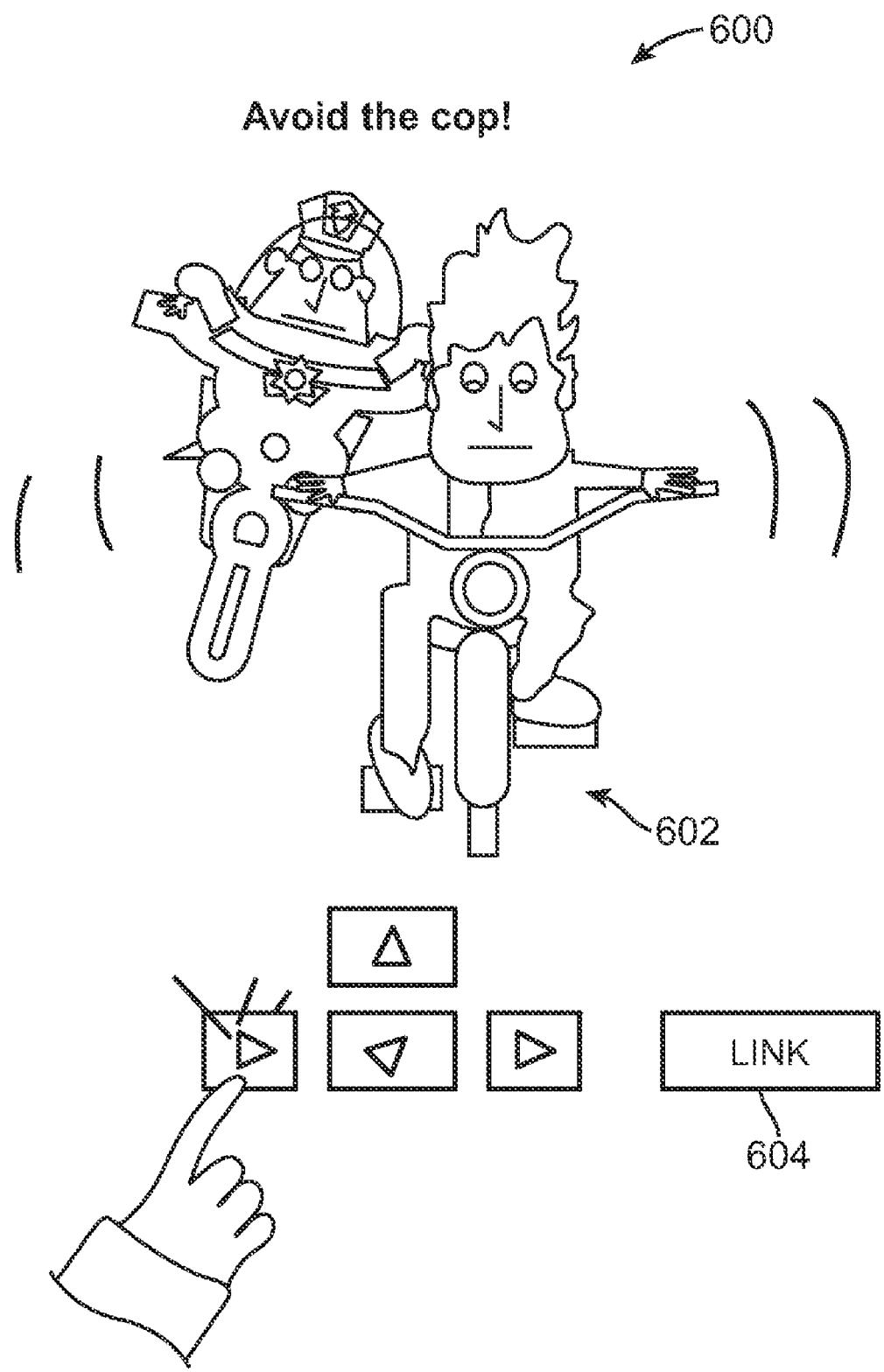
FIG. 6 illustrates an embodiment of an engagement stage of a complex transaction in the context of the system of the present invention.

FIG. 6 illustrates how one embodiment of the system initially engages prospective customers. For example, a prospective customer who is a member of a social network could receive a message from a friend with a link to a simple application such as the "Avoid the Cop" game 600. In one embodiment, this application is integrated into the social network (eg, Facebook), while in another embodiment it is invoked via a link to a web page. Regardless of the platform or the manner in which a prospective customer first encounters game 600, the intent is one of fun and engagement.

Upon playing game 600, a user first encounters and begins to become acquainted with one or more of the branded characters, such as Carl 602, who employs various strategies to "avoid the cop" (eg, while texting) based upon the user's interactions. Perhaps without realizing it, the user also becomes the subject of a subtle marketing campaign. For example, the user of game 600 experiences (voluntarily and repeatedly) being "out of control," regardless of whether the user is more risk averse in real life. Game 600 can be considered somewhat self selecting in that it might appeal to users who are curious about "out of control" behavior and thus might be more likely candidates for insurance.

Moreover, this experience becomes relevant later when the user is introduced to information relating to insurance products and services. In one embodiment, game 600 itself includes such information. In another embodiment, it includes a link 604 to a website or other network platform where prospective customers obtain further information, if only out of curiosity (as opposed to an intent, for example, to purchase insurance). Game 600 is intended to be fun and engaging, in an interactive and easily approachable manner—a form of escapism that captivates a user's attention and only subtly provides "teaser education" designed to encourage prospective customers to take the next step (as compared to the typical "hard sell" approach of a live insurance agent).

Figure 7:
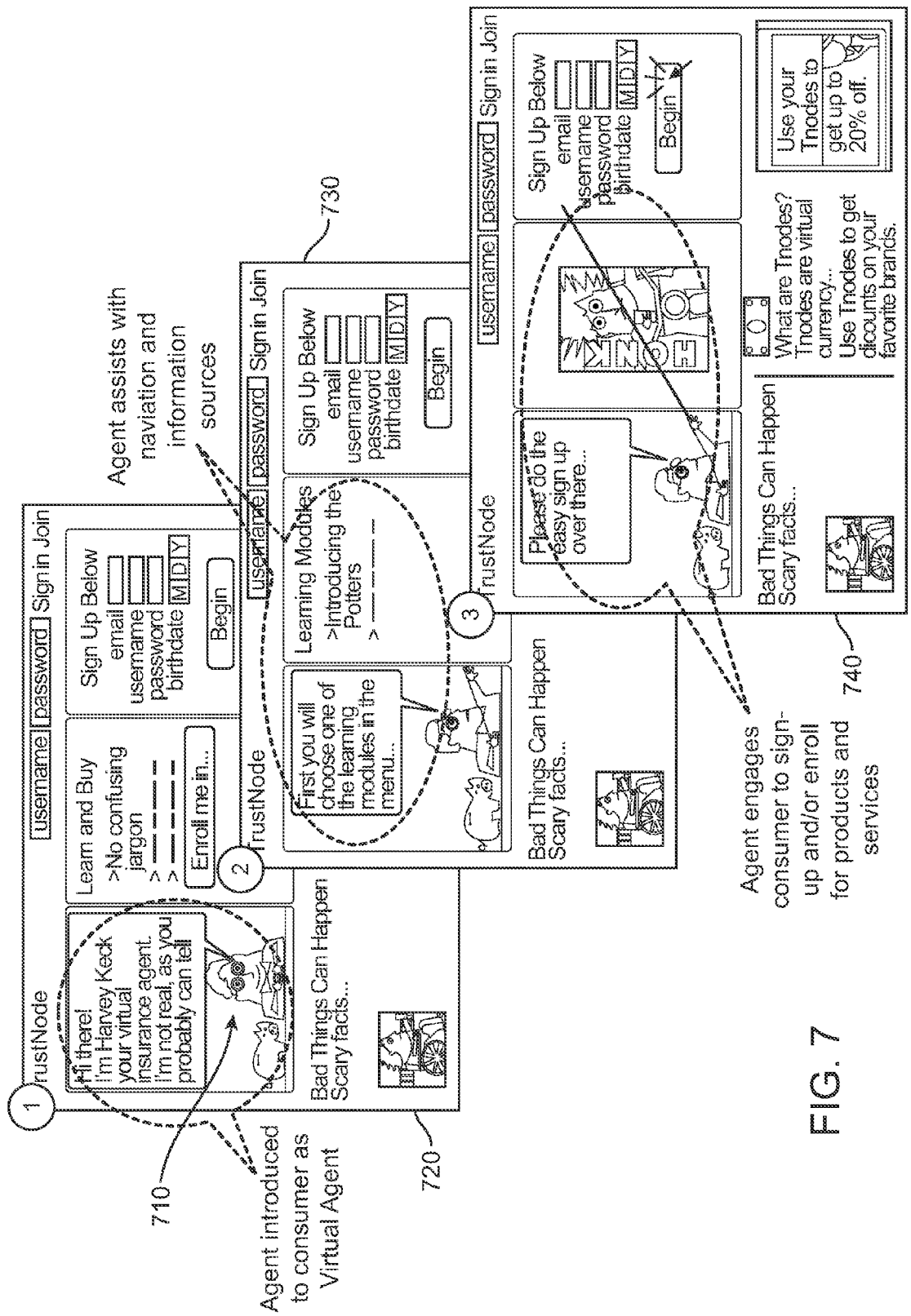
FIG. 7 illustrates how a branded cartoon character "sales agent," in one embodiment, is introduced to and subsequently interacts with prospective customers over time.

FIG. 7 illustrates one embodiment of this next step, as prospective consumers transition from an engagement to an educational stage—an educational vignette designed to provide prospective customers with additional information regarding products or services of interest (eg, long-term disability insurance relating to a game the user just played). Before launching into the process of educating the prospective customer, the system (in this embodiment) first introduces the customer, as shown in slide 720, to a virtual agent 710 ("Harvey Keck") who will become not only another character with whom the customer becomes familiar over time, but also a trusted agent the customer relies upon to guide the customer through a long and complex sales process.

Although a transition from an engagement to an educational stage has occurred, the system continues to engage prospective and actual customers throughout this long process. To enable customers to be sufficiently educated to purchase appropriate products and services when they are "ready," the system proactively engages them, and remains available when customers seek advice or information on their own initiative. Customers build up trust in virtual agent 710 over time as Harvey assists them, as illustrated in slide 730, in navigating their way through this process and exchanging information. In essence, users engage in a dialogue with the system (in particular, with agent 710), much as they would with a live sales agent. Yet, customers have greater control over their interaction with Harvey, as they can respond at their own pace, select their own navigational paths and even leave the system altogether and return to the same or another point in the process whenever they desire.

Moreover, virtual agent 710 performs the role of providing relevant information in an informal and less intrusive manner, as illustrated in slide 740, as well as obtaining necessary information gradually over time. For example, a customer might initially be asked for a small amount of identifying information (name, age, etc), with additional information collected over time when it becomes more relevant, such as a complete address which might not be needed until a customer expresses a desire to enroll in a particular program.

Figure 8:
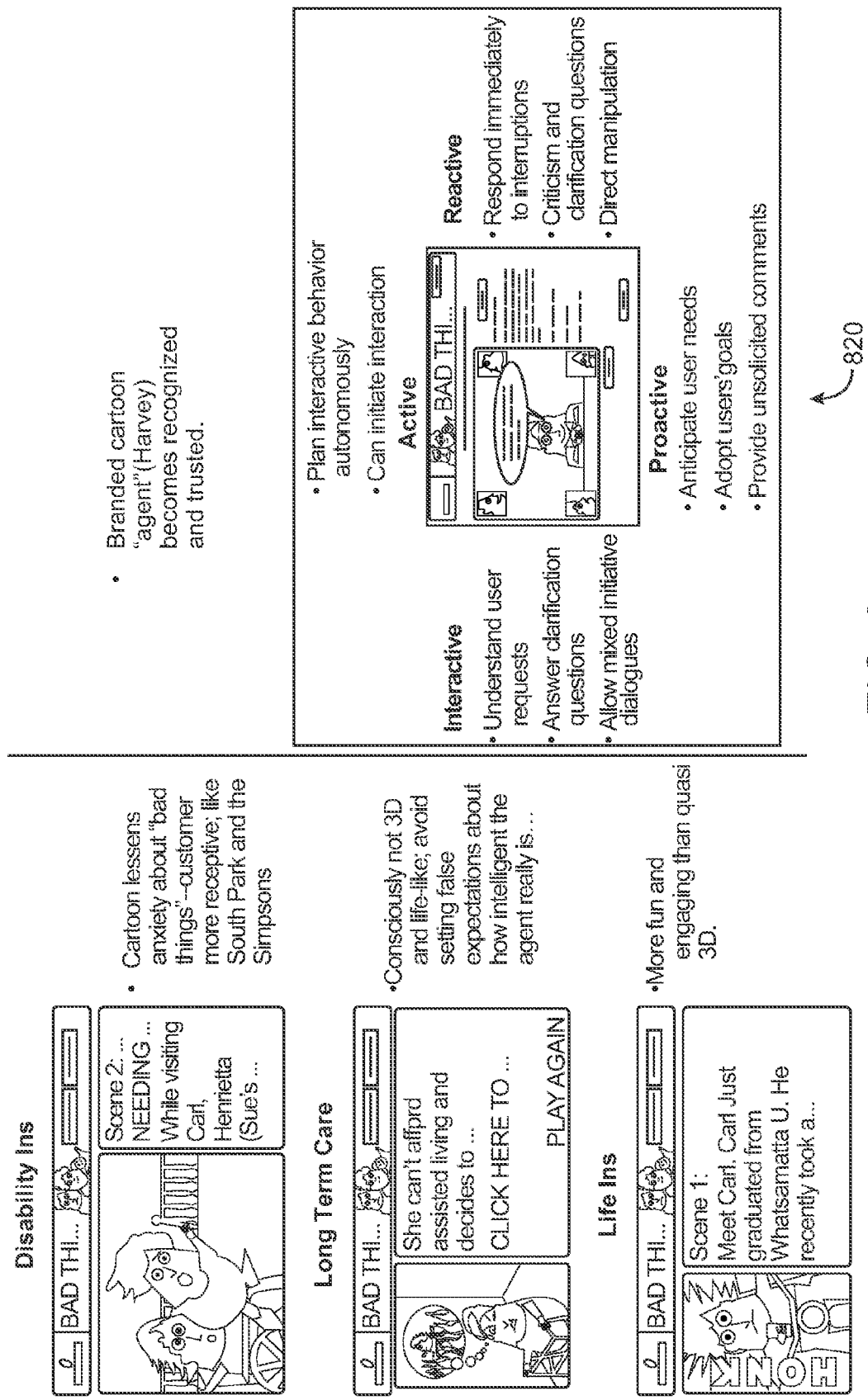
FIG. 8 illustrates how branded cartoon characters, in one embodiment, continue to engage prospective customers and build trust over time regarding otherwise "dry" and complex subjects such as selling insurance.

As noted above and illustrated in FIG. 8, complex transactions, such as the selling of insurance products and services 810 (disability, long-term care, life insurance, etc), present a number of obstacles beyond simple price and feature comparisons. For example, customers are naturally anxious when faced with the prospect of insuring against potentially disastrous events such as car accidents that can result in the loss of life and limb, as well as temporary and permanent disabilities (not to mention the financial impact of such events). The use of branded cartoon characters lessens that anxiety, particularly as customers become familiar with such characters over time and see them cycle through periods of injury and recovery.

Moreover, by avoiding lifelike 3D avatars, the branded characters, such as virtual agent Harvey Keck, illustrated in slide 820, do not set false expectations regarding the intelligence of a virtual agent, as contrasted with a live human agent. This becomes important as customers transition back and forth between virtual and live human agents at various points in the sales cycle. Finally, given the dryness and complexity of insurance products generally, these branded cartoon characters are more likely than a typical live insurance agent to keep customers engaged over time.

As noted above, Harvey plays a variety of roles that demonstrate even greater versatility than would a typical live insurance agent. In one embodiment, Harvey actively initiates a predefined educational vignette, and interactively asks and responds to questions, effectively engaging in a dialogue with consumers. Harvey reacts to a user's request to traverse a different path, provides access to a live human agent (eg, to discuss particularly complex issues) and allows users to leave the system altogether at virtually any time, while enabling users to return at another time to the same or a different point in the process with all relevant state information intact. Harvey also proactively provides unsolicited advice and anticipate a consumer's needs in a personalized fashion, based upon individual and aggregate consumer profile data as well as previous interactions with the system.

Figure 9:
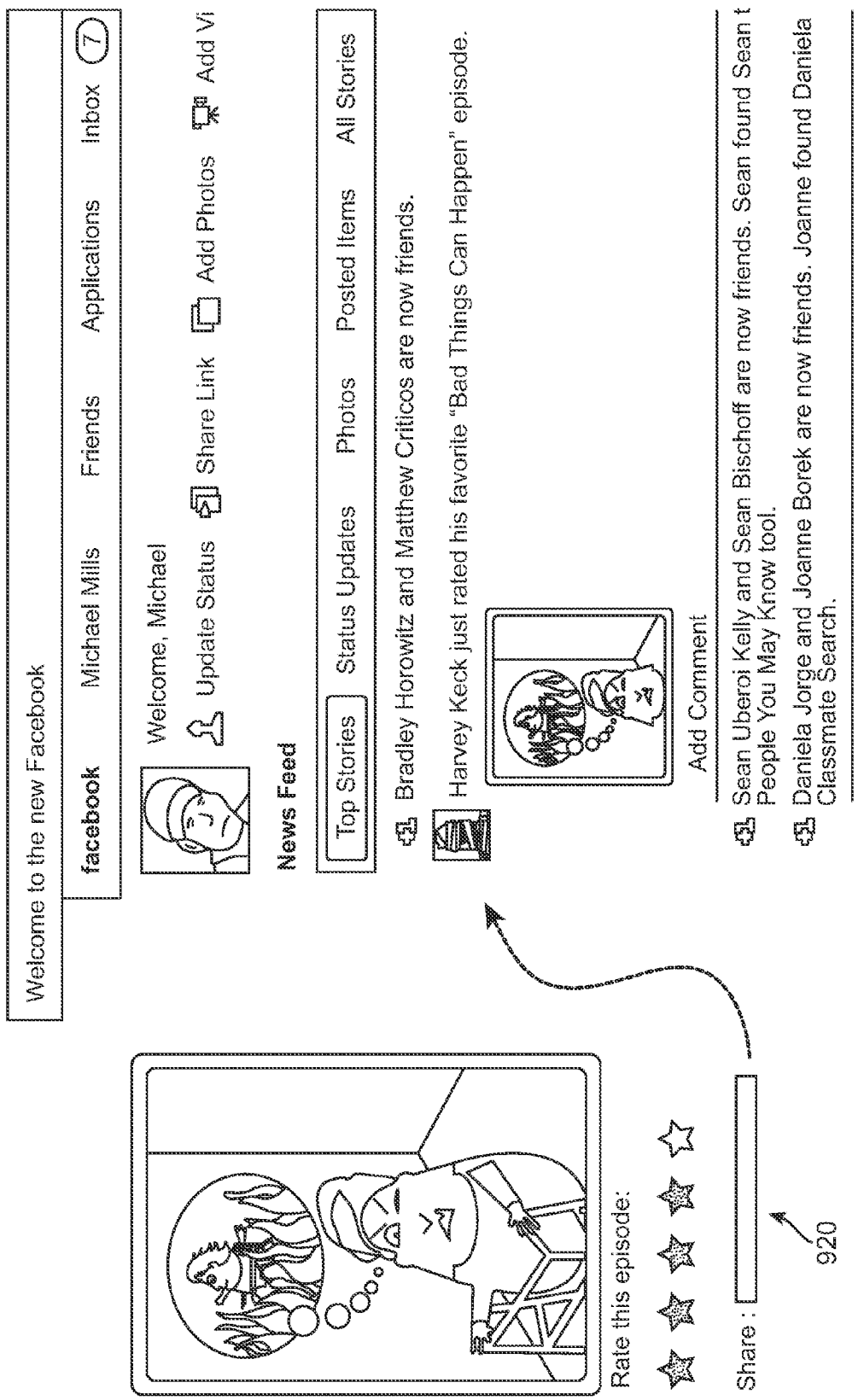
FIG. 9 illustrates an embodiment of the portability and viral distribution of the branded characters and related components of the present invention across various platforms.

Virtual agents and other branded characters, in one embodiment illustrated in FIG. 9, persist and are portable across various network platforms, including viral social networks such as Facebook, MySpace or LinkedIn (for more business-oriented consumers), in addition to employer worksites, universities, and member-based organizations, as well as email and various websites. As noted above, the viral nature of social networks, coupled with more traditional online services such as email, enables these characters to proliferate exponentially across multiple network platforms, thereby greatly increasing sales prospects while reducing the costs of customer acquisition.

Consumers encounter "Bad Things Happen" episodes as part of a game or other application on a social network, as well as while traversing an educational vignette providing detailed information about long-term disability insurance via a website or local worksite network. Regardless of the context, or particular network platform, the system continues to keep users engaged, and exploits the viral nature of certain platforms, by providing users (in one embodiment) with an opportunity to rate these episodes and recommend and share them with their friends, colleagues and others via email or social networks.

Figure 10:
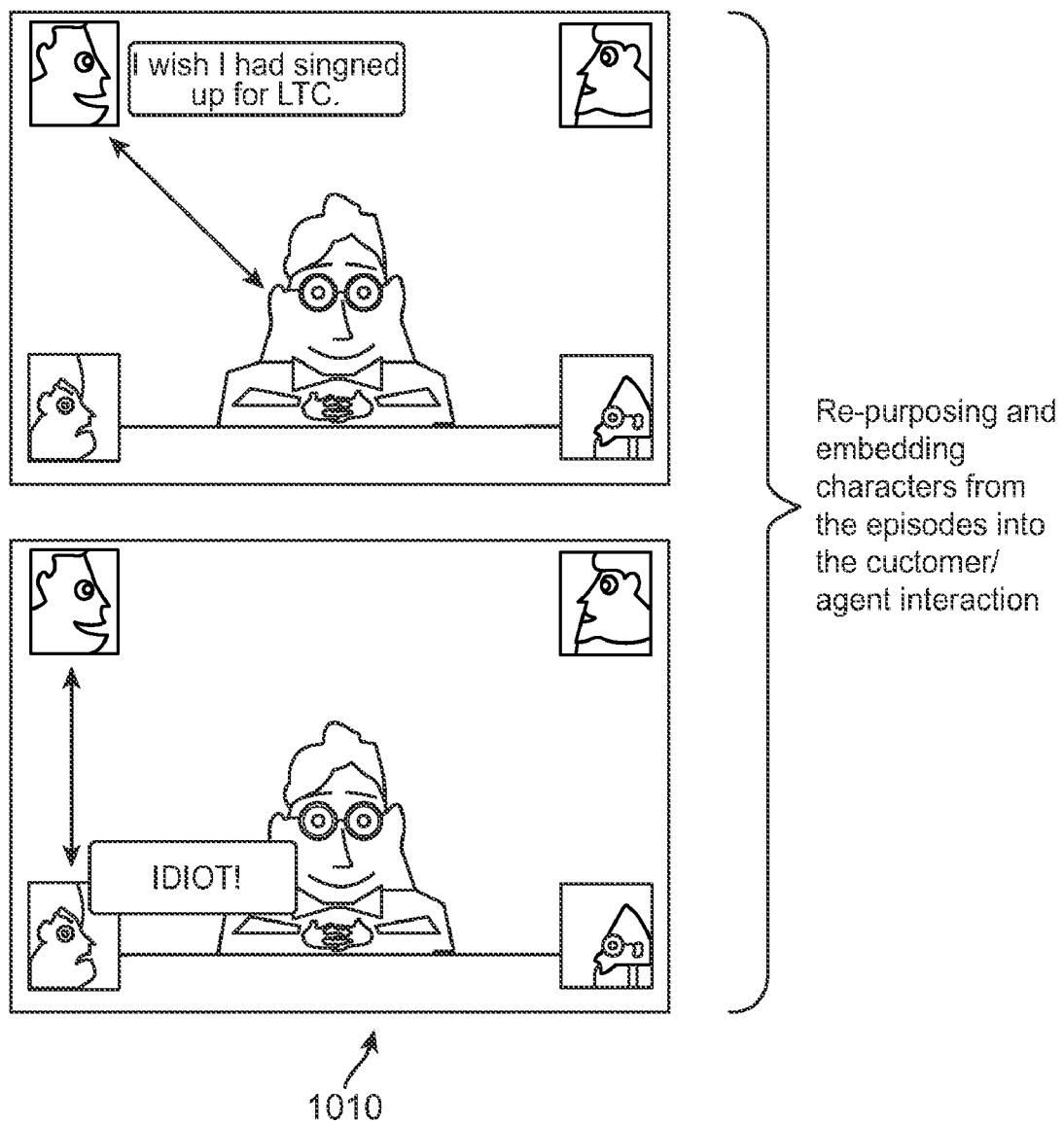
FIG. 10 illustrates how branded characters, in one embodiment, persist and are repurposed across various stages of a complex transaction.

As illustrated in FIG. 10, these branded cartoon characters are, in one embodiment, repurposed and embedded into discrete games or applications on social networks, educational vignettes on website and in various other scenarios across a wide array of network platforms. Their persistence throughout a long and complex sales cycle, and portability across viral network platforms, enables them to keep users engaged at various stages of this process. Such frequent reengagement is an important part of the process that facilitates the education of consumers until (and even after) they are "ready to buy."

Educational Stage

Figure 11:
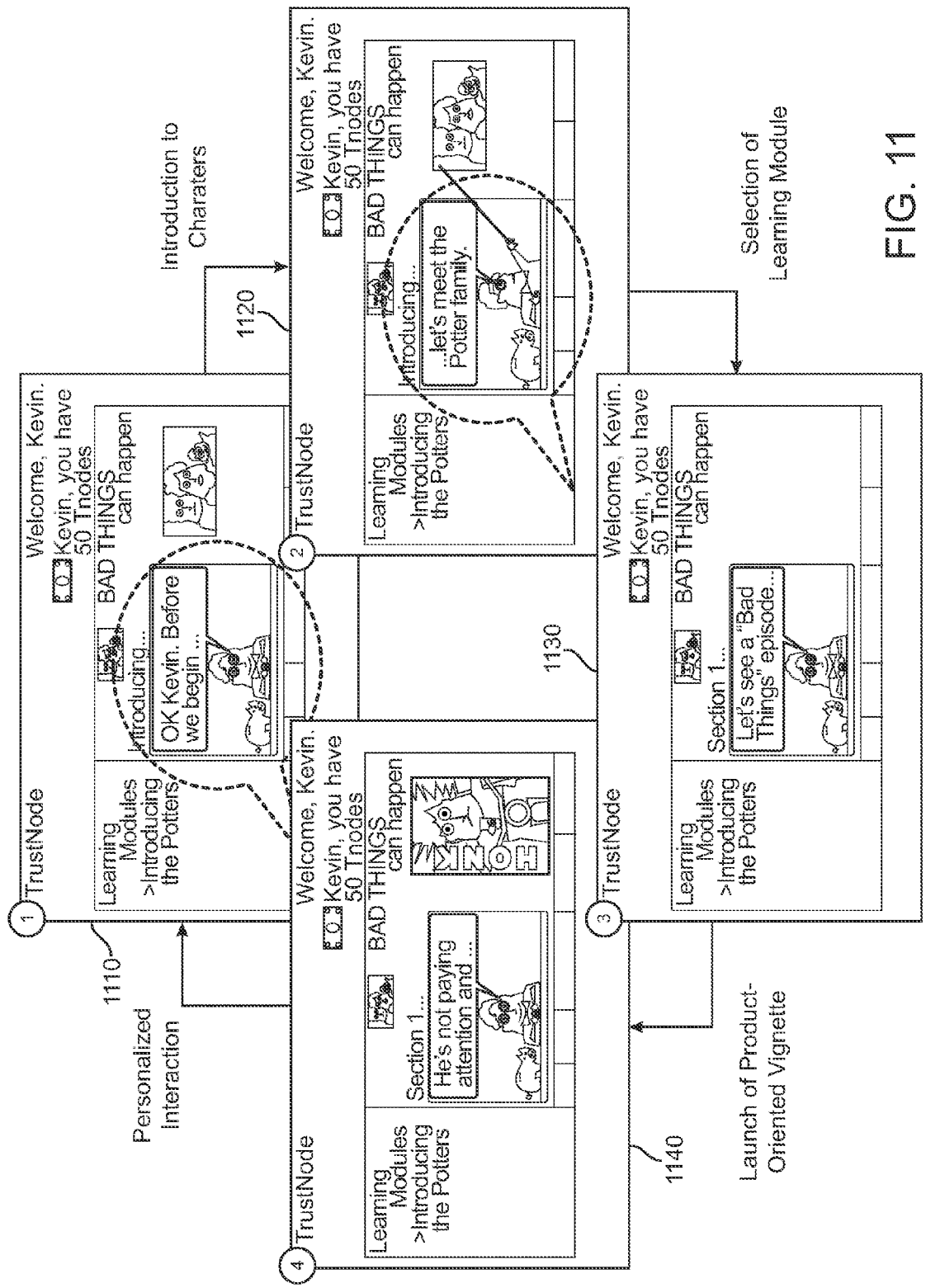
FIG. 11 illustrates an embodiment of the interactive process of the present invention as a prospective customer is introduced to a sales agent and other branded cartoon characters, and transitions from an engagement to an educational stage of a complex transaction.

Turning to FIG. 11, once a prospective customer is introduced to a virtual agent, their interaction becomes more personalized, as illustrated in slide 1110. In one embodiment, the prospective customer can personalize the virtual agent as well as the other branded characters, including selecting from among multiple characters or character attributes. Moreover, the interaction itself between the virtual agent and the customer becomes more personalized as the customer enters personal biographical and other information.

Other branded characters are introduced (as shown in slide 1120) as customers are presented with navigational options based upon their particular areas of interest, such as life insurance, long-term disability, long-term care, etc. It is important to note that the customer remains in control, while the system determines the appropriate information necessary to facilitate the customer's education regarding a particular subject relating to one or more products or services.

For example, in slide 1120, the prospective customer is introduced to the "Potter family" and, after selecting the "Long-Term Disability" learning module in slide 1130, encounters an initial "Bad Things Happen" episode in slide 1140 involving these branded cartoon characters, in which "Carl Potter" is texting on his mobile phone while bicycling and swerves into traffic. As this educational vignette is launched, the transition to the educational stage (relating to one or more potential transactions) has occurred, as the customer continues to be engaged while learning about long-term disability insurance.

Figure 12:
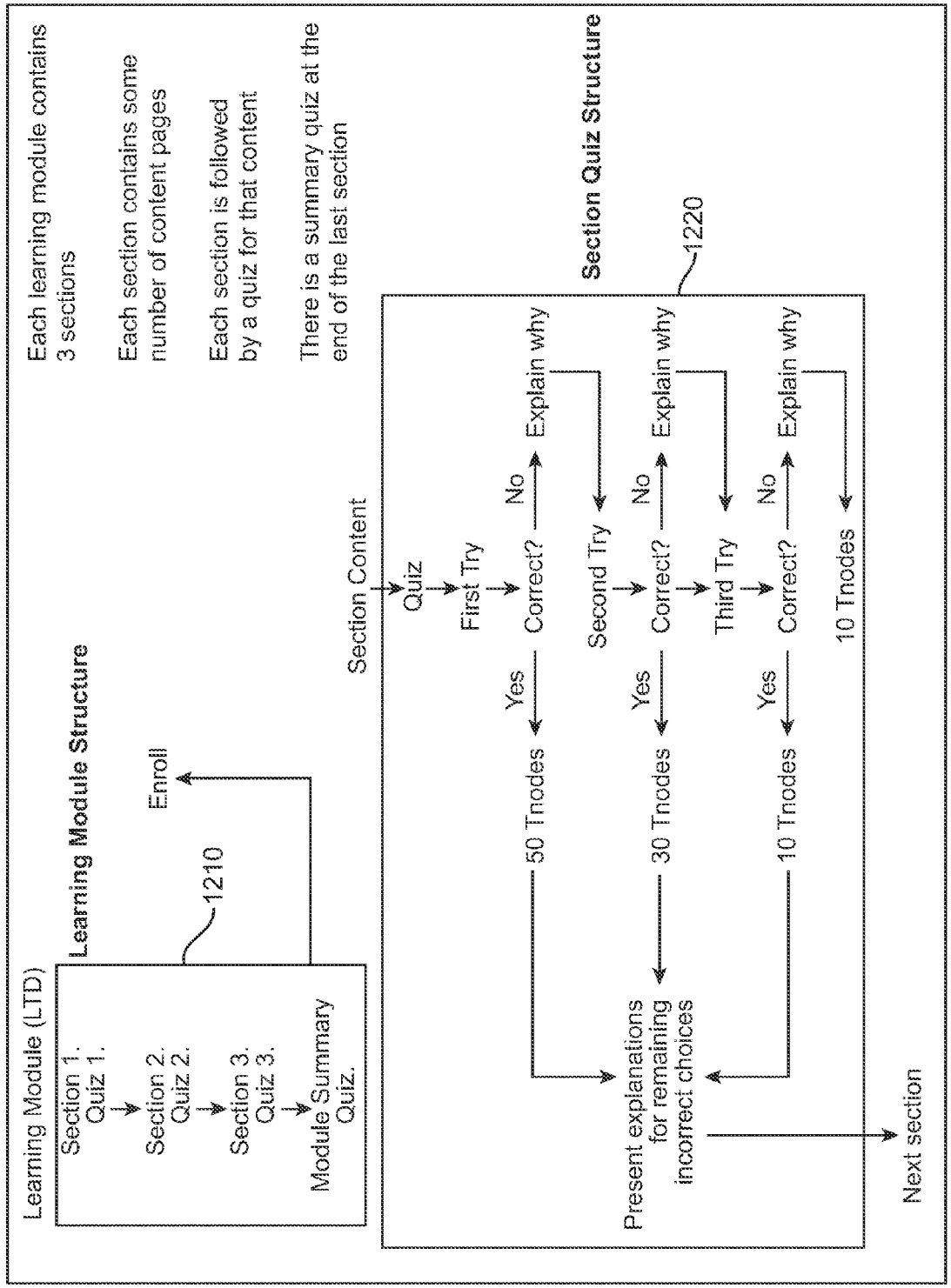
FIG. 12 is a flow diagram that illustrates an embodiment of the interactive process of a vignette in the educational stage of a complex transaction.

As will be discussed in greater detail below, information is provided to and obtained from customers in "bite-sized chunks" that keep them engaged, while allowing them to leave and resume their education (and even purchase products at various points in the process) at their convenience. FIG. 12 illustrates one embodiment of the structure of a generic learning module (eg, for a long-term disability insurance product). In this embodiment, module 1210 is divided into three sections (and a module summary), each of which is followed by a quiz which the customer must complete satisfactorily before proceeding to the next section. Each section consists of multiple pages of information (discussed in greater detail below), along with opportunities for interaction, such as asking questions and obtaining more detailed relevant information. Upon completion of the module summary quiz, the system deems the customer ready to complete the enrollment process and purchase the relevant long-term disability policy.

In this embodiment, the structure 1220 of each quiz is similar, and contains multiple opportunities for the customer to provide correct answers to each question. After each incorrect answer, the system provides an explanation as to why the response is incorrect, along with an additional opportunity to provide the correct answer. Incentives are provided along the way (in the form of T-Nodes or points that can be redeemed for discounts, merchandise and/or other related products and services), with a greater number of T-Nodes awarded for fewer incorrect answers. In this embodiment, 50 T-Nodes are awarded for an initial correct answer, with 30 T-Nodes awarded for a correct answer on the second try, and 10 T-Nodes for a correct answer on the third try. Even a third incorrect answer results in an award of 10 T-Nodes, as the customer has been educated by virtue of the multiple explanations regarding each incorrect choice.

In addition, even after a correct answer is supplied, the remaining incorrect choices are briefly explained to the customer in this embodiment, again providing additional educational benefits. By continuing to engage the customer with incentives, such as T-Nodes, the user obtains the necessary education to make an informed purchase decision, as well as being entertained and perhaps obtaining additional merchandise, discounts and other ancillary benefits.

Transactional Stage

Figure 13:
FIG. 13 illustrates an embodiment of a data entry portion of a transactional stage of a complex transaction.

Having sufficiently educated the prospective customer regarding a particular product or service, the system, in one embodiment, more actively directs the customer toward a transaction, such as the enrollment process for purchase of a long-term disability insurance policy, as illustrated in FIG. 13. Note again that this decision remains under the user's control. Even if the system deems a prospective customer "ready to buy," the customer may have additional questions or seek more detailed information (whether via the virtual agent, a live human agent, or simply by clicking on links and/or searching for additional relevant information). Conversely, a customer may elect to engage in a transaction during an educational vignette, and thus (in one embodiment) be provided multiple opportunities to interrupt the education process and proceed to purchase a particular product or service (even before the system might deem the customer "ready to buy").

FIG. 13 illustrates one embodiment of the initiation of an enrollment process for a long-term disability insurance policy. Note that the system previously obtained certain information about the prospective customer, "Kevin," who is nearing the end of a learning module 1310 relating to long-term disability, and is about to enter the enrollment stage 1320 to complete a transaction. The system refers to Kevin by name, along with an indication of Kevin's current balance of 50 T-Nodes 1330. In addition, the system has already filled in the fields 1340 containing Kevin's full name ("Kevin Schwartz") and age (32), both of which are essential to the enrollment process. This two-way dialogue continues to facilitate Kevin's trust in the system, including the branded characters.

Kevin may not even recall the circumstances under which he previously provided this information while the system was educating him about long-term disability insurance, but he can rely on his trusted virtual agent, Harvey Keck 1350, to remember all relevant information about him, as well as provide him with a 150 T-Node incentive award 1355 for completing the learning module and reaching this enrollment stage. This award also incentivizes Kevin to continue with the enrollment process and provide additional necessary information 1360, such as his current occupation as well as his marital and parental status.

Figure 14:
FIG. 14 illustrates an embodiment of an enrollment portion of a transactional stage of a complex transaction.

Note that the enrollment process continues across multiple screens, as additional information may be required. In certain embodiments (not shown), physical tests (eg, blood tests) may need to be performed before the process can be completed. Human intervention may be required, but virtual agent Harvey Keck 1350 remains familiar with the status of the process, and is always available (whether passively or proactively, depending on the situation) to guide Kevin toward completion of the enrollment process, shown in FIG. 14.

After completing the remaining information 1410, Kevin is ready to submit 1420 his enrollment application for processing. Note that, in one embodiment, even some of this additional information 1410 (eg, whether Kevin's wife is pregnant) can be inferred by the system, saving Kevin time during the enrollment process and, more importantly, increasing the likelihood that he will complete this process and not be hindered by unnecessary obstacles.

As noted above, even after having completed this enrollment process and engaged in a transaction, the relationship between Kevin and the system (and, in particular, Kevin's virtual agent, Harvey Keck) is not over. There are many instances in the future in which Kevin and his family may be interested in and ready to learn about additional ancillary products and services offered by various different vendors via the system. Kevin may initiate this process, or be alerted by the system. Regardless, the system maintains relevant state information gathered from a variety of sources, and is always available to put such information to use, if only to keep Kevin engaged until such time as he is ready to progress further along a particular path.

Service Stage

Figure 15:
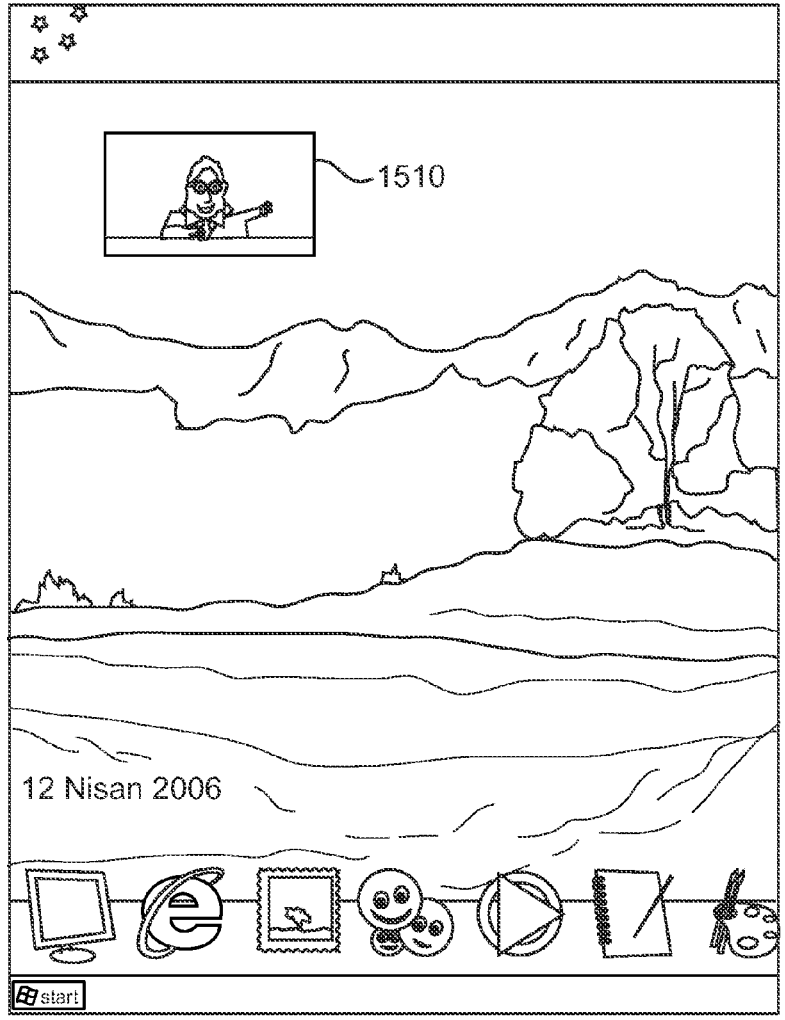
FIG. 15 illustrates an embodiment of a desktop widget that enables a branded cartoon character sales agent to persist across multiple platforms into a service stage of a complex transaction.

FIG. 15 illustrates one embodiment of a service-oriented aspect of the present invention. Desktop widget 1510 runs in the background of a customer's desktop computer, and can be invoked either by the system (eg, to alert the user to an opportunity) or by the user (eg, to pose a question or search or browse for specific information). in other embodiments, similar widgets are also available on other network platforms, such as Facebook or other social networks. In either case, invocation of these widgets affords the customer an opportunity to interact with trusted virtual agent and advisor Harvey Keck to engage in a dialogue and exchange information. Desktop widget 1510 also provides, in one embodiment, a gateway to one of the engagement applications discussed above (eg, a game), simply to keep the customer engaged and aware of the system's availability over time.

Customers might, for example, become curious about a particular type of insurance when faced with certain "state changes" in their lives, such as renting or buying a car or a house, changing jobs, getting married, or having children. A customer might hear about another's illness or accident and wonder how they might be affected in a similar situation. Regardless of the reason, the customer can invoke desktop widget 1510 to pose a particular question or learn more about a particular insurance product or service. Moreover, in the course of interacting with virtual agent Harvey Keck, the customer can reveal such state changes to the system, such as a change of jobs or marital status. The system in turn utilizes such information to prompt the customer (eg, at a later time) regarding a product or service that has become more relevant due to such change.

Desktop widget 1510 might, for example, notify the customer of a change in the customer's existing insurance, such as the recent availability of a better product or a different product relating to the customer's change in situation (job, location, age, etc). Again, regardless of the reason for the contact, the customer reengages with the system and becomes educated with respect to a new product or service.

In one embodiment, desktop widget 1510 serves as a gateway for the customer to access other users in the community facing similar issues, whether directly (eg, text chat) or indirectly via a user forum or the simple availability of relevant statistical information. In another embodiment, the system utilizes this targeted customer information to provide additional incentives and cross-selling opportunities for ancillary products or services.

It should be noted that a single virtual agent (Harvey Keck) who provides multiple different areas of expertise (eg, long-term disability and life insurance) over the course of a long-term relationship is more likely to engender a customer's trust than would multiple live insurance agents who contact the customer at random (often inconvenient) times and are far less accessible.

Figure 16:
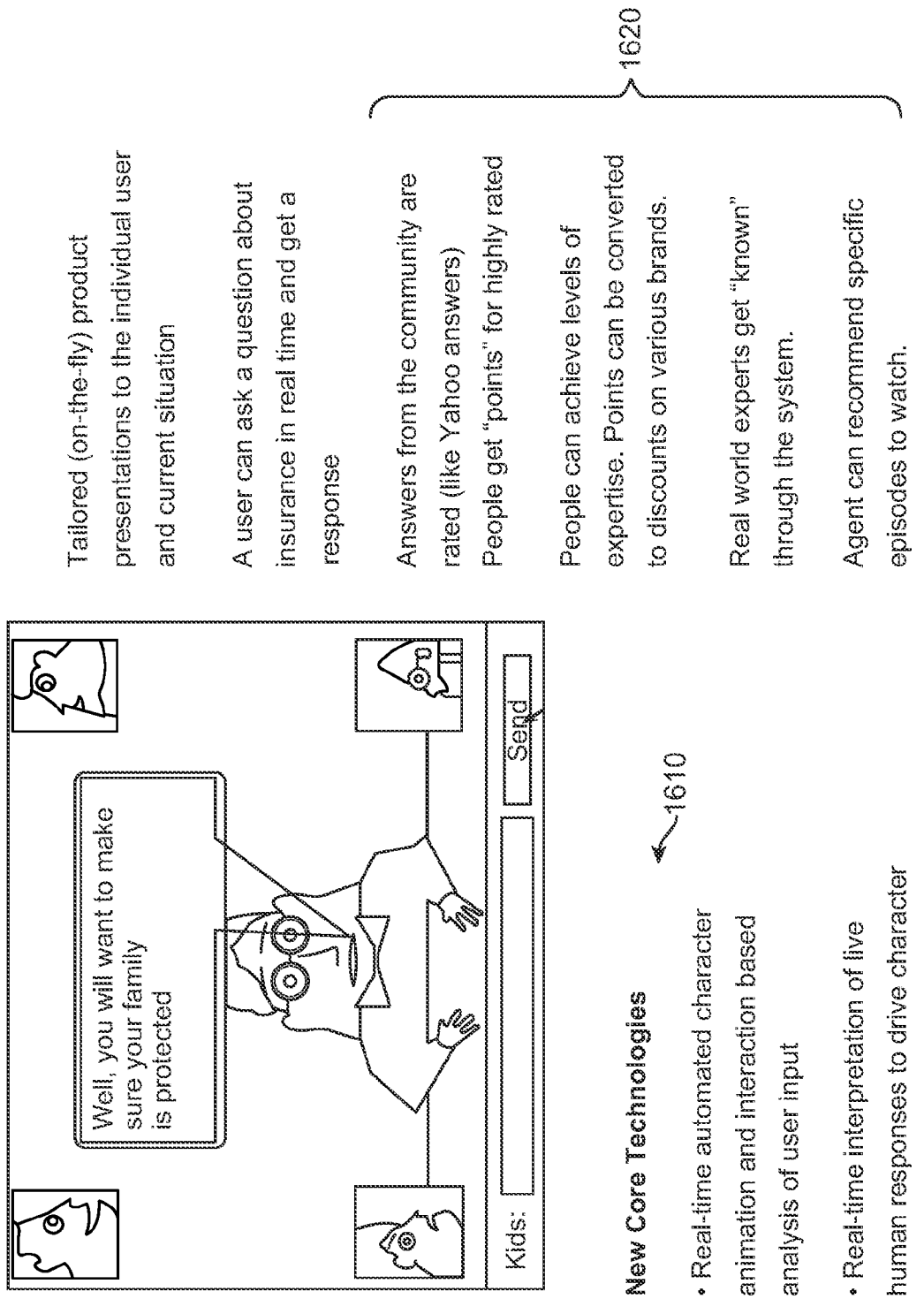
FIG. 16 illustrates an embodiment of various additional services that the system provides in the service stage (among other stages) of a complex transaction.

Moreover, the nature of the interaction between customers and virtual agent Harvey Keck is very important to the development of a high level of trust over time, as is illustrated, in one embodiment, in FIG. 16. Various interactive techniques 1610 are employed to facilitate this dialogue with customers, such as real-time character animation including facial and other gestures between and among the branded cartoon characters. In one embodiment, these gestures are personalized based upon a customer's biographical or demographic data, as well as responses to questions and other behavior. Information from the system and customers is interpreted to drive this animation.

For example, a customer might be asked whether they have ever "texted while driving." Not only would they be more likely to provide an honest answer in this environment, but the result of an affirmative answer might well be far more entertaining and educational than would a dry lecture from a live insurance agent citing statistics. In one embodiment, Harvey and the other characters respond with light sarcasm (coupled with appropriate gestures and facial expressions), including a personalized educational vignette discussing and illustrating the dangers of this practice and the relevance to a particular insurance product.

Such interactions serve to keep the customer engaged in the process and more likely to absorb the information being provided. Moreover, in addition to direct interaction with Harvey, the system (in one embodiment) also provides various community-oriented features 1620 based upon interactions with customers, live agents and other users of the system. For example, answers to certain questions (eg, from various customers or live agents or other "experts") are rated by the user community, which can be particularly useful for subjective issues, such as those relating to risk, behavior, necessity of certain insurance products for various demographic groups, etc. T-Nodes and other incentives are provided for highly rated answers, and can be redeemed for discounts on insurance and ancillary products.

In this embodiment, live insurance "experts" (or even experienced customers) become known throughout the community, and contacted for advice. Moreover, virtual agents or these experts recommend particular episodes or complete educational vignettes for those interested in a particular issue. In short, these community features 1620 facilitate continued engagement with the system, and provide additional mechanisms for users to become educated about the various products and services that are provided, which eventually leads to transactions when users are "ready to buy." Again, this can be contrasted with traditional "hard sell" insurance marketing techniques that have proven particularly ineffective with Generation X and Generation Y consumers.

Figure 17:
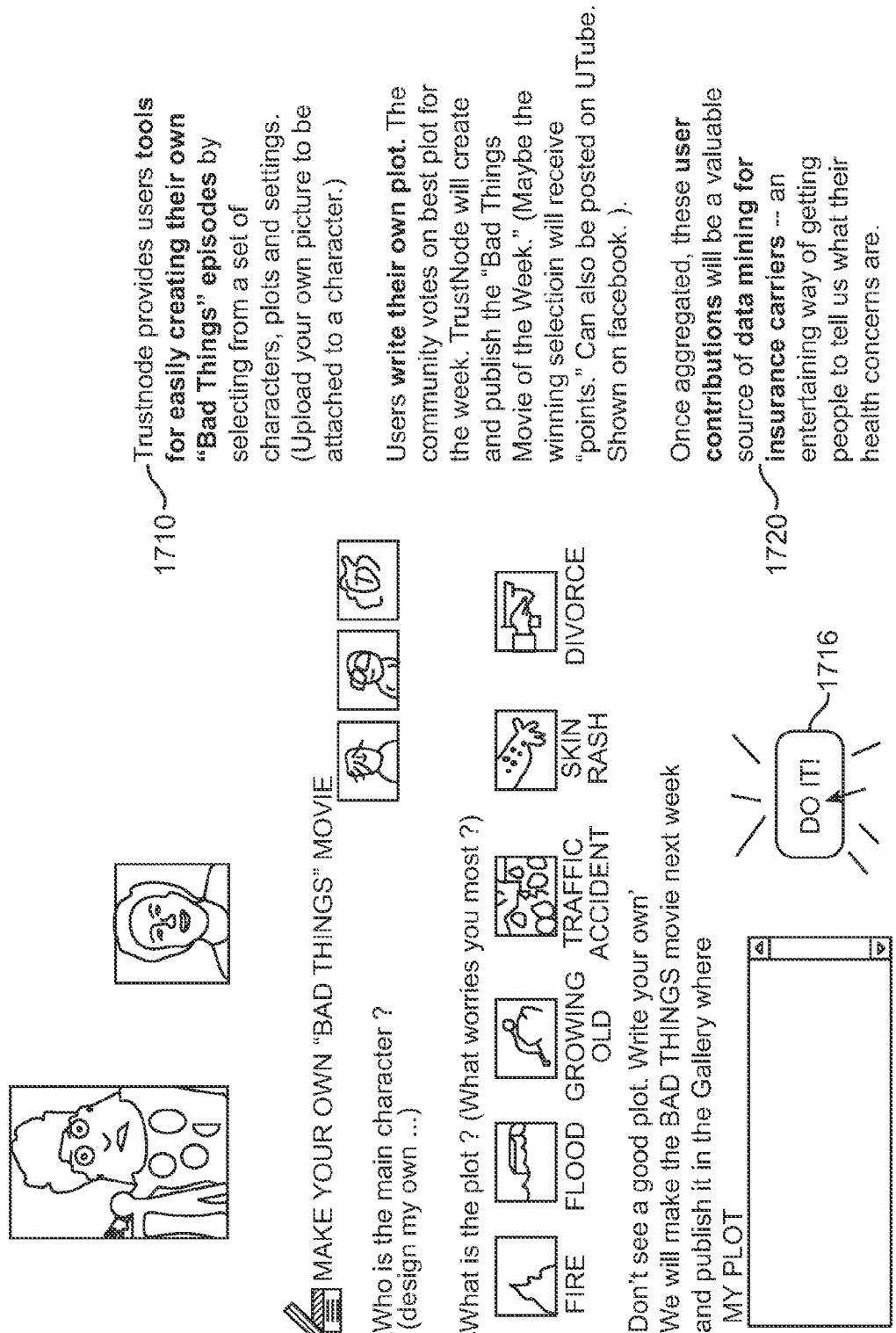
FIG. 17 illustrates how, in one embodiment, user-created content continues to keep consumers engaged throughout the various stages of a complex transaction.

One particular technique for keeping users engaged with the system is illustrated in FIG. 17. Just as the system deploys pre-generated "Bad Things Happen" episodes on various network platforms (websites, social networks, users' home or worksite computer desktops, etc) to engage prospective customers, the system also enables users to customize and generate such episodes themselves. These user-generated episodes are made possible by tools 1710 provided to users via the system.

System tools 1710 enable users to select and generate their own characters 1712 as well as their own plots and storylines 1714. For example, users might select from among the system's branded cartoon characters or design their own characters, perhaps based upon actual images of themselves, their friends, business associates or celebrities. In addition, users can select from among various scenarios (eg, a traffic accident, flood or earthquake) and deploy their chosen characters into these scenarios while crafting a plot or storyline determining the experiences and interactions among these characters and their environment. For example, one might choose to "accidentally" crash into their boss' car, who then falls off a bridge into the raging rapids below.

Apart from their pure entertainment value, these user-generated episodes keep users engaged with the system in a context that is still relevant to the products and services being offered (eg, long-term disability insurance). In one embodiment, users can publish their creations 1716 and share them with their friends and other system users on various network platforms. These episodes are rated by other users, with higher ratings resulting in points or other incentives (eg, T-Nodes) being awarded to system users who create the most popular episodes.

Finally, it should be noted that, in one embodiment, the information relating to these user-generated episodes (eg, the types of accidents or scenarios that users select and create, or that other users find most compelling) serves as a valuable source for data mining 1720 by the vendors (eg, insurance carriers) of the products and services offered via the system. For example, while statistics might indicate that a particular type of accident is more likely to result in a long-term disability, users might be more able to relate to such an accident as part of one of these episodes involving characters with which they may even be familiar. Such visual illustrations are more likely to be persuasive in driving home the point that such accidents, though unlikely, may merit insurance against the significant economic downsides that could result from such accidents (which can also be illustrated in these episodes).

In one embodiment, the system provides a balance by ensuring that the "cause and effect" (eg, an accident or natural disaster and its aftermath, such as the victim being unable to work for a period of time) are present in any user-created episode, while still allowing users a great deal of freedom to select and create characters, plots and storylines within certain pre-imposed constraints. This freedom, coupled with various incentives, keeps users entertained and engaged in the process, while still affording opportunities for further education and potential transactions with respect to the products and services offered via the system. Such techniques may not be as useful in a simple retail transaction, but they are particularly important when selling insurance and other financial service products and services that often require a long and complex sales cycle.

Figure 18:
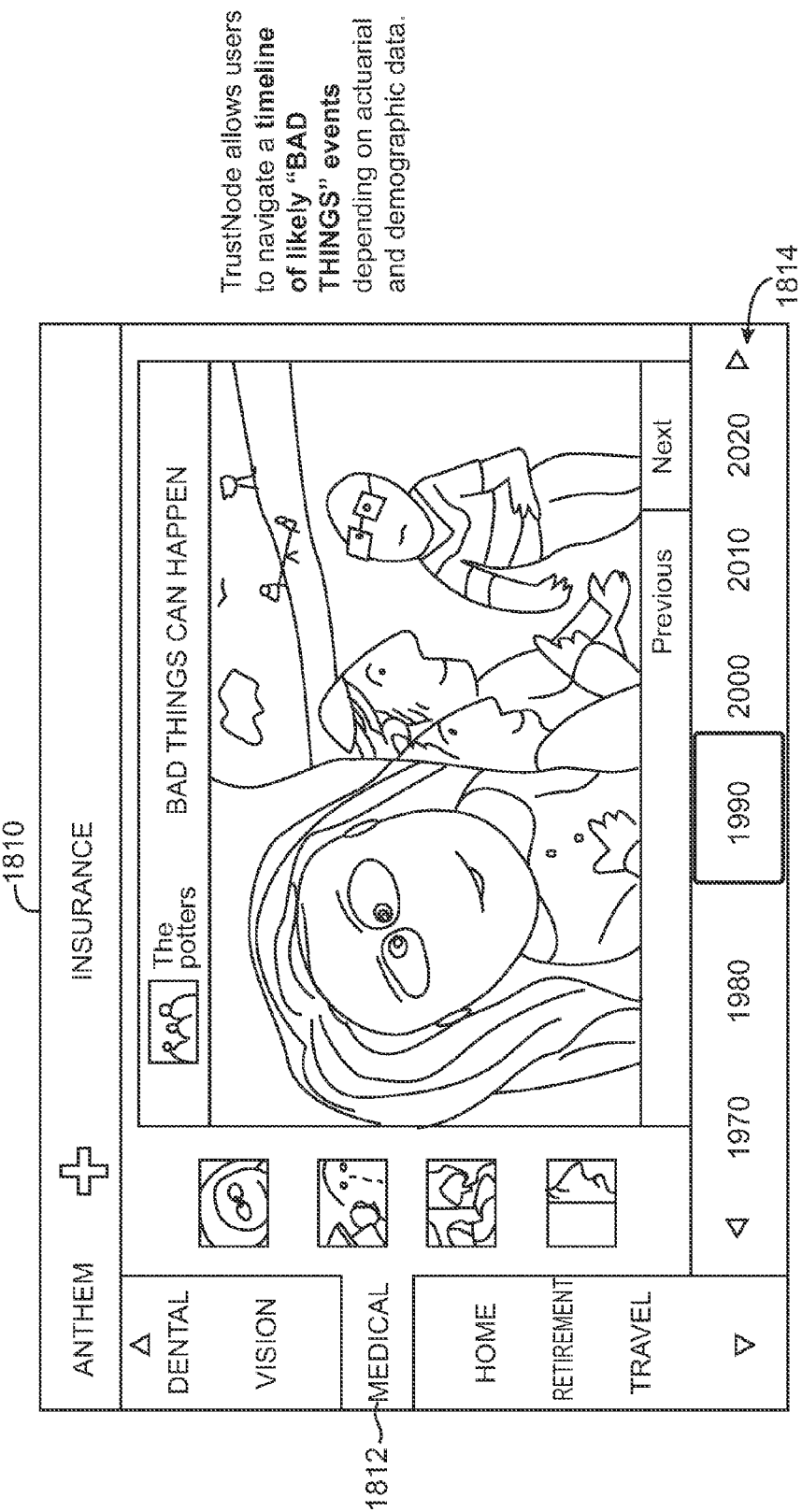
FIG. 18 illustrates an embodiment of a "timeline navigator" that portrays potential events (and solutions) that occur over time, based upon actuarial, demographic and other data.

An embodiment of another mechanism for keeping users engaged over a long period of time—timeline-based vignettes—is illustrated in FIG. 18. These vignettes, controlled via timeline navigator 1810, illustrate how particular types of products and services 1812 become more relevant during particular periods of time 1814 over the course of a person's life. For example, when a couple is about to have a baby, certain types of medical coverage become more relevant. Yet, advance planning may be necessary to acquire such coverage.

These timeline-based vignettes are an effective educational and lifetime planning tool that can be personalized to a customer's particular situations and experiences. In one embodiment, this timeline structure is implemented within the user-generated episodes discussed above in FIG. 17. In other embodiments, distinct timeline-based vignettes are generated automatically by the system and personalized to a particular customer and made available via timeline navigator 1710. Customers can invoke these vignettes on their own initiative, or be alerted automatically by the system when a particular event becomes timely and of greater relevance.

For example, in one embodiment, if the system is aware of the age of a customer or family member, it alerts the customer to a relevant change in an existing product or service or a new product or service that becomes relevant based upon reaching a particular age. A child reaching driving age will of course require auto insurance, which can be pre-marketed by the system via an advance alert. Marriage, retirement, death and other time-related events are predicted by the system (or known based upon user input provided in other contexts) and form the basis of an alert.

Moreover, in one embodiment, the system utilizes actuarial and demographic data (in addition to a particular customer's personal data) to illustrate the types of events that can occur, as well as how to insure against them. By relying upon a personalized timeline, the system's "cause and effect" scenarios and potential solutions are more relevant to prospective and actual customers. Rather than being the result of a random sales call, these timeline-based vignettes are invoked in a particularly "timely" manner (eg, via a system alert on a user's desktop computer) and thus are more likely to acquire and maintain a user's attention. As noted above, education s more effective when provided in bite-sized chunks at appropriate times, particularly while still allowing for user control and interaction in the process.

FIG. 19 illustrates a related concept—geographically-based vignettes. In one embodiment, a geographic navigator 1910 is employed to illustrate particular scenarios that are more relevant to specific geographic regions. Users view episodes illustrating these scenarios (perhaps in the context of an educational vignette) and interact with their trusted advisor, virtual agent Harvey Keck 1920, who recommends various potential solutions tailored to a particular geographic region.

Here too, these geographically-based vignettes, in one embodiment, can be the subject of user-generated episodes, such as a flood or earthquake using a customer's home town as a backdrop. They can of course be personalized to the customer's particular geographic area, as well as other areas where family members might reside. A customer considering a move (eg, due to a change in employment) could quickly ascertain any advantages or disadvantages due to the different insurance plans offered in other geographic areas.

Moreover, if the system becomes aware of such a change in location via information obtained in another context, it immediately alerts the user (in one embodiment) to any relevant differences in products and services offered in the new location. The ability to use geographic navigator 1910 as a planning tool (whether invoked by the customer or via a system alert) is a valuable resource, particularly when supplemented with actuarial and demographic aggregate data, as well as individual personalized data targeted to a customer and family members.

Long-Term Disability Scenario

Figure 20:
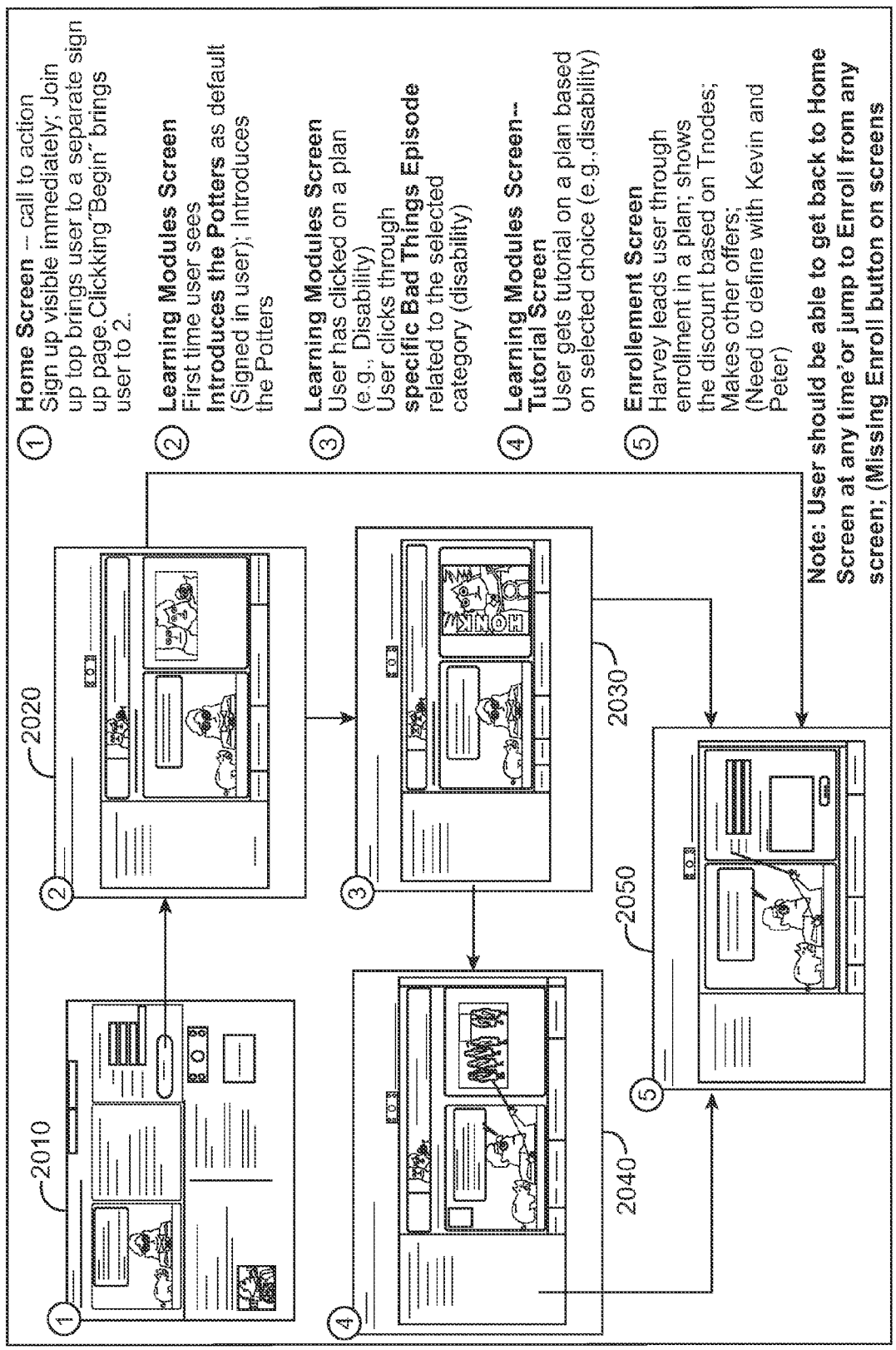
FIG. 20 illustrates an embodiment of prospective consumers' transitions among various stages of a complex transaction.

Having discussed the various stages of a complex transaction, FIG. 20 illustrates an embodiment of various transitions among these stages. As noted above, users remain in control and can interrupt this process, leaving and returning to the system, jumping from one stage to another, repeating a stage or a particular episode, etc. In this respect, users determine the speed with which they proceed through episodes and learning modules, as well as when they are ready to move forward or backward, or simply take a break.

Having been engaged in the system (eg, via a Facebook application), a prospective customer navigates at some point (eg, via a link) to a "home screen" such as screen 2010 (which, in other embodiments, consists of multiple screens). At this stage, prospective customers are introduced to virtual agent, Harvey Keck, receive some basic industry information (eg, a statistic relating to a particular product or service in which they have expressed interest, if only by playing a particular game or application) and are asked for some general biographical information, such as their name and email address. General system features are also explained, such as the use of T-Nodes as incentives for proceeding further into the process in exchange for merchandise and discounts on various core and ancillary products and services.

Having signed up, prospective customers are directed to various learning modules, as illustrated in screen 2020, reflecting their entry into the educational stage of the process. At this stage, they are introduced to other branded cartoon characters, such as the "Potter Family," who are the subject of various learning module episodes. Some of these characters may already be familiar to prospective customers who encountered one or more of them in an engaging game, application or episode on another network platform, such as a social network.

Eventually, a prospective customer selects a particular learning module of interest (eg, long-term disability or LTD) and, in one embodiment, receives T-Nodes as an incentive for continuing to become educated regarding potential products and services of interest. The customer is directed to the beginning of one of various relevant educational LTD episodes, such as the one illustrated in screen 2030.

Upon completion of that episode, a prospective customer is directed to the beginning of LTD learning module 2040, in order to be educated in greater detail regarding various aspects of relevant LTD plans. In one embodiment, this learning module includes multiple "bad things happen" episodes and alternative LTD plans—targeted to the prospective customer's specific biographical and general demographic data. In addition, the system affords prospective customers the opportunity to ask questions to clarify certain details or obtain additional information, as well as browse through additional materials. As noted above, certain questions may require the intervention of a live human expert whose answers are, in one embodiment, delivered via virtual agent Harvey Keck.

Certain prospective customers will, at some point in this process, elect to enroll in a desired plan, as illustrated in screen 2050. Having entered this transactional stage, a customer will be directed through the enrollment process by virtual agent Harvey Keck, who will ask for additional required information relevant to the selected plan. As noted above, this process, in one embodiment, requires multiple screens, and can be interrupted by the necessity of human intervention (eg, to schedule and perform a blood test). Once this process reaches completion, eg, when the customer selects the "submit" button and is informed of the results of the enrollment process (eg, premiums, plan and payment details, etc), the customer transitions to the "Service" stage (not shown) as discussed above.

FIGS. 21a-21ii illustrate an embodiment of this process and the two-way exchange of information in the context of a specific learning module relating to Long-Term Disability insurance. They highlight certain aspects of the step-by-step process a prospective customer experiences shortly after the initial engagement process (eg, after clicking on a link for additional information after playing a game or application on a social network).

Figure 21B:
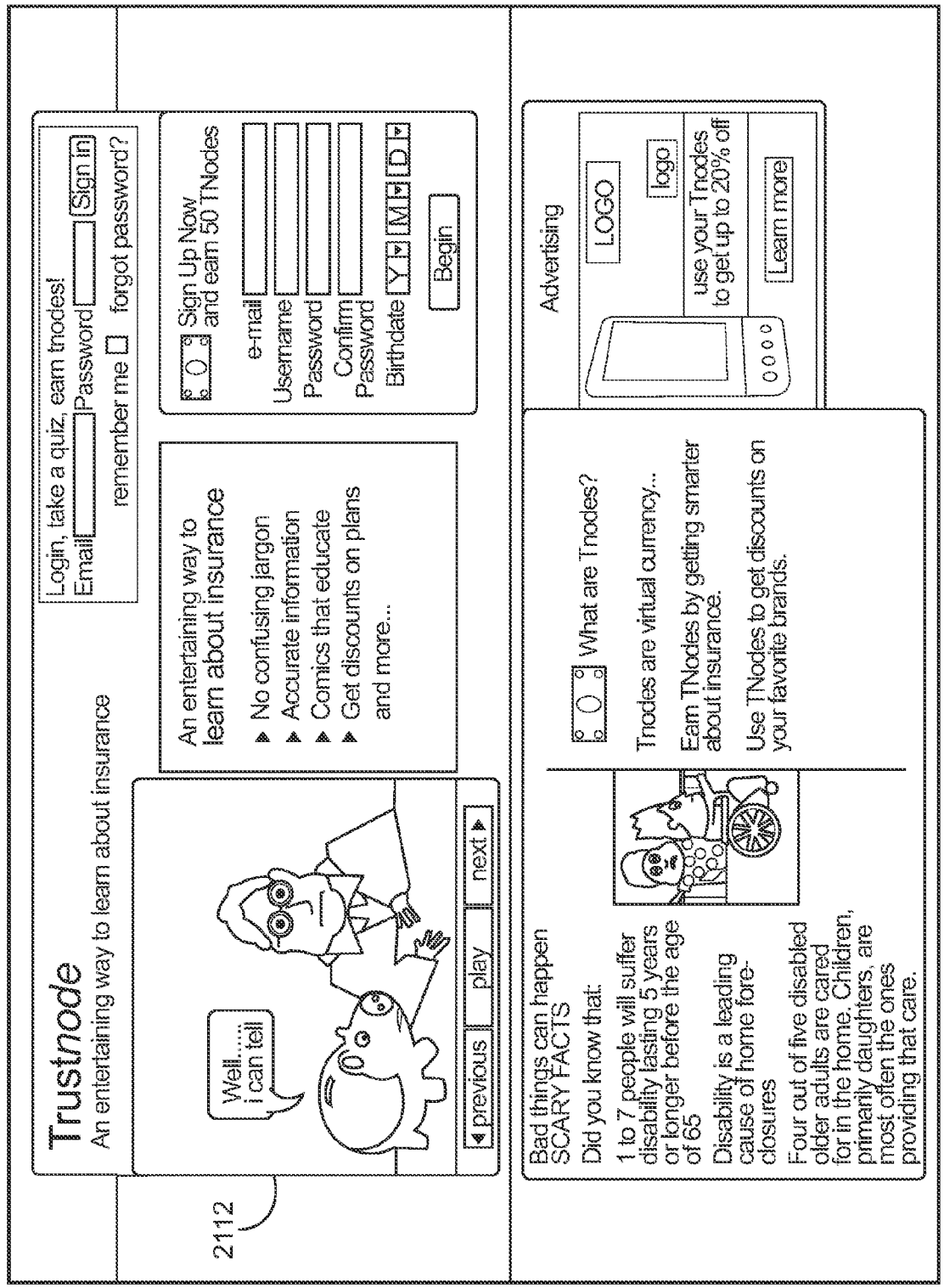
FIGS. 21a-21ii illustrate an embodiment of an interactive scenario in which a prospective customer interacts with a virtual sales agent and other branded cartoon characters in the context of a "long term disability" learning module.
Figure 21D:
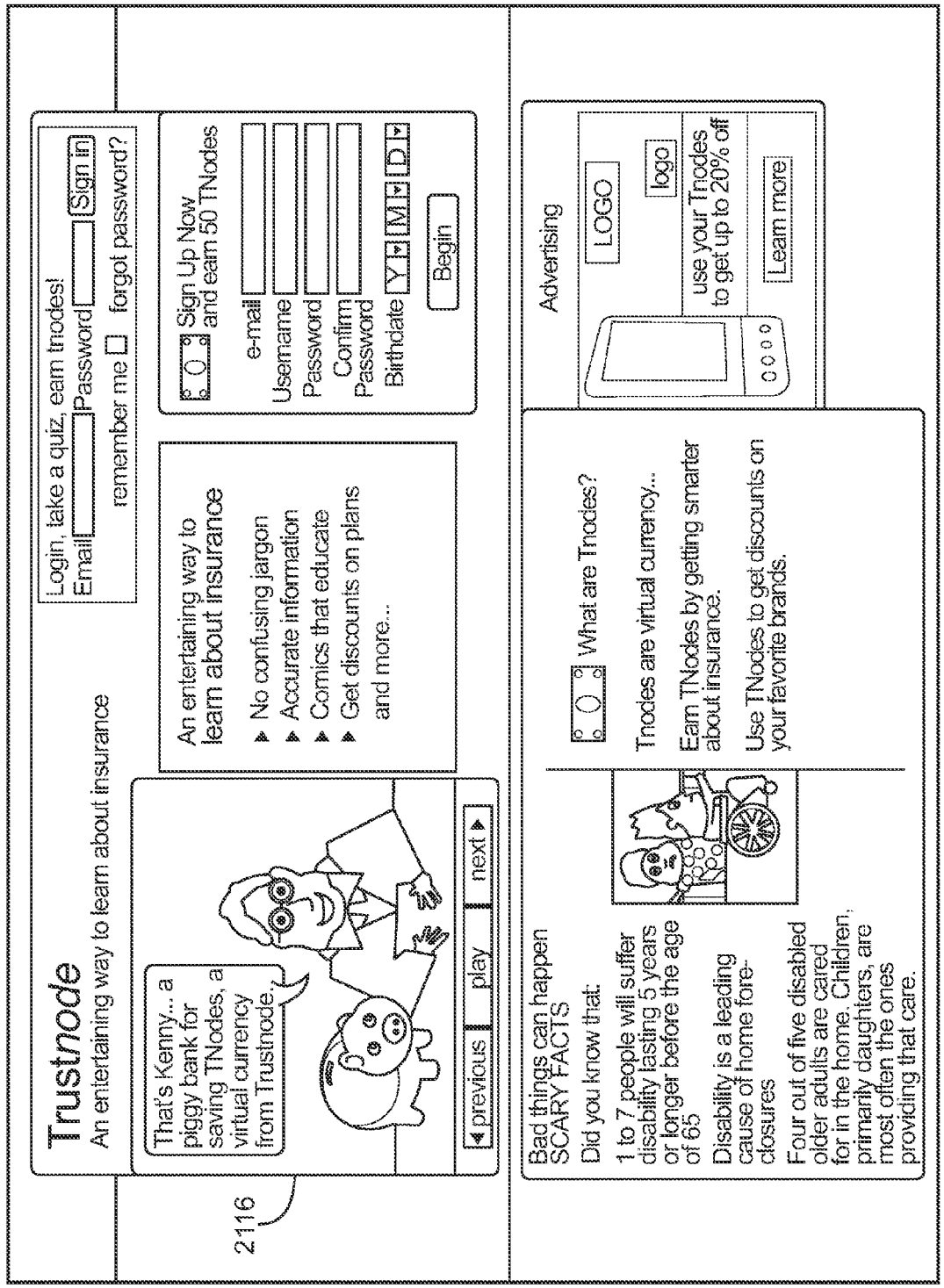
Figure 21F:
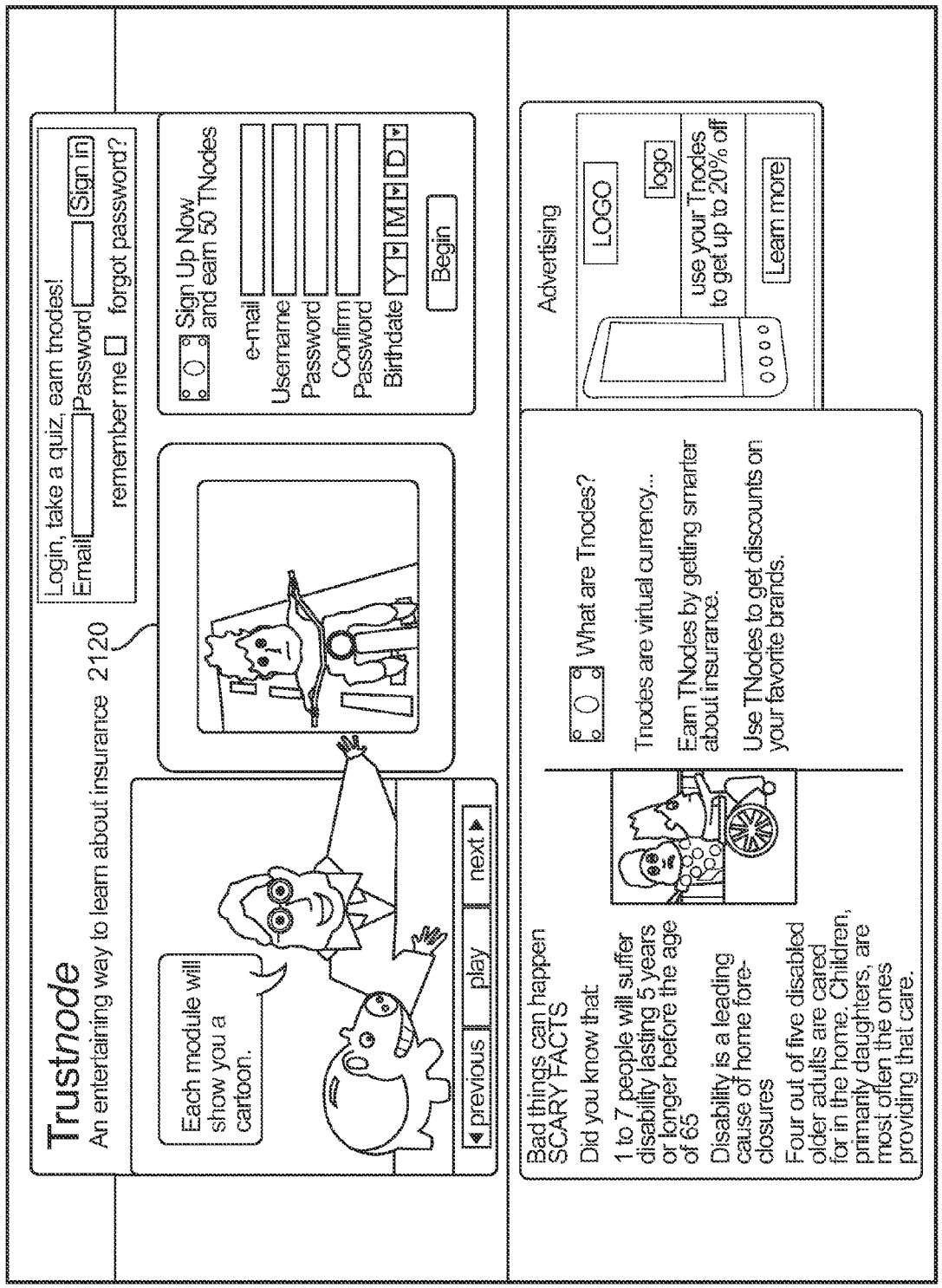
Figure 21G:
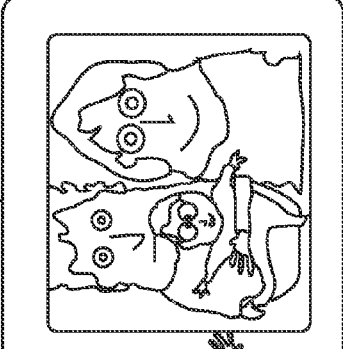
Figure 21H:
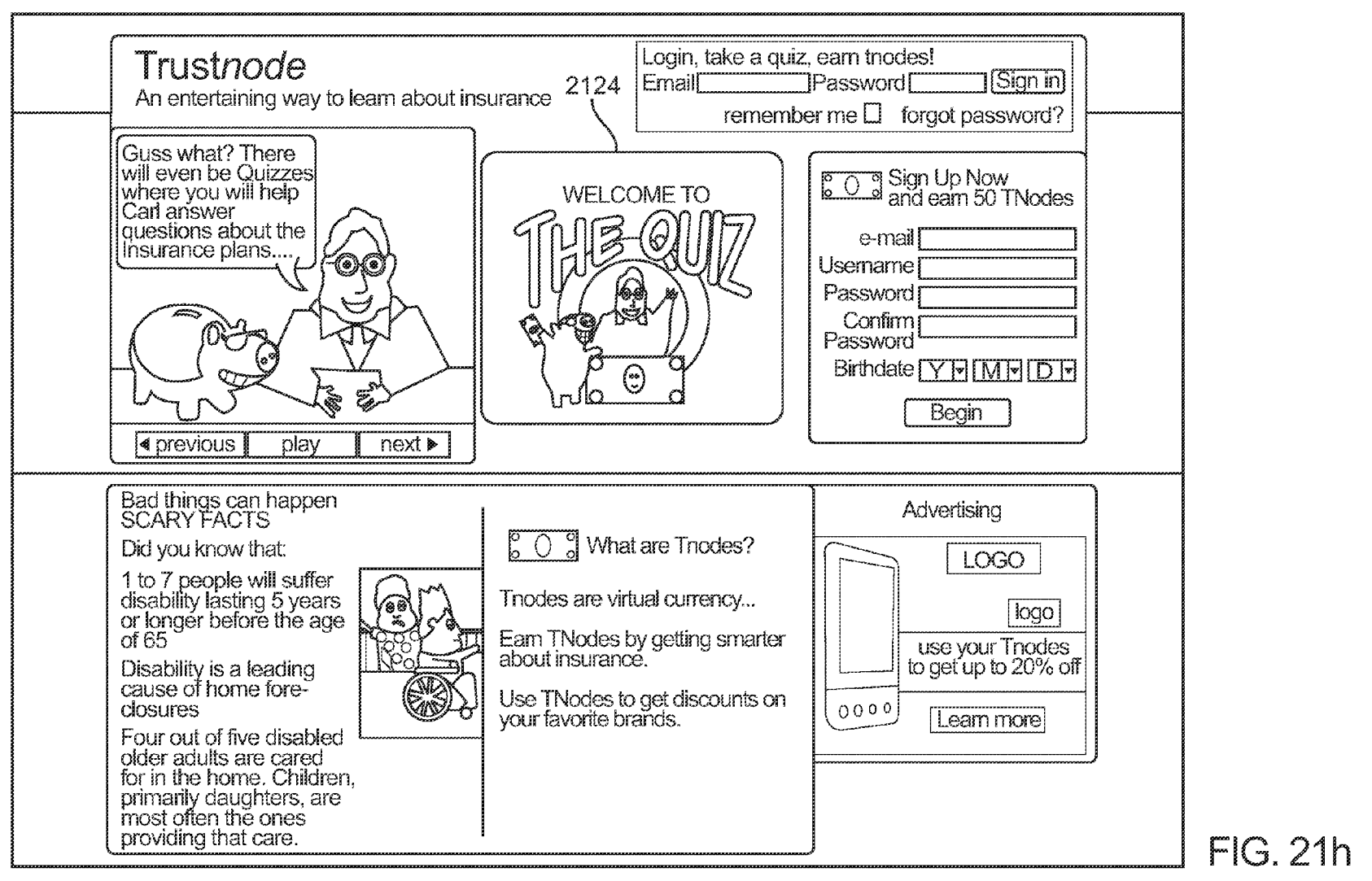
Figure 21I:
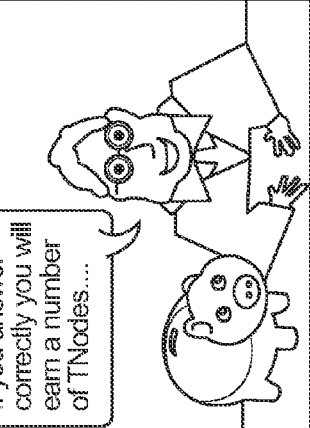
Figure 21J:
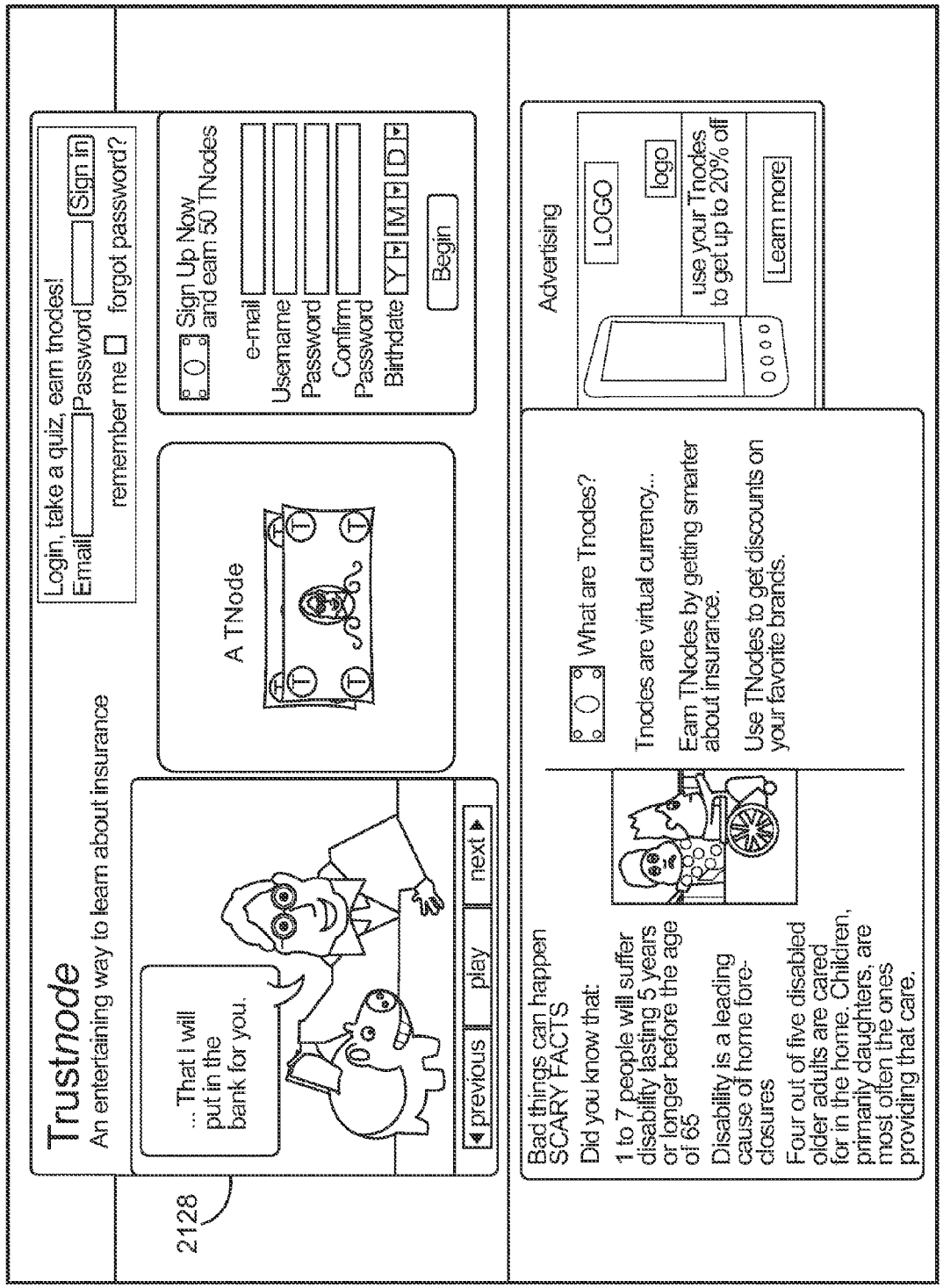
Figure 21K:
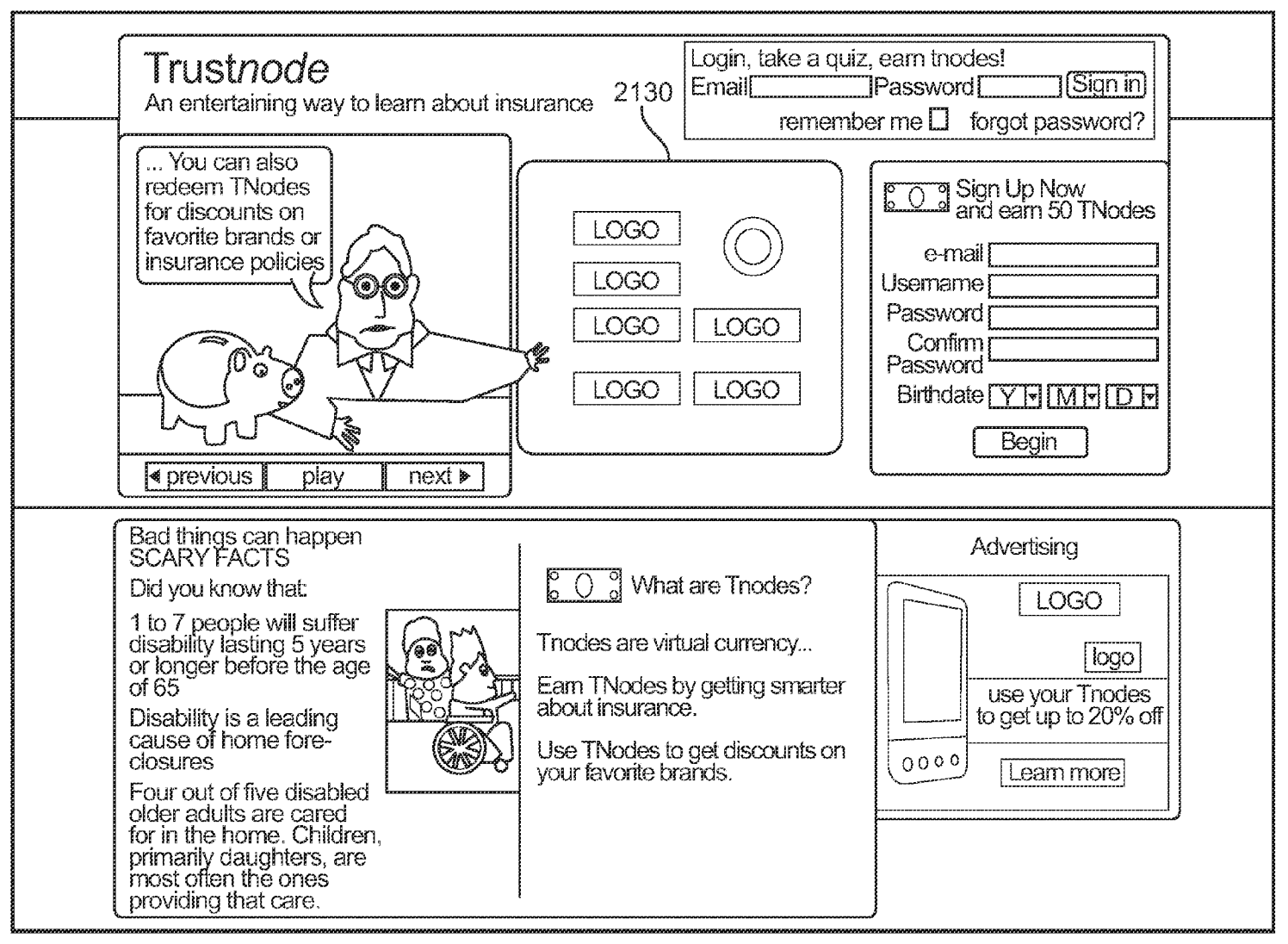
Figure 21I:
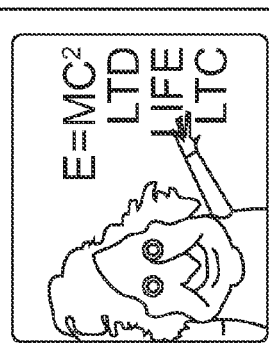
Figure 21M:
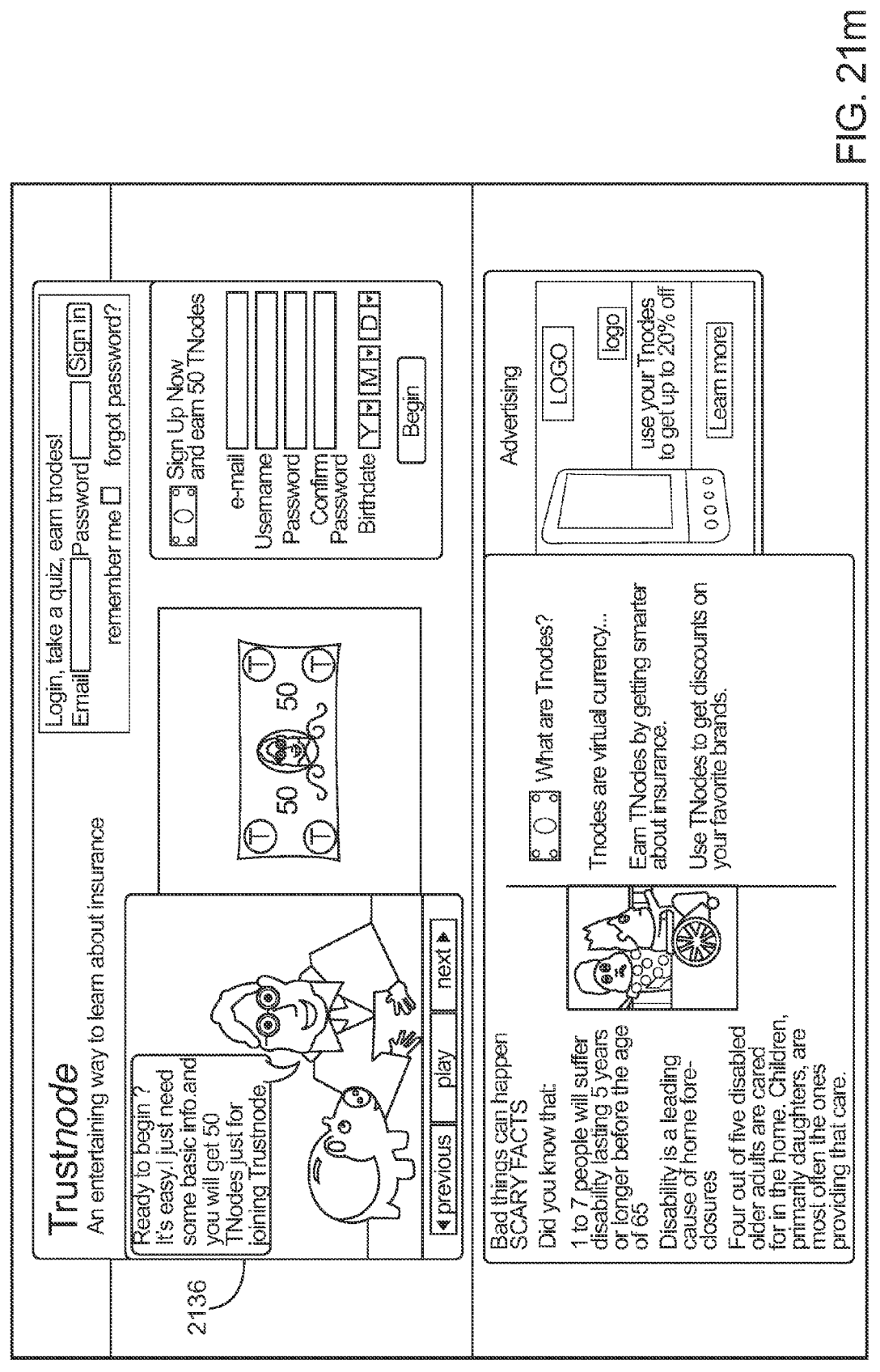
Figure 21N:
Figure 21O:
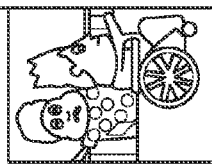
Figure 21P:
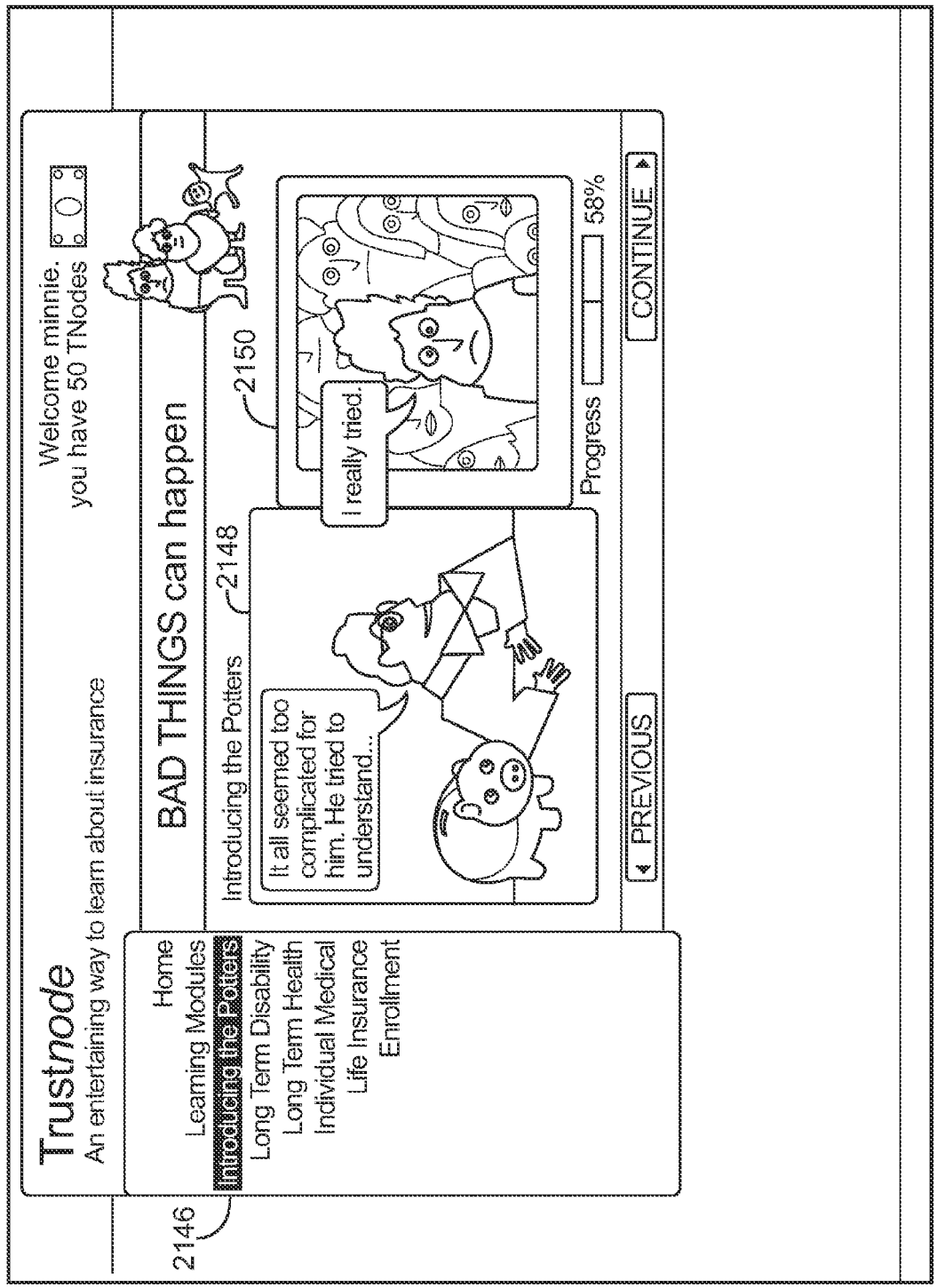
Figure 21Q:
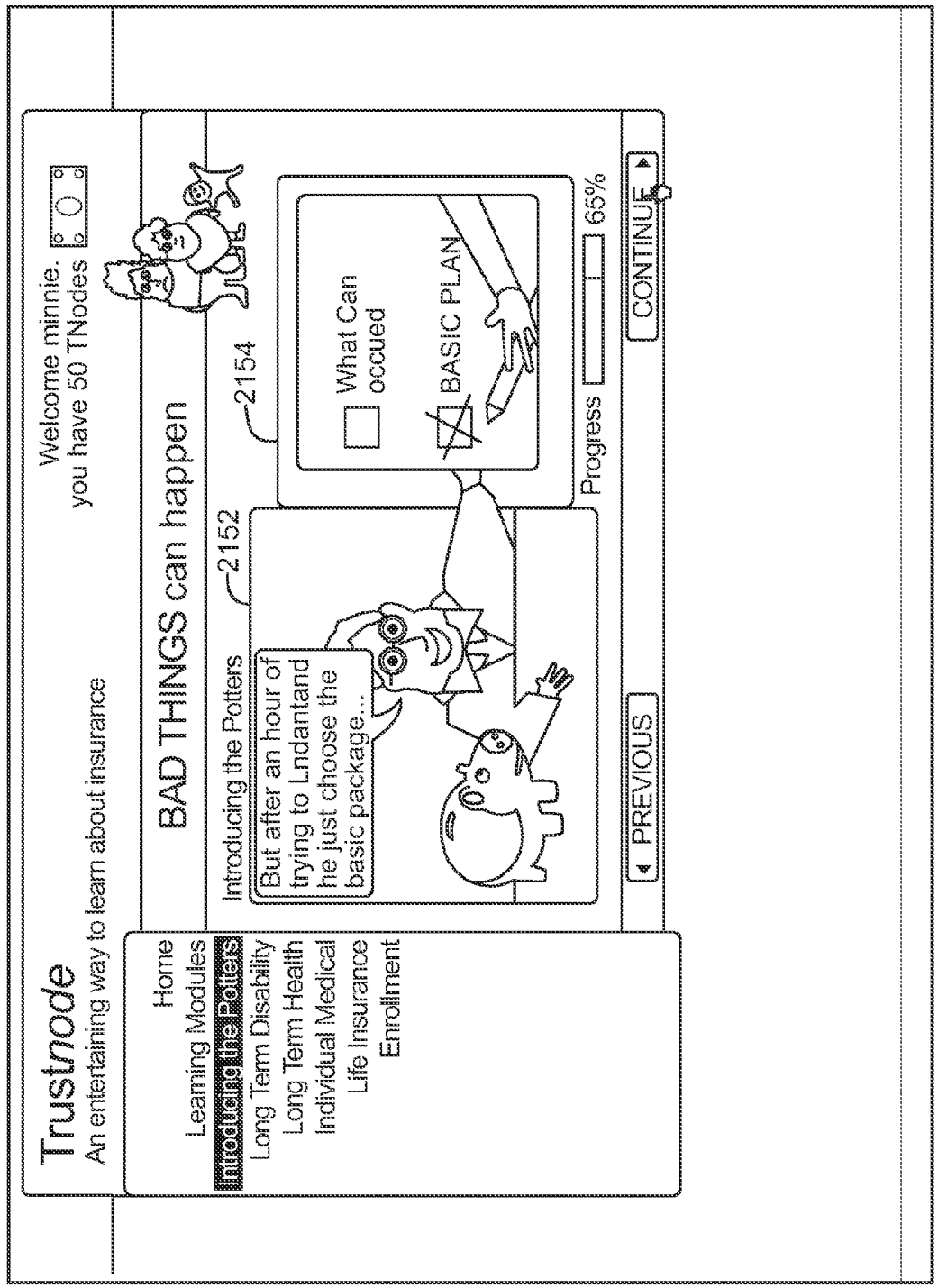
Figure 21R:
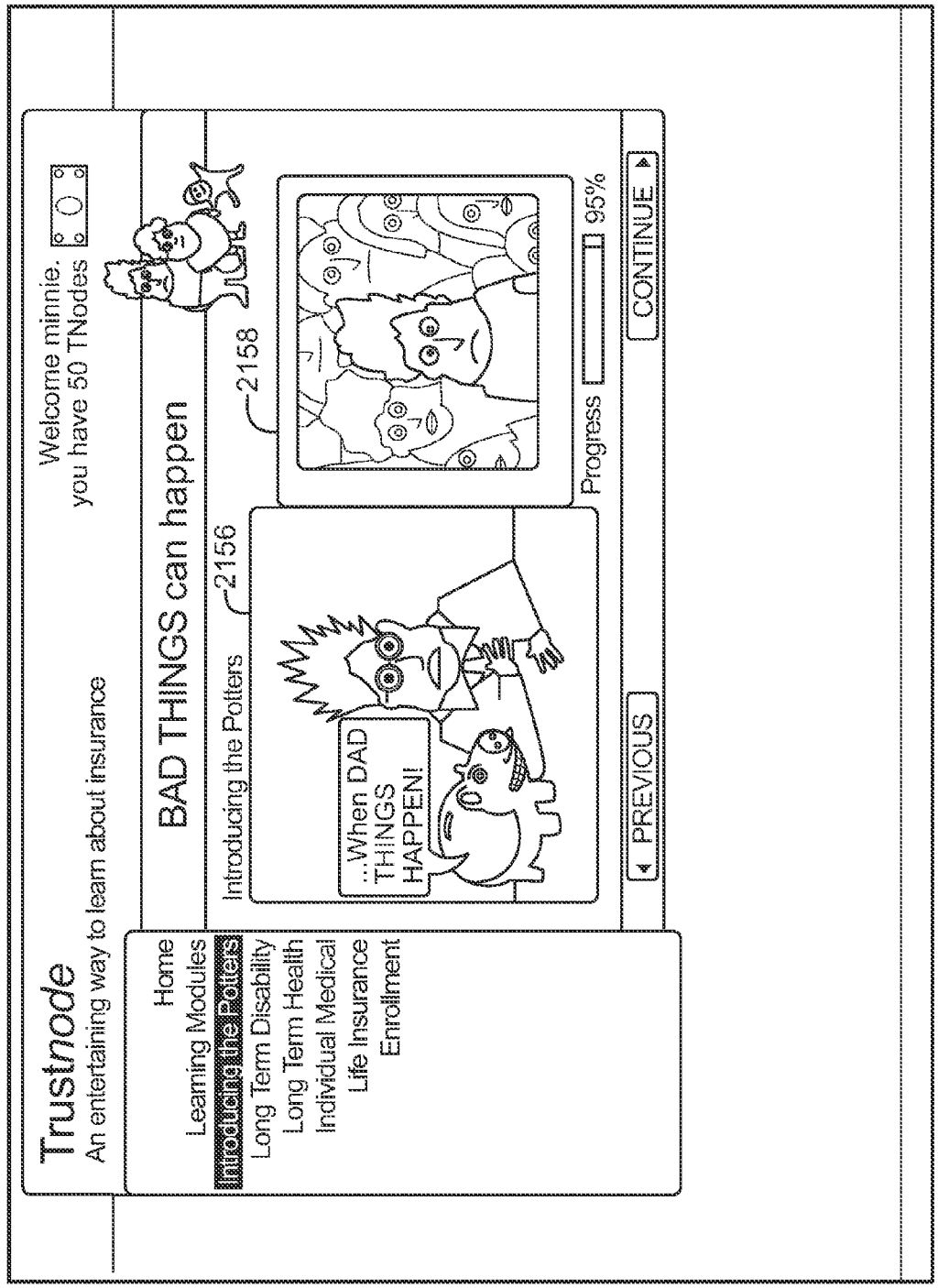
Figure 21S:
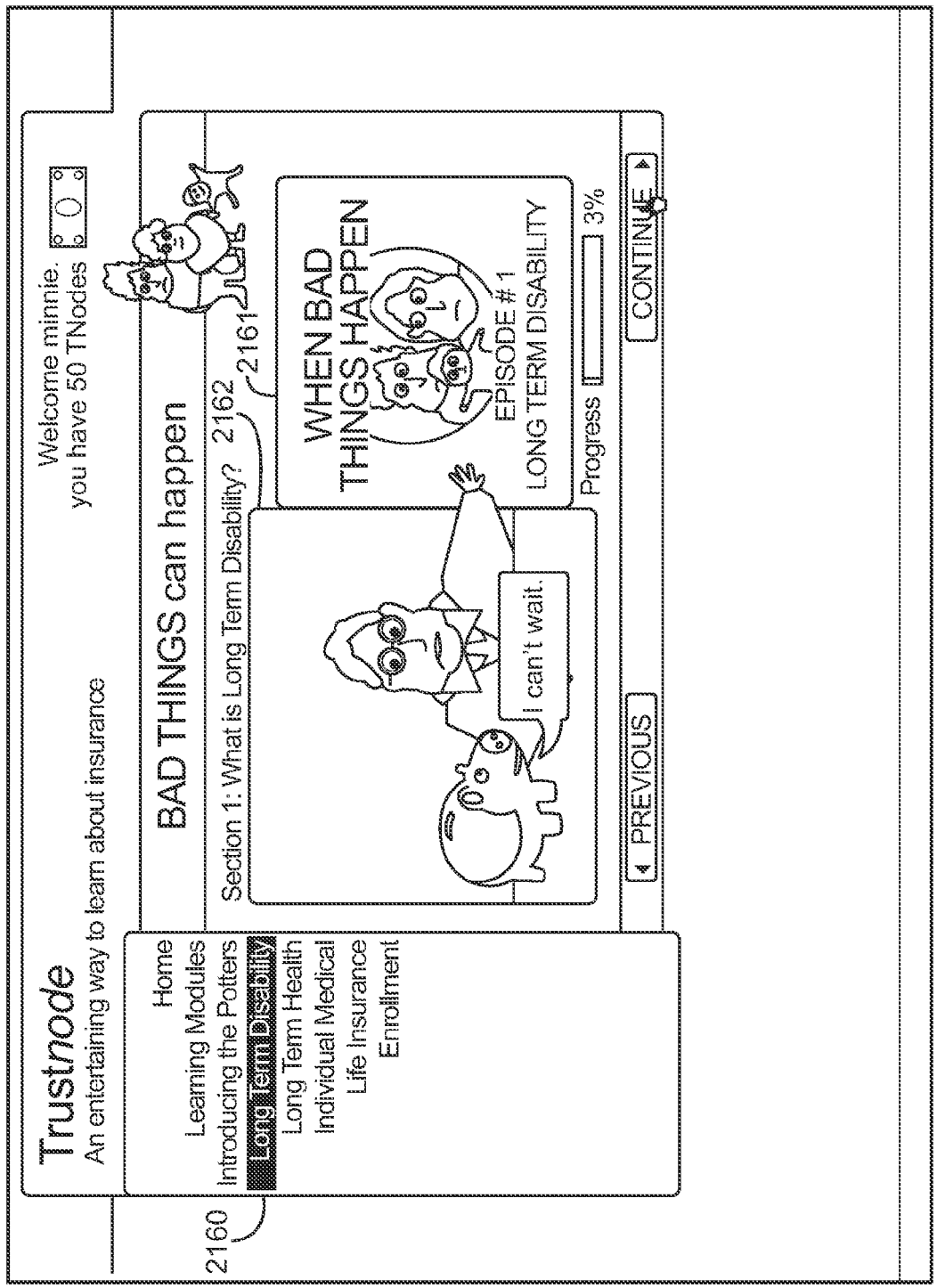
Figure 21T:
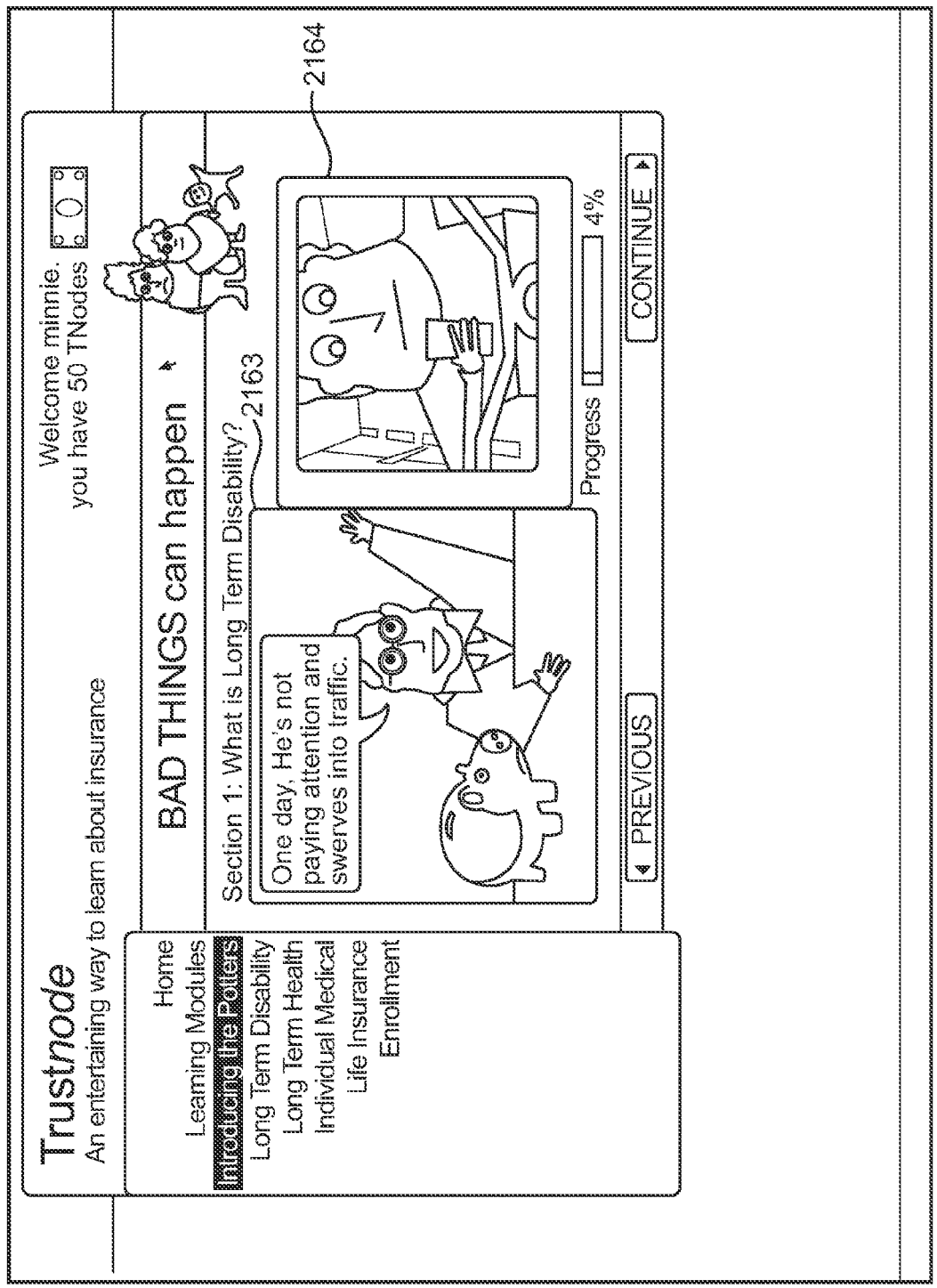
Figure 21U:
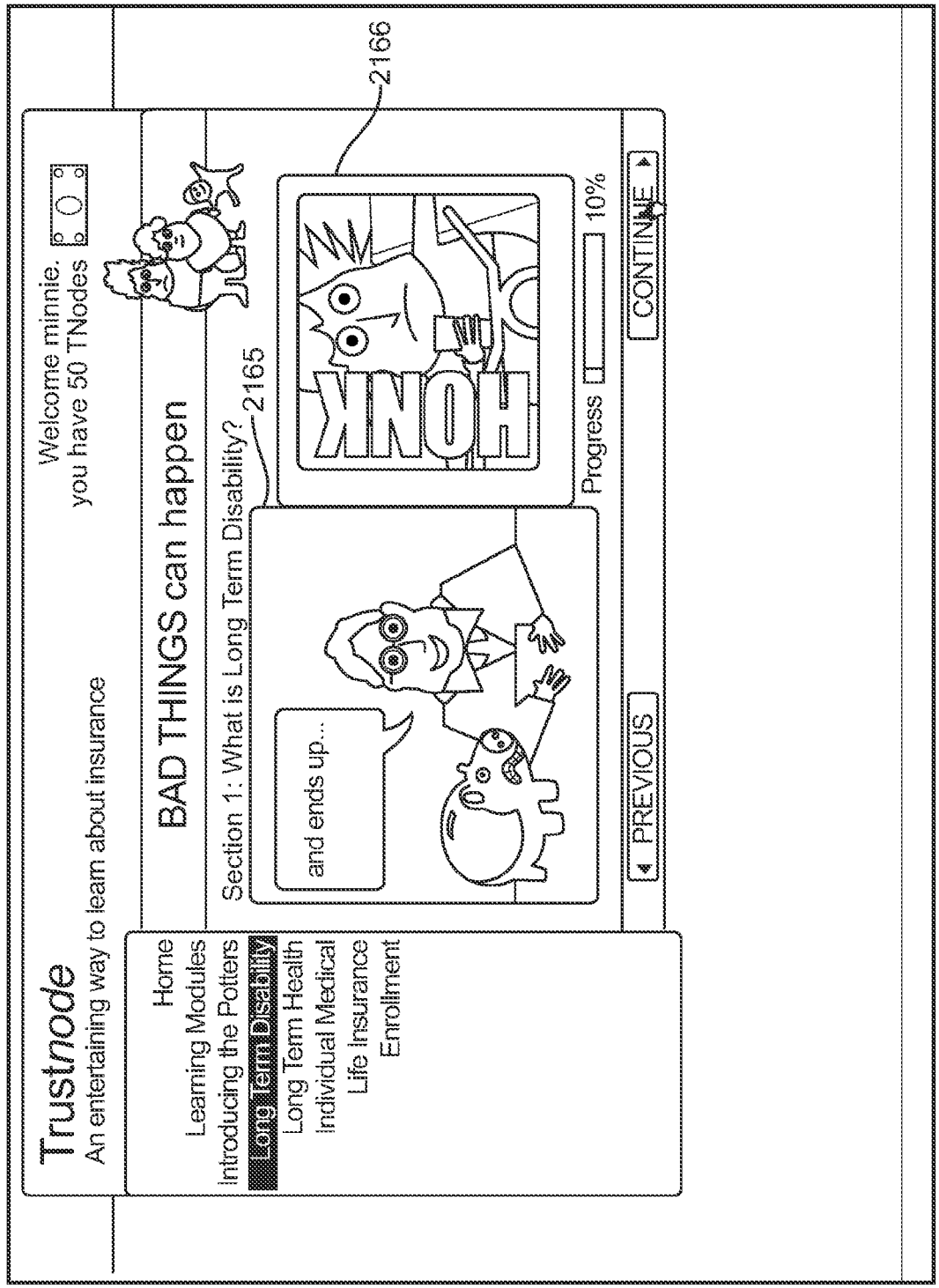
Figure 21V:
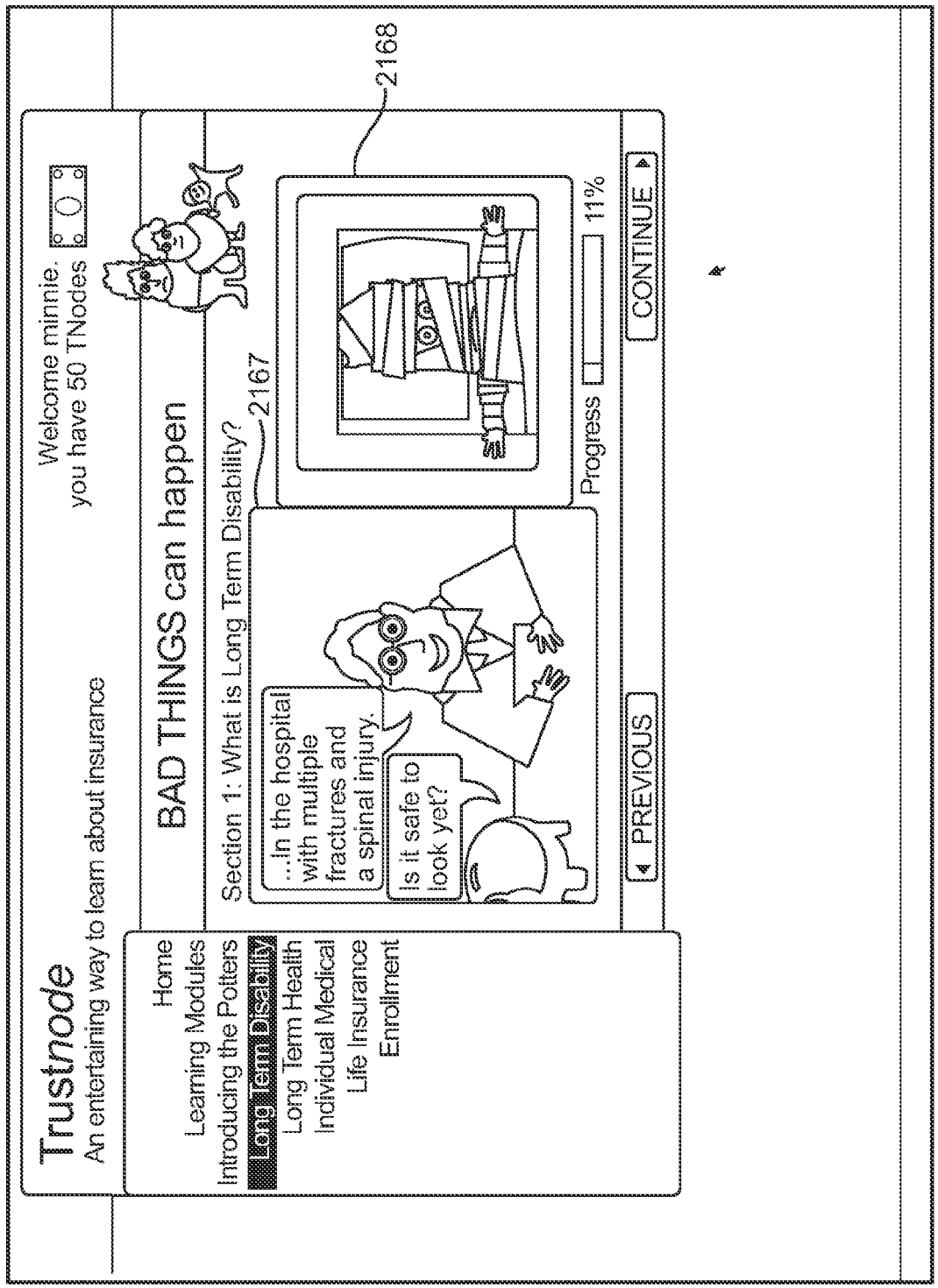
Figure 21W:
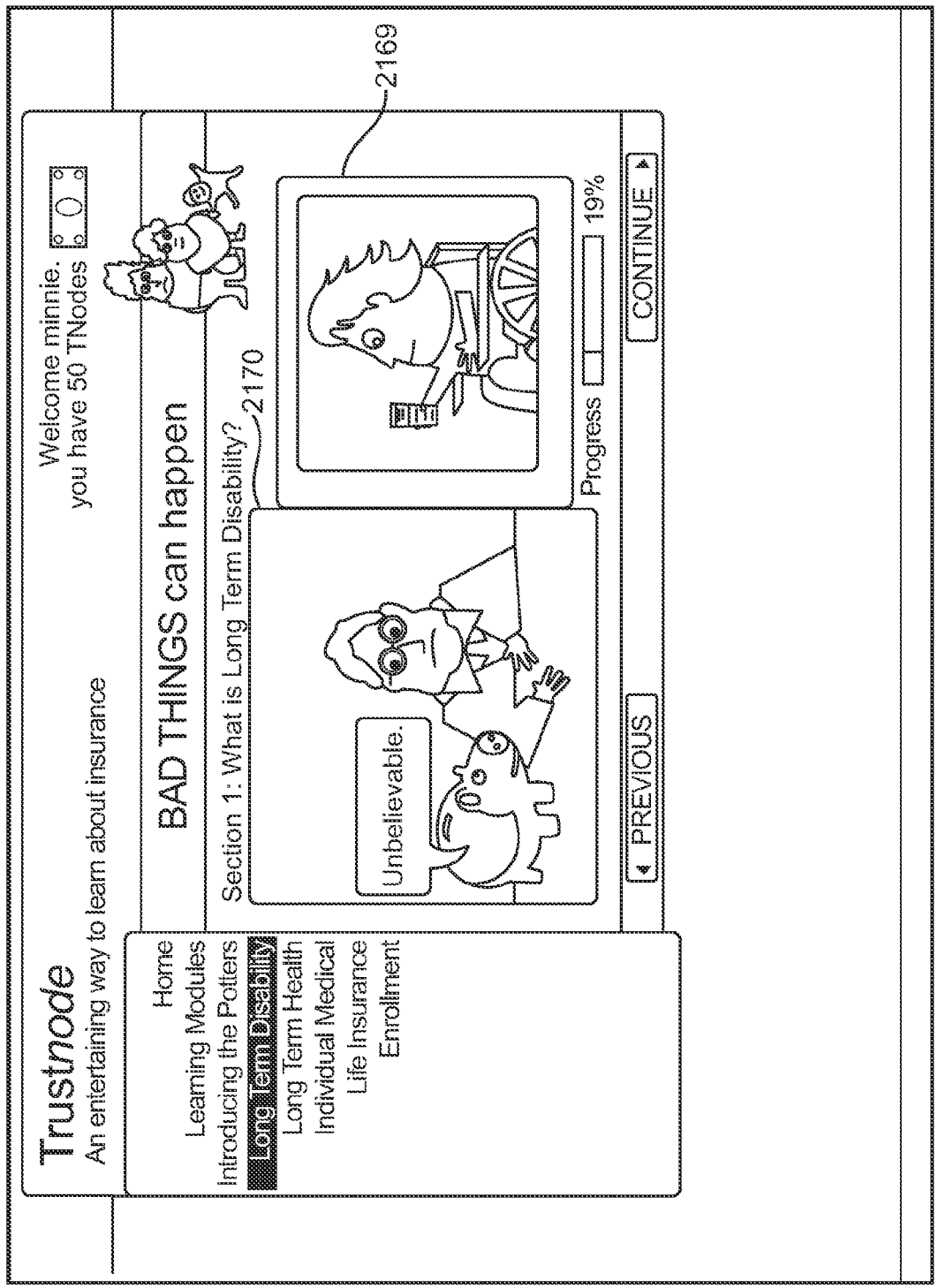
Figure 21X:
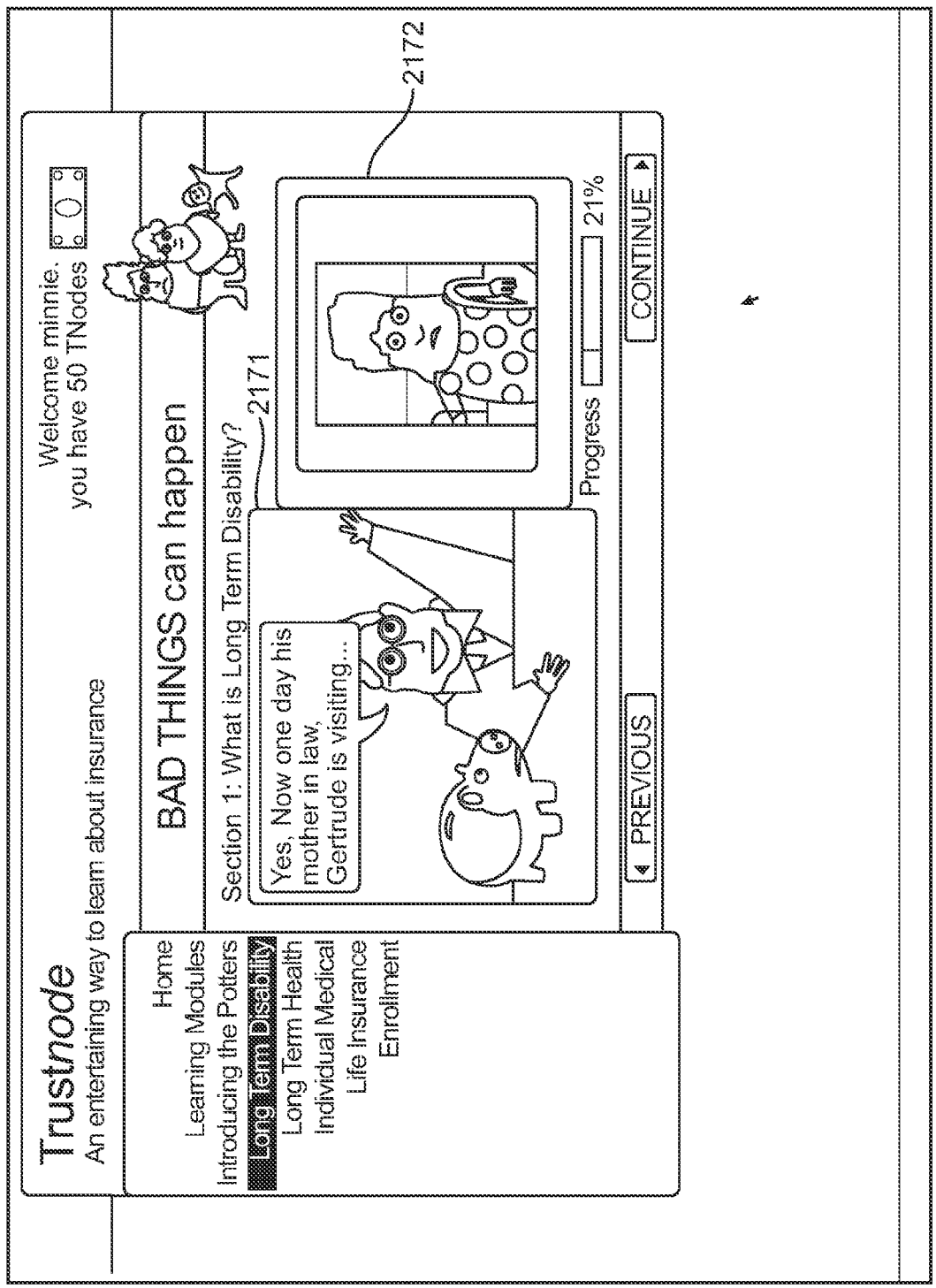
Figure 21Y:
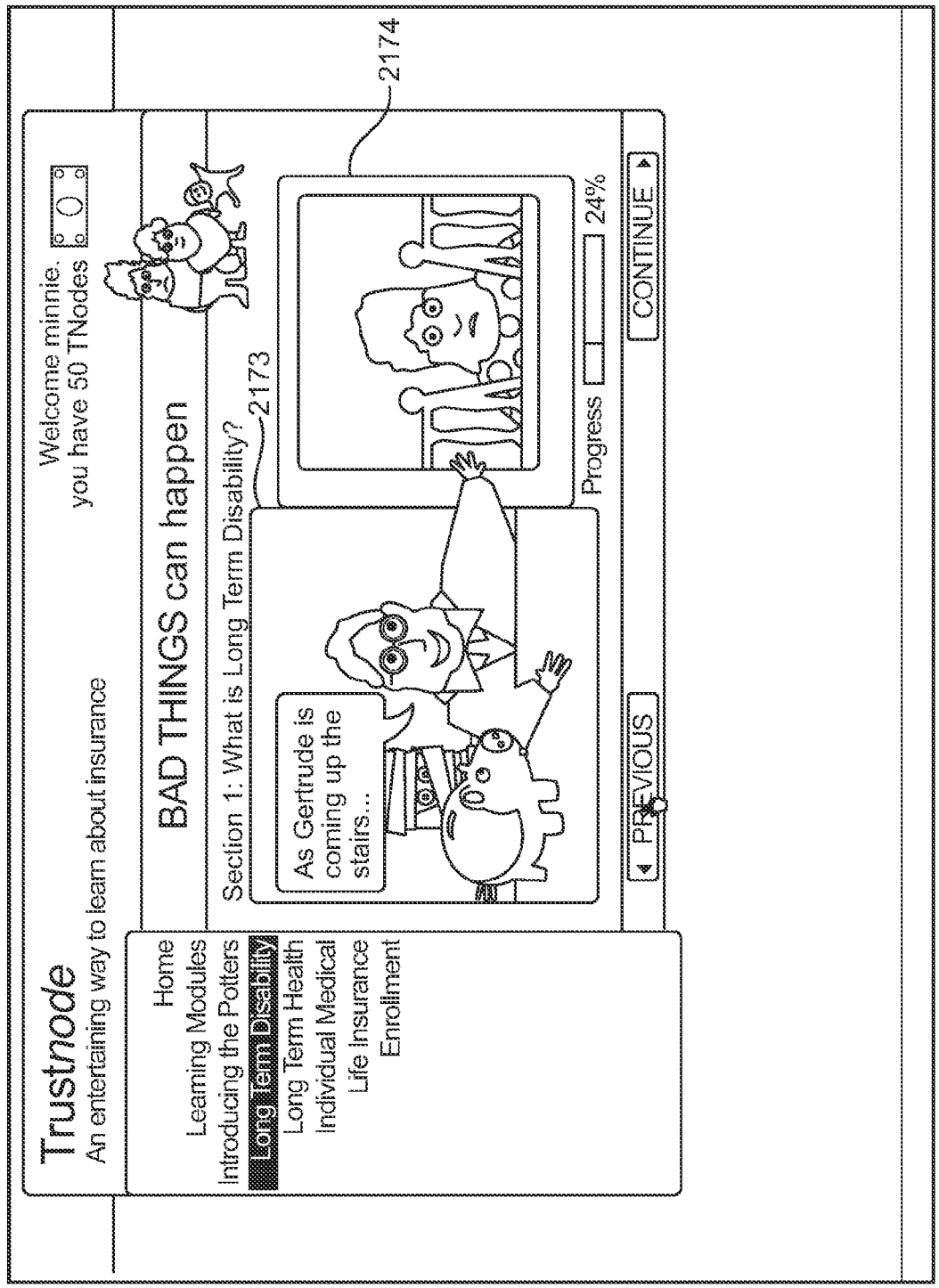
Figure 21Z:
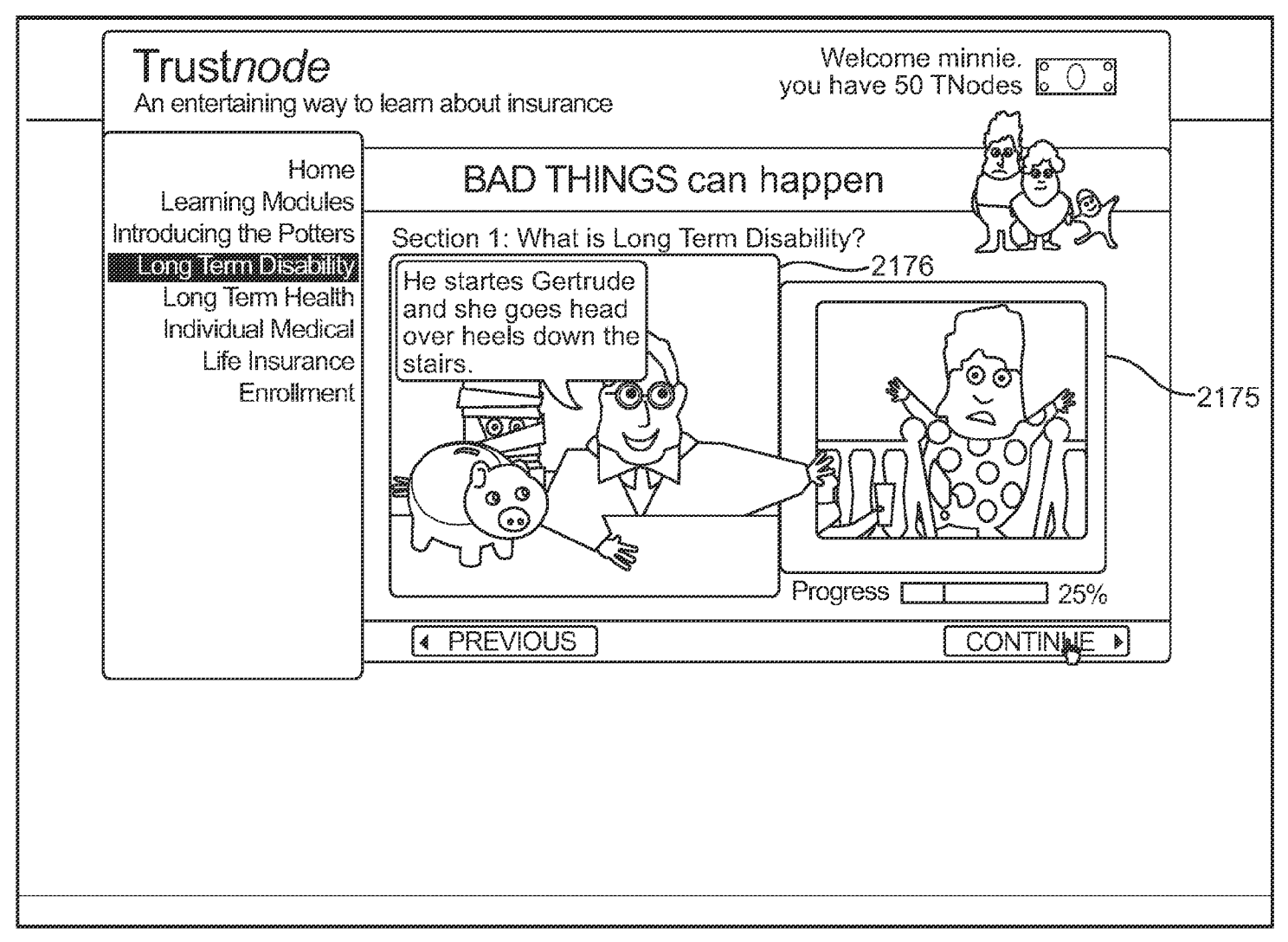
Figure 21A:
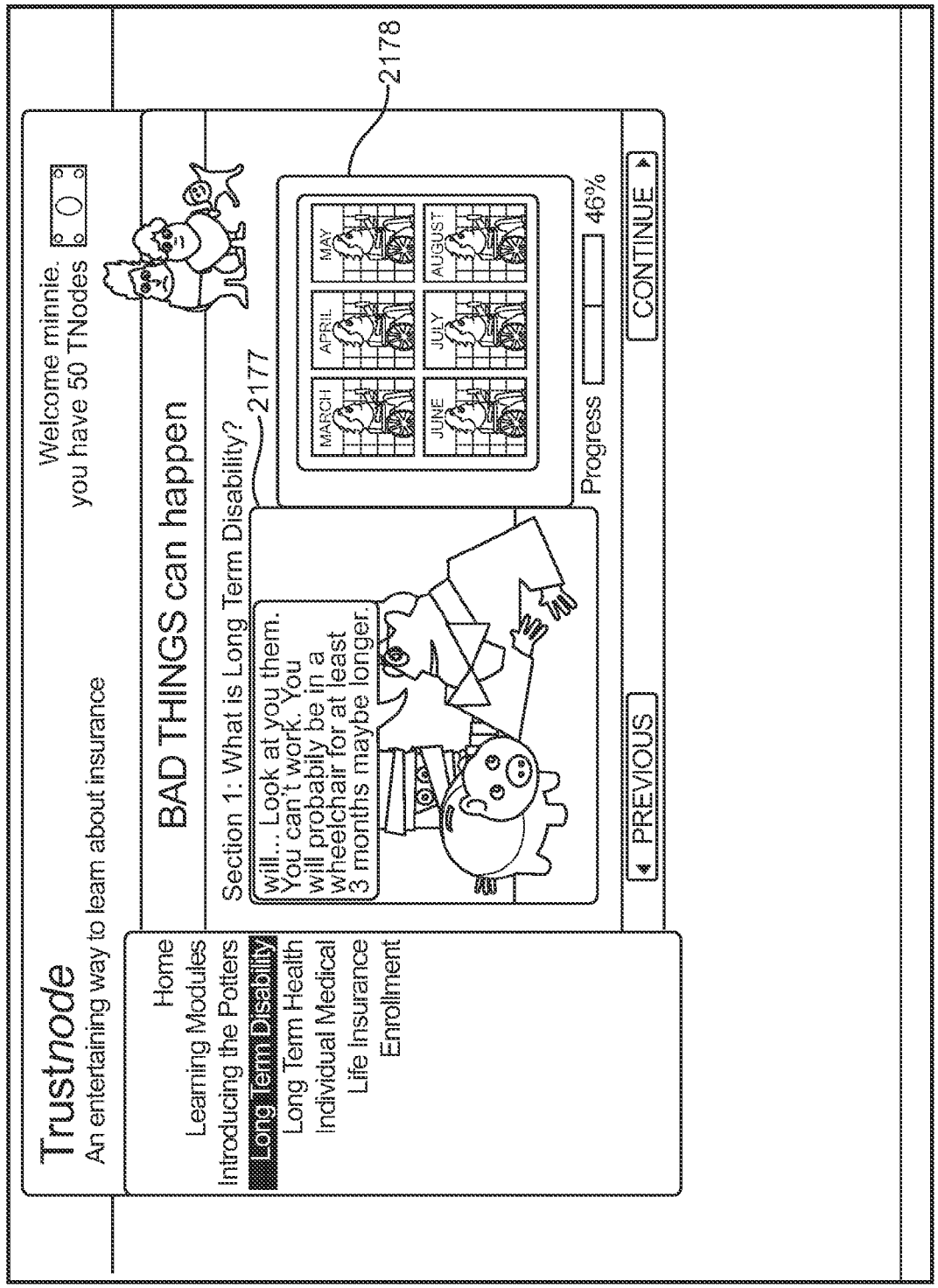
Figure 21B:
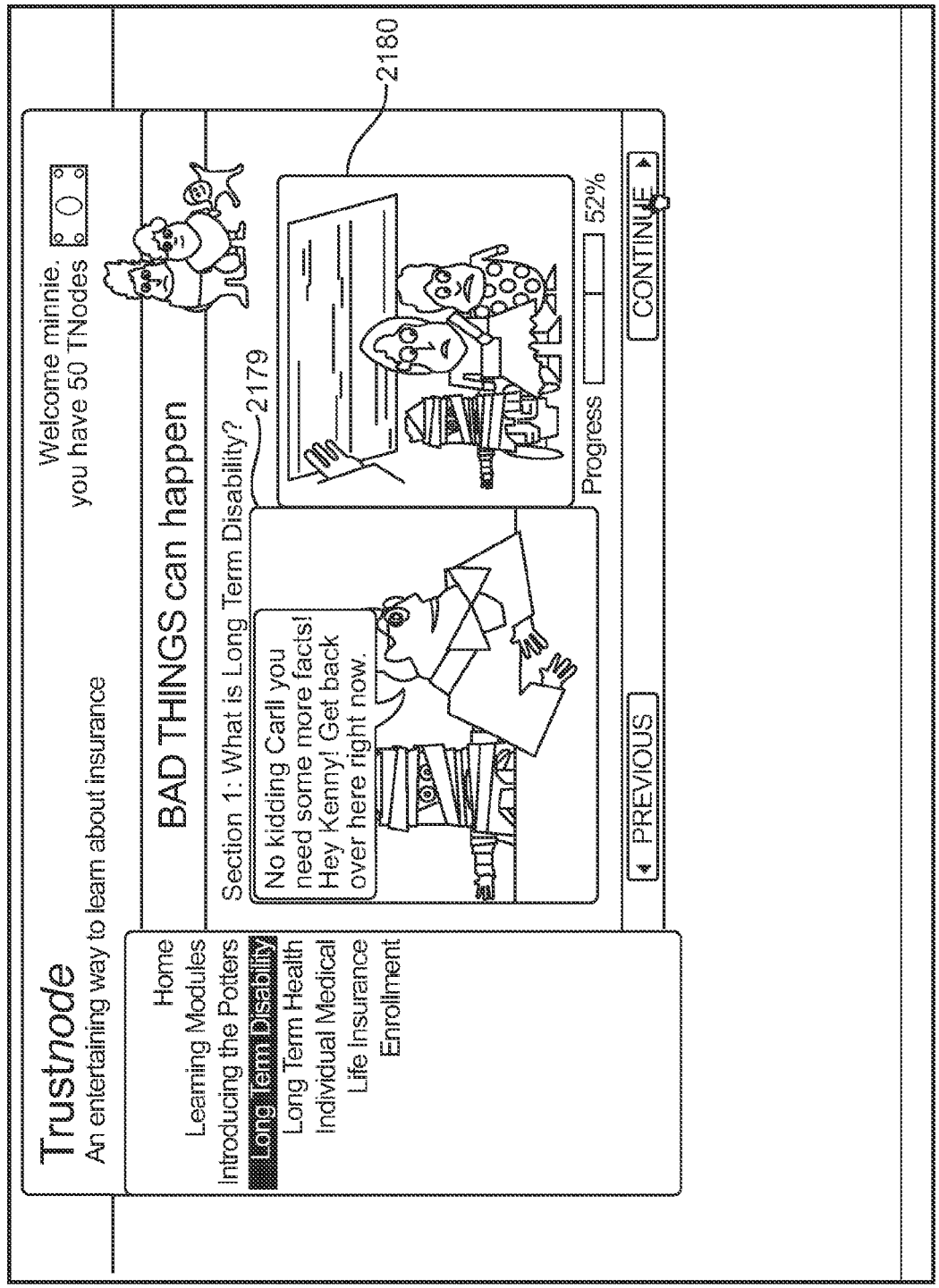

Starting with FIG. 21a, a customer signs into an existing account by entering an email address and password into fields 2102. If no account was previously created, the customer creates a new account by filling out the fields in form 2104, perhaps as a result of the incentive of additional T-Nodes being offered for the creation of an account. Here too, the customer is in control as to when to create an account, without interrupting the initial stages of the educational process.

Information is provided, as illustrated in panel 2106, which includes relevant statistics regarding the cause and consequences of various accidents that can result in loss of life or a disability, as well as information about how prospective customers can earn and redeem T-Nodes. For example, T-Nodes can be redeemed for discounts on products and services that are ancillary to various insurance products, such as Google's G1 phone for use on T-Mobile's cellular network, as illustrated in panel 2108.

In this embodiment, a prospective customer is introduced to virtual agent, Harvey Keck, for the first time (as shown in panel 2110), along with another branded cartoon character, his sidekick piggy bank named Kenny. Harvey introduces himself and displays general information about the learning modules, while Kenny directs the prospective customer to the "PLAY" button to progress further.

After Harvey notes that he is virtual, not real, Kenny interjects some humor by responding to Harvey with his "Well . . . I can tell" line shown in panel 2112 in FIG. 21b. Harvey responds by telling Kenny to be quiet (panel 2114 in FIG. 21c). This humorous interaction between the branded cartoon characters continues to keep prospective customers engaged as they progress through this educational stage.

Harvey notes, in panel 2116 in FIG. 21d, that Kenny can be used to save T-Nodes, the virtual currency offered by the system. Harvey then proceeds to display various alternative learning modules a customer can select, as illustrated in panel 2118 in FIG. 21e, and goes on to explain that learning modules can include cartoon episodes, such as those shown in panel 2120 in FIG. 21f with Carl Potter, and in panel 2122 in FIG. 21g, with the rest of the Potter family and their friends.

Figure 21C:
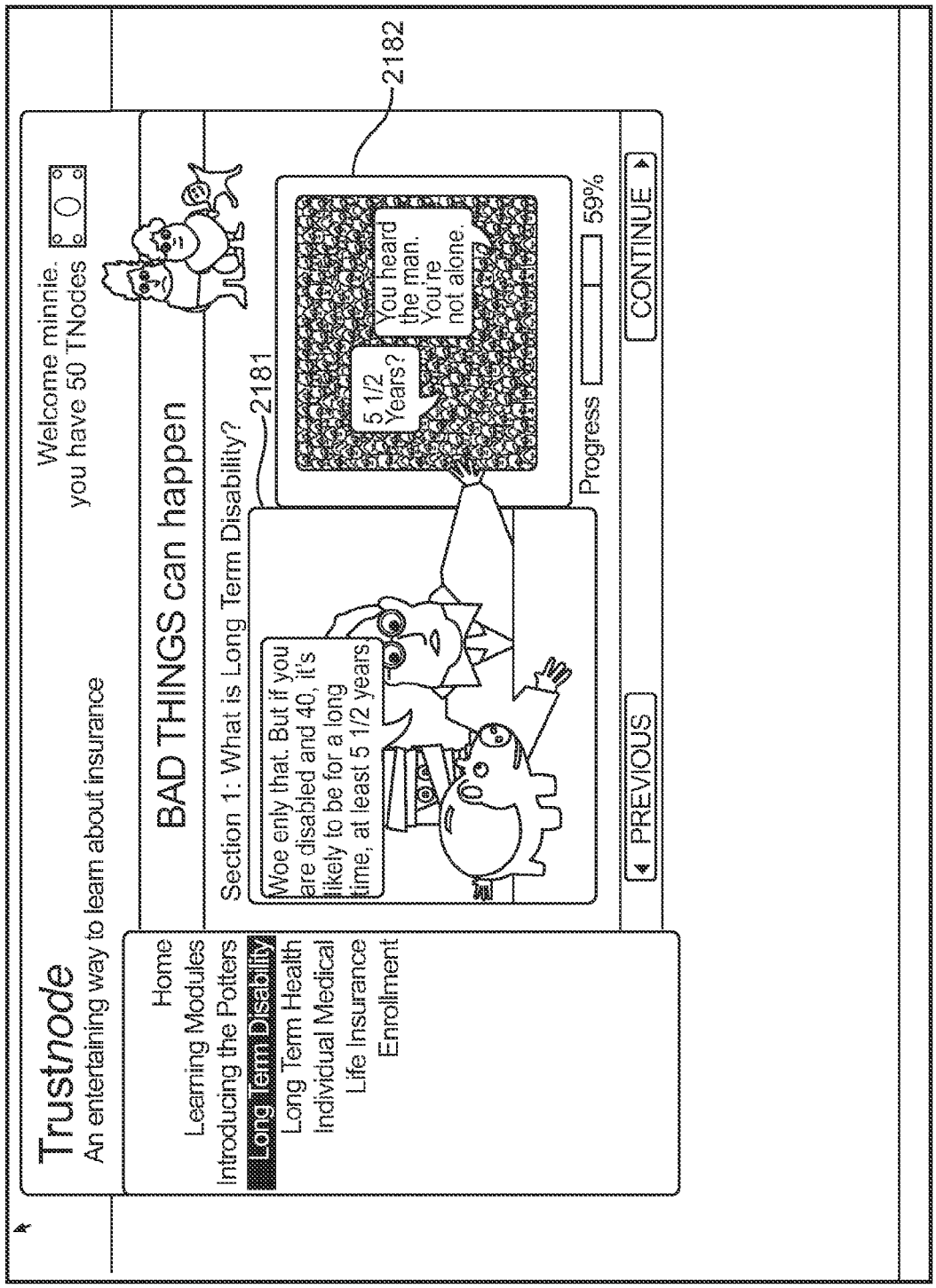
Figure 21D:
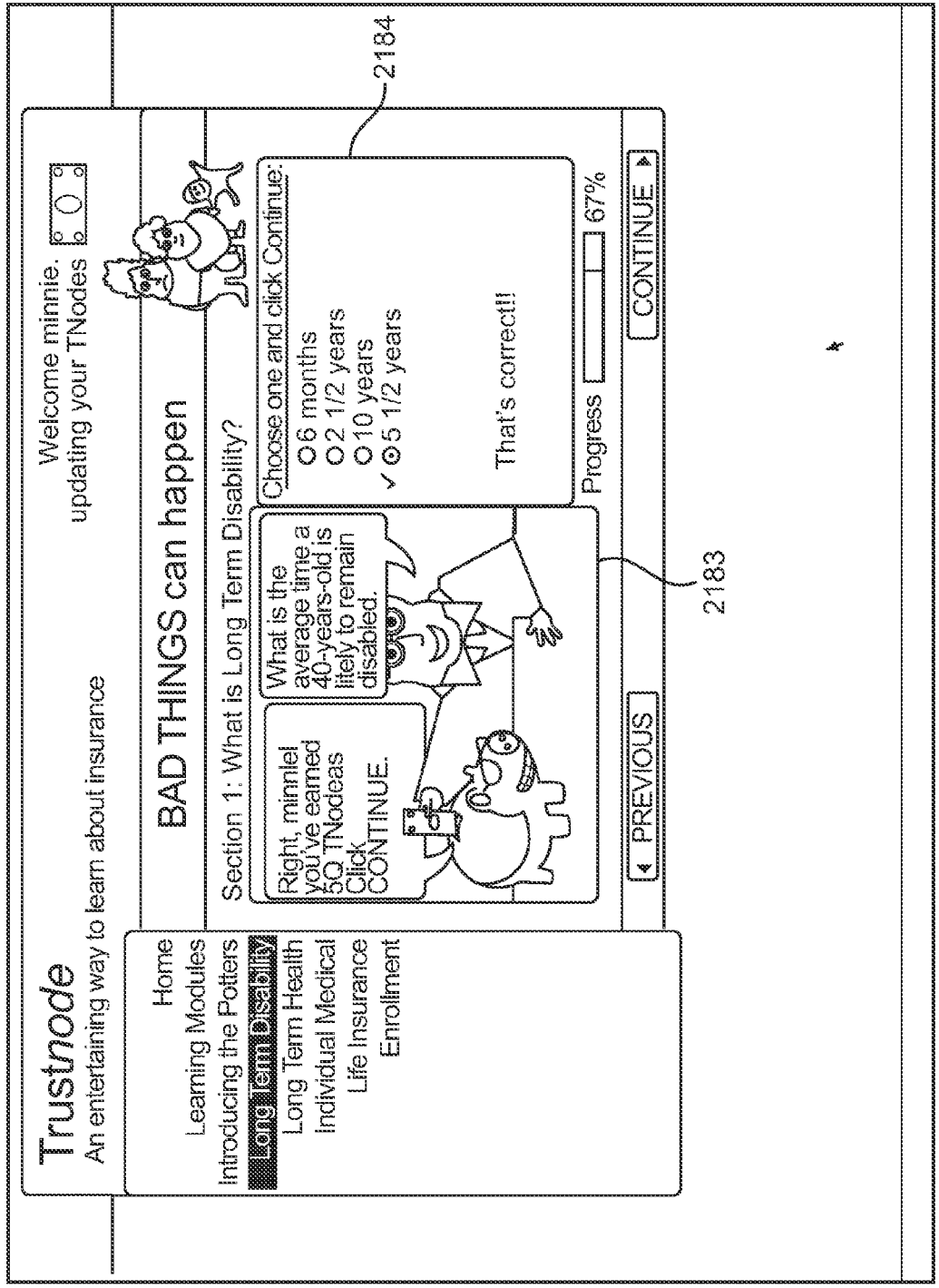
Figure 21E:
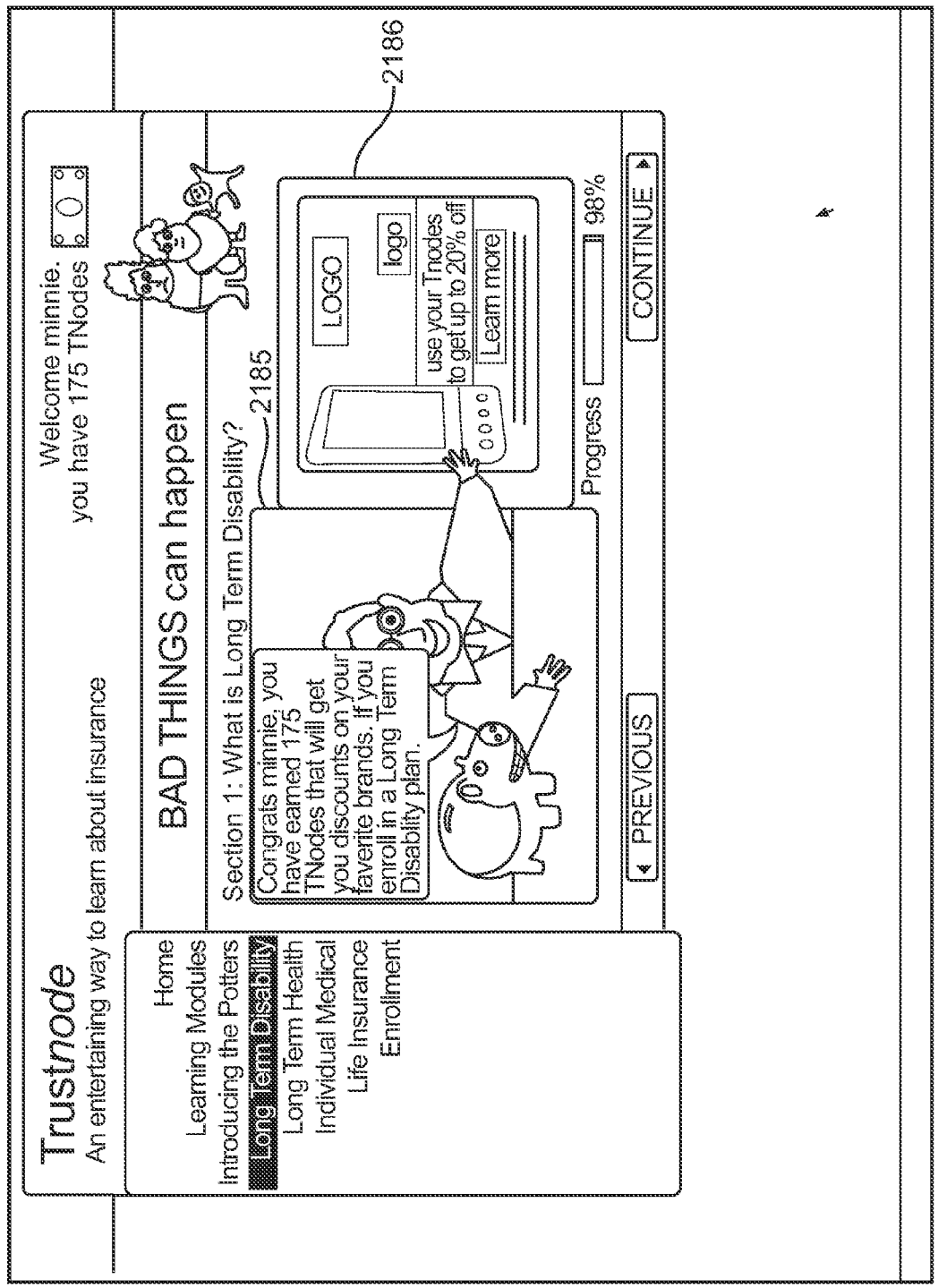
Figure 21F:
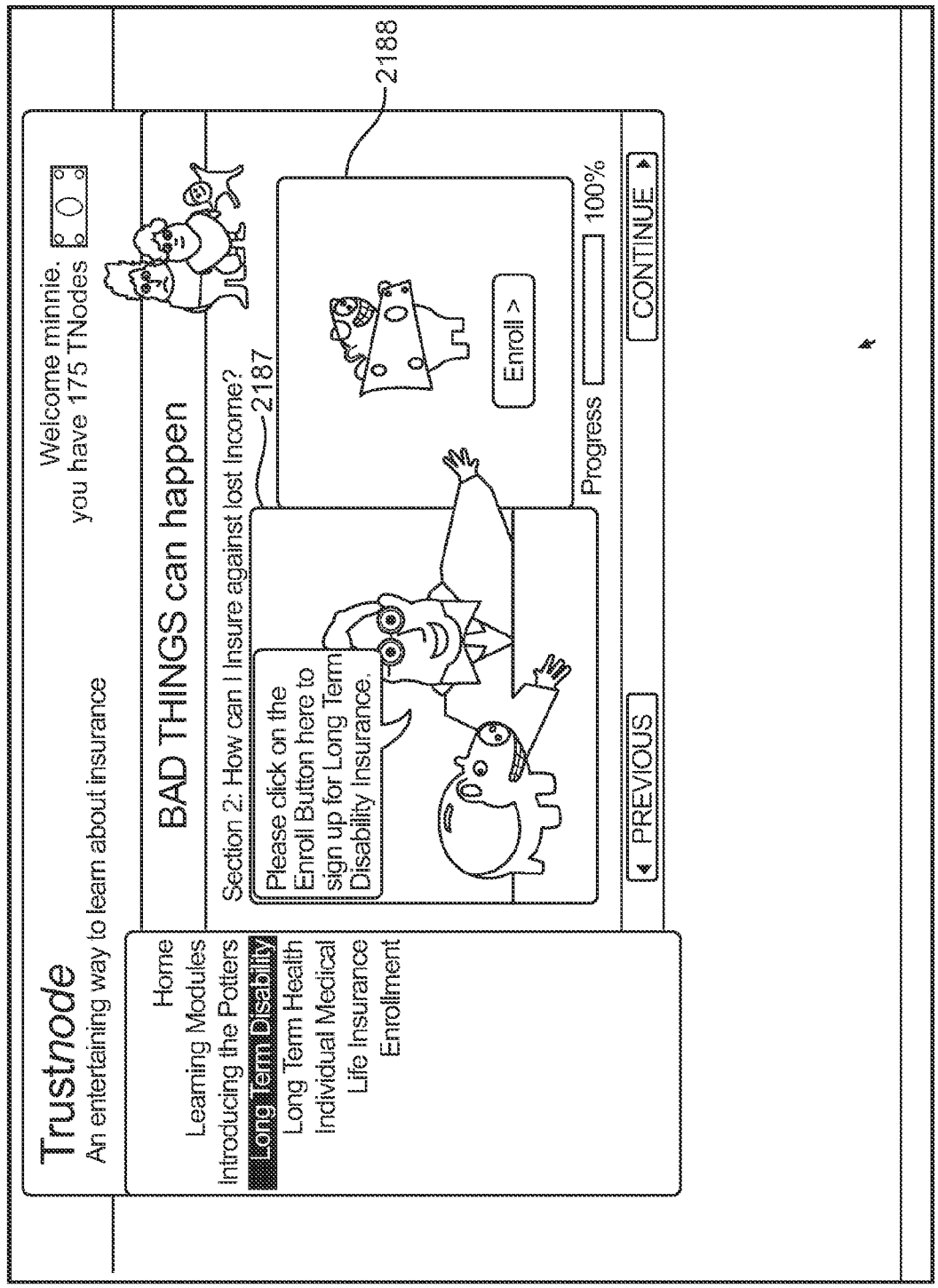
Figure 21H:

Harvey further explains how learning modules can include quizzes, illustrated in panel 2124 in FIG. 21h, containing questions (shown in panel 2126 in FIG. 21i) which, if answered correctly, can earn customer T-Nodes that can be deposited in talking piggy bank Kenny (shown in panel 2128 in FIG. 21j) and redeemed for discounts on various insurance-related and ancillary products and services, shown in panel 2130 in FIG. 21k.

Kenny reminds customers that they will become smarter about insurance (as illustrated in panels 2132 and 2134 in FIG. 21l) via these learning modules, and Harvey then offers customers 50 T-Nodes to provide some basic information and create an account, as shown in panel 2136 in FIG. 21m, and panel 2138 in FIG. 21n. FIG. 21n also shows the fields filled in by the prospective customer (in form 2140) in response to Harvey's offer.

FIG. 21o illustrates the results of a prospective customer's successful creation of an account, as indicated in panel 2142 which also notes the customer's current balance of 50 T-Nodes. Panel 2144 includes links to some of the many options that a customer could select. For example, a customer might proceed to select (or return to) a particular learning module to learn more about one of the products or services offered by various providers. Another customer might instead choose to enroll in a particular insurance plan (whether or not they have completed, or even started, a learning module related to that plan), while others might want to ask questions or talk to a live human agent.

Assuming a prospective customer elects to proceed with the learning modules, FIG. 21p illustrates an introductory episode (the selection of which is shown in panel 2146) that introduces the customer to the Potter family, a collection of branded cartoon characters to which "bad things happen." In one embodiment, Harvey interacts directly with Carl Potter, in the context of Carl being presented with the insurance plan options offered at his worksite. Harvey notes (in panel 2148) that the options seemed too complicated for Carl to understand, which Carl confirms ("I really tried") in panel 2150. Through this simple interaction, many prospective customers will immediately recall their own experiences with their employer's insurance plans when they first started a new job.

As Harvey notes in panel 2152 of FIG. 21q, Carl did what many people do—simply select the basic plan (illustrated in panel 2154), rather than undertake the effort of understanding the distinctions offered by the many complicated alternative options. The ominous results of Carl's decision are alluded to in FIG. 21r, via the reactions of Kenny (in panel 2156) and Carl (panel 2158).

FIG. 21s marks the beginning of the "Long Term Disability" learning module, as shown in item 2160. Panel 2161 introduces the initial "When Bad Things Happen" episode entitled "Long Term Disability," while Kenny (in panel 2162) sarcastically comments to Harvey, "I can't wait."

Turning to panel 2163 in FIG. 21t, Harvey begins the episode by revealing that Carl, who has a habit of texting while driving (as shown in panel 2164), failed to pay attention one day and swerved into traffic (as further illustrated in panels 2165 and 2166 of FIG. 21u). In panel 2167 of FIG. 21v, Harvey reveals the aftermath of Carl's accident (while Kenny turns away), which lands Carl in the hospital with multiple fractures and a spinal injury (illustrated in panel 2168).

Subsequently, after Carl returns home in his wheelchair, he continues his habit of texting while "driving" (as illustrated in panel 2169 of FIG. 21w), which Kenny (in panel 2170) finds "unbelievable." Harvey goes on with the story in panel 2171 of FIG. 21x, relating how Gertrude, Carl's mother-in-law (shown in panel 2172), came to visit one day after Carl returned home. Harvey notes (in panel 2173 of FIG. 21y) that Gertrude was coming up the stairs (shown in panel 2174) and was startled by Carl's inattentive wheelchair driving (shown in panel 2175 of FIG. 21z) and, as a result (as Harvey relates in panel 2176), Gertrude fell "head over heels" down the stairs.

An interesting change in the presentation is illustrated in FIG. 21aa, as Carl now appears in panel 2177, together with Harvey and Kenny. Harvey now addresses Carl directly (as well as the prospective customer), and reminds Carl that he may now be out of work for 3 months or more, with panel 2178 showing Carl still at home in his wheelchair for at least six months.

Harvey tells Carl in panel 2179 of FIG. 21bb that Carl needs some more facts, and tells Kenny to "get back over here" after Kenny moves to panel 2180 to gloat over the Potter family's troubles. Gertrude, though healed, is visibly angry that Carl is still bandaged and in a wheelchair at home, presumably bringing in no money to support the family. An insurance check made out to Carl is shown, illustrating money Carl could have received had he signed up for optional long term disability insurance in addition to the "basic" plan offered by his employer.

In panel 2181 of FIG. 21cc, Harvey notes that those over 40 and disabled are likely to be out of work for a long time—at least 5½ years (confirmed by the crowd in panel 2182). Subsequently, in a later slide, illustrated in FIG. 21dd, Harvey may quiz prospective customers by asking them how long a 40-year old is likely to remain disabled (panel 2183). If the prospective customer answers correctly (eg, by selecting the correct choice of 5½ years, as shown in panel 2184), Kenny notes that the customer answered correctly and has earned 50 T-Nodes (also illustrated in panel 2183).

FIG. 21ee illustrates the end of a second section of the LTD learning module, entitled "How can I insure against lost income?" Having completed this section (eg, a quiz at the end of the section), Harvey notes (in panel 2185) that the prospective customer (Minnie) has earned a total of 175 T-Nodes, which can be redeemed for discounts on selected products, such as the G1 cell phone from T-Mobile illustrated in panel 2186.

At this point, Harvey prompts the prospective customer (in panel 2187 of FIG. 21*ff*) to consider enrolling in the offered LTD plan, by selecting the Enroll button shown in panel 2188. Note that the prospective customer, in one embodiment, could have elected to enter this enrollment process at various points throughout this learning module, and that Harvey may have explicitly suggested this option on multiple occasions. As noted above, in one embodiment, Harvey endeavors to ensure that the prospective customer is "ready to buy" before suggesting enrollment, but leaves that decision to the prospective customer who may decide to enroll earlier or later in the process.

Once a prospective customer elects to consider enrolling in a particular insurance plan (or purchasing a particular product or service), the customer transitions from the educational stage of this process to the transactional stage. One embodiment of the beginning of such an enrollment stage is illustrated in FIG. 21*gg*—eg, after the customer, Minnie Mouse, elects to consider enrolling in a long term disability plan. In panel 2189, Harvey asks for some additional data (eg, data required by the provider for enrollment) used to calculate how much this plan will cost Minnie. This data, shown in panel 2190, includes information already known about Minnie, as well as additional information required from Minnie to complete the form.

Note also that, in one embodiment, information is obtained from prospective customers in "bite-sized chunks" only when it is required. This prevents customers from being overwhelmed by the process and increases the likelihood they will "see it through."

The results of the calculation are shown in panel 2191 of FIG. 21*hh*, with Minnie's employer (Disney) covering 60% of Minnie's $200K salary (limited at $15K/month). In other words, Minnie would receive $10K in monthly benefits while disabled. Her monthly premium of $83.33 ($1K annually) would be deducted from her paycheck. Upon selecting the BUY button shown in panel 2191, Harvey thanks Minnie (in panel 2192 of FIG. 21*ii*) for enrolling in the long term disability plan, and informs her that a copy of her policy will be mailed to her home address.

The above scenario represents a sampling of one embodiment of a learning module and enrollment process for long term disability insurance. In other embodiments, a great deal of additional information is provided to prospective customers as they elect to pursue different paths in this long and complex process. It should be emphasized, however, that the branded cartoon characters persist throughout this process, continually engaging prospective customers, across multiple network platforms, even after any individual transaction has been completed. It is this persistent engagement with a trusted virtual agent and advisor and a "family" of virtual characters that facilitates a customer's ultimate purchase of core and ancillary products and services over time.

Upon reading this disclosure, those of skill in the art will appreciate still additional alternative structural and functional designs for the system and processes and general concepts and principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An online sales and distribution system for facilitating complex multi-stage transactions between prospective customers and providers of products and services on multiple network platforms, the system comprising:
   (a) a first computer hosting a first application that is accessible, via a first network platform, by a prospective customer of a provider offering to sell one or more products or services;
   (b) a first virtual character in the first application that interacts with and engages the prospective customer, during a first stage of a complex transaction, regarding the products and services offered by the provider; and
   (c) a link from the first application to a second application that is hosted on a second computer and is accessible by the prospective customer via a second network platform, the link invocable by the prospective customer from the first application;
   (d) an educational module in the second application that employs the first virtual character to interact with and educate the prospective customer, during a second stage of the complex transaction, regarding the characteristics and suitability to the prospective customer of the products and services offered by the provider, wherein the first virtual character
      (i) poses one or more questions to the prospective customer,
      (ii) obtains data from the prospective customer in response to such questions, and
      (iii) provides educational material to the prospective customer that is tailored to such data;
   and
   (e) a transactional module in the second application that enables the prospective customer, during a third stage of the complex transaction, to purchase one or more of the products and services offered by the provider.

2. The online sales and distribution system of claim 1 wherein the prospective customer can interact with the first virtual character on both the first and second network platforms.

3. The online sales and distribution system of claim 1 wherein the first network platform is a website and the second network platform is a social network.

4. The online sales and distribution system of claim 1 wherein the first network platform is a worksite at which the first prospective customer is employed and the second network platform is a website.

5. The online sales and distribution system of claim 1 wherein the first virtual character is a cartoon character.

6. The online sales and distribution system of claim 1 wherein the first application is a game.

7. The online sales and distribution system of claim 1 wherein information can be obtained from the prospective customer during at least two different stages of the first complex transaction.

8. The online sales and distribution system of claim 1, further comprising a third application that can notify the prospective customer, during a fourth stage of the first complex transaction, regarding additional products or services available for purchase.

9. The online sales and distribution system of claim 8 wherein the third application is a desktop widget.

10. The online sales and distribution system of claim 1 wherein the second application employs a second virtual character that is a virtual sales agent who facilitates the second and third stages of the complex transaction.

11. The online sales and distribution system of claim 10, further comprising a third application that employs the second virtual character to notify the prospective customer, during a fourth stage of the complex transaction, regarding additional products or services available for purchase.

12. The online sales and distribution system of claim 10 wherein the prospective customer can interact with the second virtual character on at least two different network platforms.

13. The online sales and distribution system of claim 10 wherein the second virtual character is a semi-automated sales agent whose interaction with the prospective customer can include first information generated automatically in accordance with rules of an expert system and second information generated manually via a live human expert.

14. The online sales and distribution system of claim 10 wherein the second virtual character can provide the prospective customer with information generated based upon individual and aggregate demographic data.

15. The online sales and distribution system of claim 10 wherein the second virtual character can provide the prospective customer with a first incentive for continued involvement regarding the first complex transaction.

16. The online sales and distribution system of claim 1 wherein the complex transaction involves a product or service from the insurance industry.

17. The online sales and distribution system of claim 16 wherein the second stage of the complex transaction includes an animated episode in which a second virtual character is involved in an accident that is covered by an insurance policy offered by the first provider.

18. An online sales and distribution system for facilitating complex multi-stage transactions between prospective customers and providers of products and services, the system comprising:
   (a) a first computer hosting a first application that is accessible, via a first network platform, by a prospective customer of a provider offering to sell one or more products or services;
   (b) a first virtual character in the first application that interacts with and engages the prospective customer, during a first stage of a complex transaction, regarding the products and services offered by the provider; and
   (c) a link from the first application to a second application that is hosted on a second computer and is accessible by the prospective customer via a second network platform, the link invocable by the prospective customer from the first application;
   (d) a third application, accessible by the prospective customer, that employs a second virtual character to notify the prospective customer regarding additional products or services;
   (e) an educational module in the second application that employs the first virtual character to interact with and educate the prospective customer, during a second stage of the complex transaction, regarding the characteristics and suitability to the prospective customer of the products and services offered by the provider, wherein the first virtual character
      (i) poses one or more questions to the prospective customer,
      (ii) obtains data from the prospective customer in response to such questions, and
      (iii) provides educational material to the prospective customer that is tailored to such data;
   and
   (f) a transactional module in the second application that enables the prospective customer, during a third stage of the complex transaction, to purchase one or more of the products and services offered by the provider and, during a fourth stage of the complex transaction, to purchase one or more of the additional products or services.

19. The online sales and distribution system of claim 18 wherein the prospective customer can interact with the second virtual character on at least two different network platforms.

20. The online sales and distribution system of claim 18 wherein the third application is accessible by the prospective customer via the first network platform.

21. The online sales and distribution system of claim 20 wherein the first network platform is a social network, and the second network platform is a website.

22. The online sales and distribution system of claim 20 wherein the first network platform is a worksite at which the prospective customer is employed and the second network platform is a website.

23. The online sales and distribution system of claim 18 wherein the first and second virtual characters are cartoon characters.

24. The online sales and distribution system of claim 18 wherein the first application is a game.

25. The online sales and distribution system of claim 18 wherein information can be obtained from the prospective customer during at least two different stages of the complex transaction.

26. The online sales and distribution system of claim 18 wherein the third application is a desktop widget running on the first computer.

27. The online sales and distribution system of claim 18 wherein the second virtual character is a virtual sales agent who facilitates the second, third and fourth stages of the complex transaction.

28. The online sales and distribution system of claim 27 wherein the second virtual character is a semi-automated sales agent whose interaction with the prospective customer can include first information generated automatically in accordance with rules of an expert system and second information generated manually via a live human expert.

29. The online sales and distribution system of claim 27 wherein the second virtual character can provide the prospective customer with information generated based upon individual and aggregate demographic data.

30. The online sales and distribution system of claim 27 wherein the second virtual character can provide the prospective customer with a first incentive for continued involvement regarding the complex transaction.

31. The online sales and distribution system of claim 18 wherein the complex transaction involves a product or service from the insurance industry.

32. The online sales and distribution system of claim 31 wherein the second stage of the complex transaction includes an animated episode in which a third virtual character is involved in an accident that is covered by an insurance policy offered by the provider.

33. A method for facilitating complex multi-stage transactions between prospective customers and providers of products and services on multiple network platforms, the method including the following steps:

(a) hosting on a first computer a first application that is accessible, via a first network platform, by a prospective customer of a provider offering to sell one or more products or services;

(b) employing a first virtual character in the first application to interact with and engage the prospective customer, during a first stage of a complex transaction, regarding the products and services offered by the provider;

(c) enabling the prospective customer to link from the first application to a second application that is hosted on a second computer and is accessible by the prospective customer via a second network platform;

(d) employing the first virtual character in the second application to interact with and educate the prospective customer, during a second stage of the complex transaction, regarding the characteristics and suitability to the prospective customer of the products and services offered by the provider, wherein the first virtual character
   (i) poses one or more questions to the prospective customer,
   (ii) obtains data from the prospective customer in response to such questions, and
   (iii) provides educational material to the prospective customer that is tailored to such data;
and (e) enabling the prospective customer, during a third stage of the complex transaction, to purchase one or more of the products and services offered by the provider.

34. The method of claim 33 wherein the prospective customer interacts with the first virtual character on at least two different network platforms.

35. The method of claim 33 wherein the third application is accessible by the prospective customer via the first network platform.

36. The method of claim 35 wherein the first network platform is a social network and the second network platform is a website.

37. The method of claim 35 wherein the first network platform is a worksite at which the prospective customer is employed and the second network platform is a website.

38. The method of claim 33 wherein the first virtual character is a cartoon character.

39. The method of claim 33 wherein the first application is a game.

40. The method of claim 33 further including the step of obtaining information from the prospective customer during at least two different stages of the complex transaction.

41. The method of claim 33 further including the step of providing a third application to notify the prospective customer, during a fourth stage of the complex transaction, regarding additional products or services available for purchase.

42. The method of claim 33 wherein the second application employs a second virtual character that is a virtual sales agent who facilitates the second and third stages of the complex transaction.

43. The method of claim 42 further including the step of providing a third application that employs the second virtual character to notify the prospective customer, during a fourth stage of the complex transaction, regarding additional products or services available for purchase.

44. The method of claim 42 wherein the prospective customer interacts with the second virtual character on at least two different network platforms.

45. The method of claim 42 wherein the second virtual character is a semi-automated sales agent whose interaction with the prospective customer can include first information generated automatically in accordance with rules of an expert system and second information generated manually via a live human expert.

46. The method of claim 42 wherein the second virtual character provides the prospective customer with information generated based upon individual and aggregate demographic data.

47. The method of claim 42 wherein the second virtual character provides the prospective customer with a first incentive for continued involvement regarding the complex transaction.

48. The method of claim 33 wherein the complex transaction involves a product or service from the insurance industry.

49. The method of claim 48 wherein the second stage of the complex transaction includes an animated episode in which a second virtual character is involved in an accident that is covered by an insurance policy offered by the provider.

50. A method for facilitating complex multi-stage transactions between prospective customers and providers of products and services on multiple network platforms, the method including the following steps:

(a) hosting on a first computer a first application that is accessible, via a first network platform, by a prospective customer of a provider offering to sell one or more products or services;

(b) employing a first virtual character in the first application to interact with and engage the prospective customer, during a first stage of a complex transaction, regarding the products and services offered by the provider;

(c) providing a third application, accessible by the prospective customer, that employs a second virtual character to notify the prospective customer regarding additional products or services;

(d) enabling the prospective customer to link from the first application to a second application that is hosted on a second computer and is accessible by the prospective customer via a second network platform;

(e) employing the first virtual character in the second application to interact with and educate the prospective customer, during a second stage of the complex transaction, regarding the characteristics and suitability to the prospective customer of the products and services offered by the provider, wherein the first virtual character
   (i) poses one or more questions to the prospective customer,
   (ii) obtains data from the prospective customer in response to such questions, and
   (iii) provides educational material to the prospective customer that is tailored to such data;
and (f) enabling the prospective customer, during a third stage of the complex transaction, to purchase one or more of the products and services offered by the provider and, during a fourth stage of the complex transaction, to purchase one or more of the additional products or services.

51. The method of claim 50 wherein the prospective customer interacts with the second virtual character on at least two different network platforms.

52. The method of claim 50 wherein the third application is accessible by the prospective customer via the first network platform.

53. The method of claim 52 wherein the first network platform is a social network and the second network platform is a website.

54. The method of claim 52 wherein the first network platform is a worksite at which the prospective customer is employed and the second network platform is a website.

55. The method of claim 50 wherein the first and second virtual characters are cartoon characters.

56. The method of claim 50 wherein the first application is a game.

57. The method of claim 50 further including the step of obtaining information from the prospective customer during at least two different stages of the complex transaction.

58. The method of claim 50 wherein the second virtual character is a virtual sales agent who facilitates the second, third and fourth stages of the complex transaction.

59. The method of claim 58 wherein the second virtual character is a semi-automated sales agent whose interaction with the prospective customer can include first information generated automatically in accordance with rules of an expert system and second information generated manually via a live human expert.

60. The method of claim 58 wherein the second virtual character provides the prospective customer with information generated based upon individual and aggregate demographic data.

61. The method of claim 58 wherein the second virtual character provides the prospective customer with a first incentive for continued involvement regarding the complex transaction.

62. The method of claim 50 wherein the complex transaction involves a product or service from the insurance industry.

63. The method of claim 62 wherein the second stage of the complex transaction includes an animated episode in which a third virtual character is involved in an accident that is covered by an insurance policy offered by the provider.

* * * * *